(12) United States Patent
Hoffman et al.

(10) Patent No.: US 12,290,023 B2
(45) Date of Patent: May 6, 2025

(54) METHOD AND APPARATUS FOR MOUNTING A FLAIL MOWER

(71) Applicant: Venture Products, Inc., Orrville, OH (US)

(72) Inventors: Michael S. Hoffman, Orrville, OH (US); Corey Gerber, Smithville, OH (US)

(73) Assignee: Venture Products, Inc., Orrville, OH (US)

( * ) Notice: Subject to any disclaimer, the term of this patent is extended or adjusted under 35 U.S.C. 154(b) by 854 days.

(21) Appl. No.: 17/411,095

(22) Filed: Aug. 25, 2021

(65) Prior Publication Data

US 2022/0225566 A1    Jul. 21, 2022

Related U.S. Application Data

(63) Continuation-in-part of application No. 17/179,595, filed on Feb. 19, 2021.

(60) Provisional application No. 63/139,547, filed on Jan. 20, 2021.

(51) Int. Cl.
| | | |
|---|---|---|
| *A01D 34/53* | (2006.01) | |
| *A01D 34/535* | (2006.01) | |
| *A01D 34/54* | (2006.01) | |
| *A01D 34/86* | (2006.01) | |
| *A01D 101/00* | (2006.01) | |

(52) U.S. Cl.
CPC ......... *A01D 34/535* (2013.01); *A01D 34/54* (2013.01); *A01D 34/866* (2013.01); *A01D 2101/00* (2013.01)

(58) Field of Classification Search
CPC ..... A01D 34/535; A01D 34/54; A01D 34/868
See application file for complete search history.

(56) References Cited

U.S. PATENT DOCUMENTS

| | | |
|---|---|---|
| 2,139,625 A | 12/1938 | Pruss |
| 2,242,472 A | 5/1941 | Keeler |
| 3,605,906 A | 9/1971 | Coates |
| 3,706,186 A | 12/1972 | Hurlburt et al. |
| 4,159,613 A | 7/1979 | Knudson et al. |
| 4,180,282 A | 12/1979 | Henning |
| 4,236,329 A | 12/1980 | Hetrick |
| 4,416,109 A | 11/1983 | Slazas |
| 4,697,404 A * | 10/1987 | Brockmeier ........... A01D 75/30 56/6 |
| 4,878,713 A | 11/1989 | Zanetis |
| 5,125,174 A | 6/1992 | Watson et al. |
| 5,666,794 A | 9/1997 | Vought |

(Continued)

FOREIGN PATENT DOCUMENTS

| | | |
|---|---|---|
| GB | 808218 | 1/1959 |
| GB | 2592185 | 8/2021 |

*Primary Examiner* — Abigail A Risic
(74) *Attorney, Agent, or Firm* — Sand, Sebolt & Wernow Co., LPA

(57) ABSTRACT

A method and apparatus for attaching a forward-mounted implement that may allow pivotal movement of the implement around a longitudinal axis to better maintain proper operational height when operating on uneven or sloped terrain. Further provided, the attachment mechanism of the present disclosure may allow for a secure and safe attachment to an associated tractor or other similar vehicle while simultaneously providing for a reduced production cost and less maintenance requirements.

21 Claims, 34 Drawing Sheets

(56) References Cited

U.S. PATENT DOCUMENTS

| | | | |
|---|---|---|---|
| 5,758,478 A | 6/1998 | Bando | |
| 5,775,075 A | 7/1998 | Dannar | |
| 6,082,086 A * | 7/2000 | Togoshi | A01D 34/44 |
| | | | 56/7 |
| 6,276,119 B1 | 8/2001 | Oshima | |
| 6,336,312 B1 | 1/2002 | Bednar et al. | |
| 6,347,503 B1 * | 2/2002 | Esau | A01D 34/64 |
| | | | 56/15.9 |
| 6,928,757 B2 | 8/2005 | Bloxdorf et al. | |
| 7,293,398 B2 * | 11/2007 | Koehn | A01D 34/662 |
| | | | 56/15.9 |
| 7,669,395 B2 * | 3/2010 | Wehler | A01D 34/74 |
| | | | 56/14.9 |
| 7,870,711 B2 * | 1/2011 | Koehn | A01D 34/74 |
| | | | 56/15.9 |
| 8,099,936 B2 | 1/2012 | Bryant | |
| 8,104,253 B2 * | 1/2012 | Coffin | A01D 75/306 |
| | | | 56/7 |
| 8,112,976 B1 | 2/2012 | Kallevig et al. | |
| 9,554,514 B2 | 1/2017 | Marotte | |
| 9,693,501 B2 * | 7/2017 | Giere | A01D 34/74 |
| 10,334,780 B2 * | 7/2019 | Bartel | A01D 34/64 |
| 10,561,064 B2 * | 2/2020 | Hoffman | A01D 34/662 |
| 11,071,250 B2 | 7/2021 | Aposhian et al. | |
| 11,206,759 B2 | 12/2021 | Gust et al. | |
| 11,259,461 B2 * | 3/2022 | Bengtzohn | A01D 34/76 |
| 11,470,773 B2 | 10/2022 | Wenzel | |
| 2004/0182056 A1 | 9/2004 | Greenhoe | |
| 2004/0216654 A1 | 11/2004 | Fischer | |
| 2004/0221561 A1 * | 11/2004 | Koehn | A01D 34/662 |
| | | | 56/15.9 |
| 2005/0028406 A1 | 2/2005 | Elliott | |
| 2006/0053761 A1 | 3/2006 | Lougheed | |
| 2008/0127619 A1 * | 6/2008 | Link | A01D 75/30 |
| | | | 56/6 |
| 2008/0289310 A1 | 11/2008 | Hagen et al. | |
| 2009/0100816 A1 * | 4/2009 | Rinholm | A01D 34/54 |
| | | | 56/7 |
| 2010/0176563 A1 | 7/2010 | Madler | |
| 2011/0180282 A1 | 7/2011 | Reavie et al. | |
| 2013/0248211 A1 | 9/2013 | Warchola et al. | |
| 2015/0096278 A1 | 4/2015 | Sprinkmann et al. | |
| 2015/0308060 A1 | 10/2015 | Beaird, III | |
| 2016/0095273 A1 * | 4/2016 | Merkt | A01B 59/002 |
| | | | 172/449 |
| 2017/0006760 A1 | 1/2017 | Nielsen | |
| 2018/0271017 A1 * | 9/2018 | Merkt | A01D 34/52 |
| 2018/0359902 A1 | 12/2018 | McAdam et al. | |
| 2019/0133038 A1 * | 5/2019 | Arnold | A01D 34/535 |
| 2019/0150359 A1 * | 5/2019 | Gust | A01D 34/863 |
| 2019/0216000 A1 | 7/2019 | Hiller et al. | |
| 2019/0257058 A1 * | 8/2019 | Merkt | G01S 19/14 |
| 2020/0022306 A1 | 1/2020 | Meyer | |
| 2020/0221634 A1 * | 7/2020 | Nicholson | A01D 34/46 |
| 2020/0260639 A1 * | 8/2020 | Walker | A01D 34/74 |
| 2020/0329624 A1 | 10/2020 | Thorsell | |
| 2021/0243952 A1 | 8/2021 | Weber et al. | |
| 2021/0282317 A1 * | 9/2021 | Fillep | A01D 75/303 |
| 2022/0117153 A1 * | 4/2022 | Nielsen | A01D 34/006 |
| 2022/0361402 A1 | 11/2022 | Fugett et al. | |
| 2023/0042867 A1 * | 2/2023 | Degnan | A01D 34/863 |

* cited by examiner

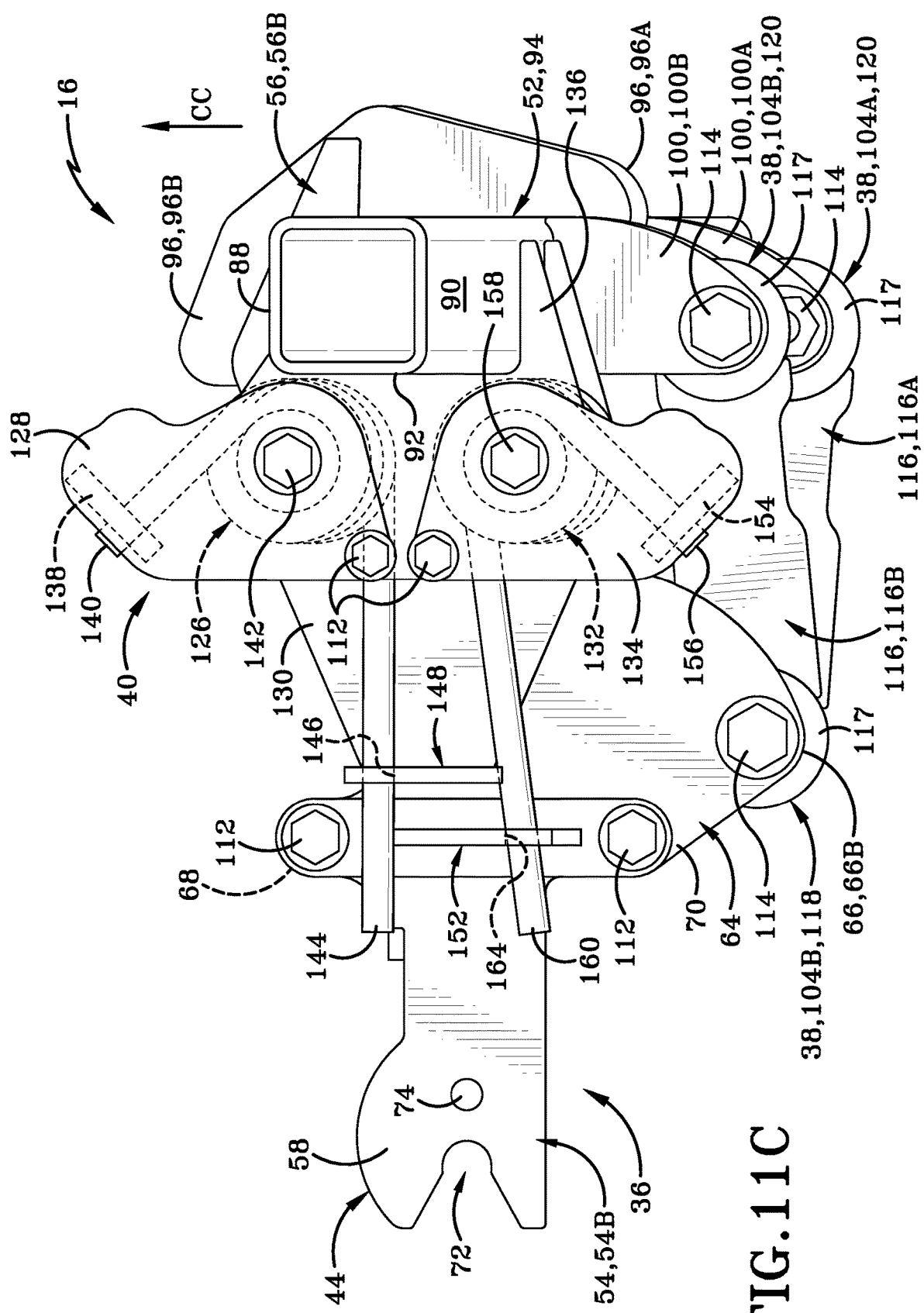

METHOD AND APPARATUS FOR MOUNTING A FLAIL MOWER

CROSS REFERENCE TO RELATED APPLICATIONS

This application is a continuation-in-part application of U.S. patent application Ser. No. 17/179,595, filed on Feb. 19, 2021, which claims the benefit of U.S. Provisional Application Ser. No. 63/139,547, filed on Jan. 20, 2021; the entirety of which is incorporated herein by reference.

TECHNICAL FIELD

The present disclosure relates to tractor mounted implements. More particularly, in one example, the present disclosure relates to a mounting frame and assembly for tractor mounted implements carried in front of a tractor. Specifically, in another example, the present disclosure relates to a mounting assembly operable to connect an implement to the forward end of a tractor while allowing for lateral pivoting of the implement about a longitudinal pivot axis.

BACKGROUND

Tractors are commonly used in many areas including agricultural, landscaping, snow-clearing, and other similar lines of work, and in both residential and commercial applications. Often, these tractors carry or are otherwise connected to one or more implements on the forward end and/or the rearward end thereof. Some examples of tractor mounted implements can include plows, earth engaging equipment, power brushes, mower attachments, and/or other similar landscaping and/or maintenance-type attachments. As used in smaller applications, such as residential and/or small commercial applications, tractors are particularly useful for mowing, other landscape maintenance, snow removal, and/or surface cleaning and preparation applications.

One of the more common uses of a tractor mounted implement is the use of a mowing attachment such as a flail mower or the like, which may be connected to a forward end of a tractor and driven by the tractor over an area to be mowed. These implements may vary in size and operation; however, it is common to use such implements over uneven or sloped terrains.

Typically, a forward-mounted tractor implement such as a flail mower includes a series of wheels and/or ground engaging skids to allow the implement to track the ground surface. When operated on a flat surface, these wheels and/or skids help support the implement at a proper operational height. When used with a mowing implement, this can help keep the cut of the associated landscaping at a substantially even height, thus providing a uniform appearance and allowing for regular maintenance.

When operated on uneven or sloped terrain; however, the use of wheels, and/or skids may cause an uneven operation of the associated implement. Where the implement is a mower, for example, this may result in an uneven cut and or further damage to the terrain. Typically, the issue arises in that the wheels and/or skids of the implement that track the ground may cause the implement to move or bounce as the slope and condition of the terrain changes. Alternatively, the implement may ride on one edge thus raising the opposite side off of the ground. For example, when utilizing a mowing implement on sloped terrain, current attachment assemblies maintain the mowing attachment in a level configuration. Where one side is in contact with a ground surface, such as on the high side of the terrain, that side of the mower may cut closer to the ground surface. On the opposite side, the mower may cut at a higher length, or on larger slopes, may disconnect from the ground surface entirely, Thus, on the high side of the slope, the vegetation to be cut too short and the mower may contact the ground surface, which may further damage the ground or the mowing attachment. At the same time, on the low side of the slope, the vegetation may be left too long, or may not be cut at all.

Current solutions typically involve various applications of shocks, springs, or the like to allow some vertical movement of the tractor implement as the implement is operated over uneven terrain. Other times, the attachment between the implement and the tractor is intentionally loosened or not fully secured to allow some play in the attachment mechanism, again, with the purpose of allowing some vertical movement of the implement. In both instances, these current solutions fall short as in they are inconsistent, and in the instance of loosened attachment points, may be dangerous to an operator, bystanders, and/or property as the loose attachment may cause failure and/or injury. Further, the addition of shocks, springs and other similar measures increase the cost, maintenance requirements, and probability of failure during operation while only minimally addressing these issues.

SUMMARY

The present disclosure addresses these and other issues by providing a method and apparatus for attaching a forward-mounted implement that may allow pivotal movement of the implement around a longitudinal axis to better maintain proper operational height when operating on uneven or sloped terrain. Further provided, the attachment mechanism of the present disclosure may allow for a secure and safe attachment to an associated tractor or other similar vehicle while simultaneously providing for a reduced production cost and less maintenance requirements.

In one aspect, an exemplary embodiment of the present disclosure may provide an attachment frame for a tractor mounted implement comprising: a first side member operable to connect to a frame of a tractor; a second side member spaced laterally apart from the first side member operable to connect to the frame of the tractor; a first cross member disposed between the first and second side member; and a second cross member forward of and connected to the first cross member operable to connect an implement to the first cross member, wherein the second cross member and the implement are rotatable relative to the first cross member about a longitudinal axis defined by a longitudinal centerline of the attachment frame.

In another aspect, an exemplary embodiment of the present disclosure may provide a method of maintaining a level orientation of an implement relative to a ground surface comprising: traversing a ground surface in a first condition with a tractor carrying an implement thereon; traversing the ground surface in a second condition with the tractor and implement; rotating the implement about a longitudinal axis defined by a centerline of an attachment frame connecting the implement to the tractor from a first position wherein the implement is generally horizontal relative to a cross member of the attachment frame to a second position wherein the implement is angled relative to the cross member of the attachment frame in response to the change of the ground surface from the first condition to the second condition; and biasing the implement back to the first position with a spring assembly when the level of the ground surface reverts to the first condition.

In another aspect, an exemplary embodiment of the present disclosure may provide an attachment system for a tractor. The attachment system includes an implement that has a body. The attachment system also includes an attachment frame assembly that has a pivot assembly operably engaged with the implement. The attachment system also includes a striping assembly operably engaged with the implement inside of the interior chamber of the body.

This exemplary embodiment or another exemplary embodiment may further provide that the striping assembly is adapted to depress a predetermined amount of cut vegetation inside the interior chamber onto a lawn for creating a striping pattern into the lawn. This exemplary embodiment or another exemplary embodiment may further provide that the implement and the striping assembly are moveable relative to the attachment frame assembly via the pivot assembly. This exemplary embodiment or another exemplary embodiment may further provide that the implement further comprises a flail mower. This exemplary embodiment or another exemplary embodiment may further provide that the striping assembly is adapted to follow the contour of a ground surface via the rotation of the implement and the pivot assembly of the attachment frame assembly. This exemplary embodiment or another exemplary embodiment may further provide that the attachment frame assembly further comprises a first carrier having a first support arm and a second carrier positioned opposite to the first carrier relative to the implement and having a second support arm; wherein the striping assembly is disposed between the first carrier and the second carrier. This exemplary embodiment or another exemplary embodiment may further provide that the attachment frame assembly further comprises a first coupler operably engaged to the first support arm, wherein the first coupler defines a first U-shaped groove; and a second coupler operably engaged to the second support arm, wherein the second coupler defines a second U-shaped groove. This exemplary embodiment or another exemplary embodiment may further provide that the striping assembly further comprises a roller having a first end, an opposing second end, and a longitudinal axis extending between the first end and the second end; a first shaft extending away from the first end of the roller along the longitudinal axis; and an opposing second shaft extending away from the second end of the roller along the longitudinal axis. This exemplary embodiment or another exemplary embodiment may further provide that a first pillow block bearing operably engaged to the first coupler; and a second pillow block bearing operably engaged to the second coupler. This exemplary embodiment or another exemplary embodiment may further provide that the first pillow block bearing is operable to receive and house the first shaft; and wherein the second pillow block bearing is operable to receive and house the second shaft. This exemplary embodiment or another exemplary embodiment may further provide that the first pillow block bearing operably engages with the first coupler inside of the first U-shaped groove; and wherein the second pillow block bearing operably engages with the second coupler inside of the second U-shaped groove. This exemplary embodiment or another exemplary embodiment may further provide that the roller is adapted to rotate about the longitudinal axis inside of the first pillow block bearing and the first coupler at the first shaft; and wherein the roller is adapted to rotate about the longitudinal axis inside of the second pillow block bearing and the second coupler at the second shaft. This exemplary embodiment or another exemplary embodiment may further provide that a portion the first support arm, a portion of the second support arm, the first coupler, and the second coupler are positioned inside of the interior chamber defined by the body of the implement. This exemplary embodiment or another exemplary embodiment may further provide that a first adjustment mechanism operably engaged to the first carrier and the first support arm; and a second adjustment mechanism operably engaged to the second carrier and the second support arm. This exemplary embodiment or another exemplary embodiment may further provide that the implement and the striping assembly are selectively adjustable by each of the first adjustment mechanism and the second adjustment mechanism.

In another aspect, an exemplary embodiment of the present disclosure may provide a method. The method comprises the steps of operably engaging an implement having a striping assembly therein with an attachment system of a tractor; traversing a ground surface in a first condition with the tractor and the attachment system; cutting a section of lawn from the ground surface via at least one cutting blade of the implement; discharging a volume of cut lawn onto the ground surface; depressing the volume of cut lawn onto the ground surface in a first direction, via the striping assembly, inside of an interior chamber defined by a body of the implement; and creating a striping pattern on the lawn in the first direction.

This exemplary embodiment or another exemplary embodiment may further provide that the step of traversing the ground surface in the first condition with the tractor and the implement includes the implement being level with a centerline of the attachment system. This exemplary embodiment or another exemplary embodiment may further provide the steps of traversing the ground surface in a second condition; rotating the implement and the striping assembly about a longitudinal axis defined by a centerline of an attachment frame assembly from a first position to a second position, wherein the implement and the striping assembly is generally horizontal relative to a cross member of the attachment frame assembly in the first position, and wherein the implement and the striping assembly is angled relative to the cross member of the attachment frame assembly in response to the change of the ground surface from the first condition to the second condition; and biasing the implement and the striping assembly back to the first position with a spring assembly when the level of the ground surface reverts to the first condition. This exemplary embodiment or another exemplary embodiment may further provide the steps of traversing the ground surface in a third condition with the tractor along with the implement and the striping assembly; and rotating the implement and the striping assembly from one of the first position and the second position to a third position wherein the implement is angled relative to the cross member of the attachment frame assembly in an opposite direction than the second position. This exemplary embodiment or another exemplary embodiment may further provide that the implement is a flail mower.

In another aspect, an exemplary embodiment of the present disclosure may provide an attachment system for a tractor. The attachment system has an implement having a body; an attachment frame assembly having pivot assemblies operably engaged to the implement; and a flip-up assembly operably engaged to the body of the implement and the attachment frame assembly, wherein the flip-up assembly is adapted to independently rotate the implement about a longitudinal axis relative to the attachment frame assembly.

This exemplary embodiment or another exemplary embodiment may further provide a mechanical power source provided with the tractor, wherein the mechanical power source is adapted to pneumatically control the flip-up assembly to rotate the implement between an initial, non-pivoted position to a translated, pivoted position. This exemplary embodiment or another exemplary embodiment may further provide that the implement further comprises a first cross frame bracket operably engaged to an exterior surface of the body and defining a first slot and a first opening; and an opposing second cross bracket operably engaged to the exterior surface of the body and defining a second slot and a second opening. This exemplary embodiment or another exemplary embodiment may further provide that the flip-up assembly further comprises a force generating device operably engaged to the body of the implement; a connector operably engaged to the force generating device, wherein the connector is operably engaged to the first cross frame bracket and the second cross frame bracket; and at least one mounting plate operably engaging the force generating device with the attachment frame assembly. This exemplary embodiment or another exemplary embodiment may further provide that the force generating device further comprises a cylinder having first end, an opposing second end, and a longitudinal axis extending therebetween; a first protruding arm extending away from the cylinder orthogonal to the longitudinal axis; an opposing second protruding arm extending away from the cylinder orthogonal to the longitudinal axis; and a rod extending from the cylinder and moveable inside of the cylinder along the longitudinal axis. This exemplary embodiment or another exemplary embodiment may further provide that the connector further comprises a support member defining a central passageway; a first lateral wall operably engaged with the support member, and a second opposing lateral wall operably engaged with the support member. This exemplary embodiment or another exemplary embodiment may further provide that the flip-up assembly further comprises a locking mechanism operably engaging the connector with the first cross frame bracket and the second cross frame bracket. This exemplary embodiment or another exemplary embodiment may further provide that the flip-up assembly further comprises a removable pin operably engageable with the implement and the attachment frame assembly for maintaining the implement between an initial, non-pivoted position and a translated, pivoted position. This exemplary embodiment or another exemplary embodiment may further provide that the removable pin is operably engaged with the first lateral wall and the second lateral wall of the connector in the initial, non-pivoted position; and wherein the removable pin is remote from the first opening and the second opening of the first cross frame bracket and the second cross frame bracket in the initial, non-pivoted position. This exemplary embodiment or another exemplary embodiment may further provide that the removable pin is operably engaged with the first cross frame bracket and the second cross frame bracket inside of the first opening and the second opening in the translated, pivoted position; and wherein the removable pin is remote from the first lateral wall and the second lateral wall of the connector in the translated, pivoted position. This exemplary embodiment or another exemplary embodiment may further provide that the at least one mounting plate further comprises an opposing second mounting plate operably engaging the force generating device with the attachment frame assembly, wherein the at least one mounting plate and the second mounting plate are operably engaged to one another. This exemplary embodiment or another exemplary embodiment may further provide that the first protruding arm of the force generating device is operably engaged to the at least one mounting plate; and wherein the second protruding arm of the force generating device is operably engaged to the second mounting plate. This exemplary embodiment or another exemplary embodiment may further provide that the flip-up assembly is operably engaged to the implement between the first cross frame bracket and the second cross frame bracket. This exemplary embodiment or another exemplary embodiment may further provide that the implement further comprises: a first lateral arm having a first end operably engaged to a cross member of the attachment frame assembly and a second opposing end operably engaged to the implement, wherein the second end of the first lateral arm is adapted to allow independent rotation of the implement relative to the attachment frame assembly; and an opposing second lateral arm having a first end operably engaged to the cross member of the attachment frame assembly and an opposing second end of the second lateral arm operably engaged to the implement, wherein the second end of the second lateral arm is adapted to allow independent rotation of the implement relative to the attachment frame assembly. This exemplary embodiment or another exemplary embodiment may further provide a bracket operably engaged to the attachment frame assembly, wherein the bracket is adapted to hold at least one hydraulic tubing away from the implement and the attachment frame assembly.

In another aspect, an exemplary embodiment of the present disclosure may provide a method of adjusting an implement with an attachment system. The method comprises the steps of: operably engaging the attachment system carrying an implement, an attachment frame assembly, and a flip-up assembly thereon with a tractor; raising the implement, the attachment frame assembly, and the flip-up assembly via a hydraulic motor of the tractor; actuating the flip-up assembly of the attachment system via a first input on a mechanical power source of the tractor; applying a first force, via the mechanical power source of the tractor, to a force generating device of the flip-up assembly; pivoting the implement, via the force generating device, away from a ground surface independent of the frame attachment assembly; and maintaining the implement at a desired angle relative to the frame attachment assembly.

This exemplary embodiment or another exemplary embodiment may further provide a step of operably engaging a removable pin between the implement and the attachment frame assembly when the implement is maintained at an angle relative to the attachment frame assembly. This exemplary embodiment or another exemplary embodiment may further provide steps of actuating the flip-up assembly of the attachment system via a second input on the mechanical power source of the tractor; applying a second force, via the mechanical power source of the tractor, to the force generating device of the flip-up assembly; pivoting the implement, via the force generating device, towards the ground surface independent of the frame attachment assembly; and maintaining the implement substantially parallel to the frame attachment assembly. This exemplary embodiment or another exemplary embodiment may further provide a step of operably engaging a removable pin between the implement and the attachment frame assembly to maintain the implement substantially parallel to the attachment frame assembly. This exemplary embodiment or another exemplary embodiment may further provide that the implement is a flail mower.

In another aspect, an exemplary embodiment of the present disclosure may provide an attachment system for a tractor. The attachment system has a flail mower that has a body; an attachment frame assembly that has a pivot assembly operably engaged with the flail mower; and a striping assembly operably engaged with the flail mower, wherein the striping assembly is adapted to depress a predetermined amount of cut vegetation onto a lawn for creating a striping pattern into the lawn.

This exemplary embodiment or another exemplary embodiment may further provide that the flail mower further comprises an interior chamber defined by the body; wherein the striping assembly is operably engaged to the body inside of the interior chamber; and wherein striping assembly is adapted to depress a predetermined amount of cut vegetation onto a lawn inside of the interior chamber for creating a striping pattern into the lawn. This exemplary embodiment or another exemplary embodiment may further provide that the flail mower further comprises: an interior chamber defined by the body; wherein the striping assembly is operably engaged to the body exterior to the interior chamber; and wherein striping assembly is adapted to depress a predetermined amount of cut vegetation onto a lawn exterior to the interior chamber for creating a striping pattern into the lawn. This exemplary embodiment or another exemplary embodiment may further provide that the flail mower and the striping assembly are moveable relative to the attachment frame assembly via the pivot assembly. This exemplary embodiment or another exemplary embodiment may further provide that the striping assembly is adapted to follow the contour of a ground surface via the rotation of the flail mower and the pivot assembly of the attachment frame assembly. This exemplary embodiment or another exemplary embodiment may further provide that the attachment frame assembly further comprises a first carrier having a first support arm; and a second carrier positioned opposite to the first carrier relative to the implement and having a second support arm; wherein the striping assembly is disposed between the first carrier and the second carrier. This exemplary embodiment or another exemplary embodiment may further provide that the attachment frame assembly further comprises a first coupler operably engaged to the first support arm, wherein the first coupler defines a first U-shaped groove; and a second coupler operably engaged to the second support arm, wherein the second coupler defines a second U-shaped groove. This exemplary embodiment or another exemplary embodiment may further provide that the striping assembly further comprises a roller having a first end, an opposing second end, and a longitudinal axis extending between the first end and the second end; a first shaft extending away from the first end of the roller along the longitudinal axis; and an opposing second shaft extending away from the second end of the roller along the longitudinal axis. This exemplary embodiment or another exemplary embodiment may further provide that the striping assembly further comprises: a first bearing operably engaged to the first coupler; and a second bearing operably engaged to the second coupler. This exemplary embodiment or another exemplary embodiment may further provide that the first bearing is operable to receive and house the first shaft; and wherein the second bearing is operable to receive and house the second shaft. This exemplary embodiment or another exemplary embodiment may further provide that the first bearing operably engages with the first coupler inside of the first U-shaped groove; and wherein the second bearing operably engages with the second U-shaped coupler inside of the second groove. This exemplary embodiment or another exemplary embodiment may further provide that the roller is adapted to rotate about the longitudinal axis inside of the first bearing and the first coupler at the first shaft; and wherein the roller is adapted to rotate about the longitudinal axis inside of the second bearing and the second coupler at the second shaft. This exemplary embodiment or another exemplary embodiment may further provide that a portion the first support arm, a portion of the second support arm, the first coupler, and the second coupler are positioned inside of an interior chamber defined by the body of the flail mower. This exemplary embodiment or another exemplary embodiment may further provide a first adjustment mechanism operably engaged to the first carrier and the first support arm; and a second adjustment mechanism operably engaged to the second carrier and the second support arm. This exemplary embodiment or another exemplary embodiment may further provide that the flail mower and the striping assembly are selectively adjustable by each of the first adjustment mechanism and the second adjustment mechanism. This exemplary embodiment or another exemplary embodiment may further provide that the flail mower further comprises at least one cutting blade operably engaged to the body, wherein the at least one cutting blade is adapted to cut a predetermined amount of vegetation and discharge the predetermined amount of cut vegetation at a point intermediate the at least one cutting blade and the striping assembly. This exemplary embodiment or another exemplary embodiment may further provide that the striping assembly is adapted to create a striping pattern on the predetermined amount of cut vegetation after being discharged by the at least one cutting blade inside of the body of the flail mower.

In another aspect, an exemplary embodiment of the present disclosure may provide another method. The method comprises the steps of: operably engaging a flail mower having a striping assembly therein with an attachment system of a tractor; traversing a ground surface in a first condition with the tractor and the attachment system; cutting a section of lawn from the ground surface via at least one cutting blade of the flail mower; discharging a volume of cut lawn onto the ground surface; depressing the volume of cut lawn onto the ground surface in a first direction via the striping assembly; and creating a striping pattern on the lawn in the first direction.

This exemplary embodiment or another exemplary embodiment may further provide a step of depressing the volume of cut lawn onto the ground surface, via the striping assembly, inside of an interior chamber defined by a body of the flail mower. This exemplary embodiment or another exemplary embodiment may further provide a step of depressing the volume of cut lawn onto the ground surface, via the striping assembly, exterior to an interior chamber defined by a body of the flail mower. This exemplary embodiment or another exemplary embodiment may further provide that the step of discharging the volume of cut lawn onto the ground surface includes the volume of cut grass being discharged at a point intermediate the at least one cutting blade and the striping assembly. This exemplary embodiment or another exemplary embodiment may further provide that the step of traversing a ground surface in a first condition with the tractor and the flail mower includes the flail mower being level with a centerline of the attachment system. This exemplary embodiment or another exemplary embodiment may further provide steps of traversing the ground surface in a second condition; rotating the flail mower and the striping assembly about a longitudinal axis defined by a centerline of the attachment frame assembly from a first position to a second position, wherein the flail mower and the striping assembly is generally horizontal relative to a cross member of an attachment frame assembly in the first position, and wherein the flail mower and the striping assembly is angled relative to the cross member of the attachment frame assembly in response to the change of the ground surface from the first condition to the second condition; and biasing the flail mower and the striping assembly back to the first position with a spring assembly when the level of the ground surface reverts to the first condition. This exemplary embodiment or another exemplary embodiment may further provide steps of traversing the ground surface in a third condition with the tractor along with the flail mower and the striping assembly; and rotating the flail mower and the striping assembly from one of the first position and the second position to a third position wherein the flail mower is angled relative to the cross member of the attachment frame assembly in an opposite direction than the second position.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 11C (FIG. 11C) is a left side elevation operational view of an attachment mechanism according to one aspect of the present disclosure.

FIG. 23 (FIG. 23) is a partial cross-sectional view of the forwardly-mounted implement utilizing the flip-up assembly taken in the direction of line 23-23 labeled in FIG. 21; wherein a force generating device is transitioning the forwardly-mounted implement from an initial, non-pivoted position to a translated, pivoted position.

Similar numbers refer to similar parts throughout the drawings.

DETAILED DESCRIPTION

Figure 1:
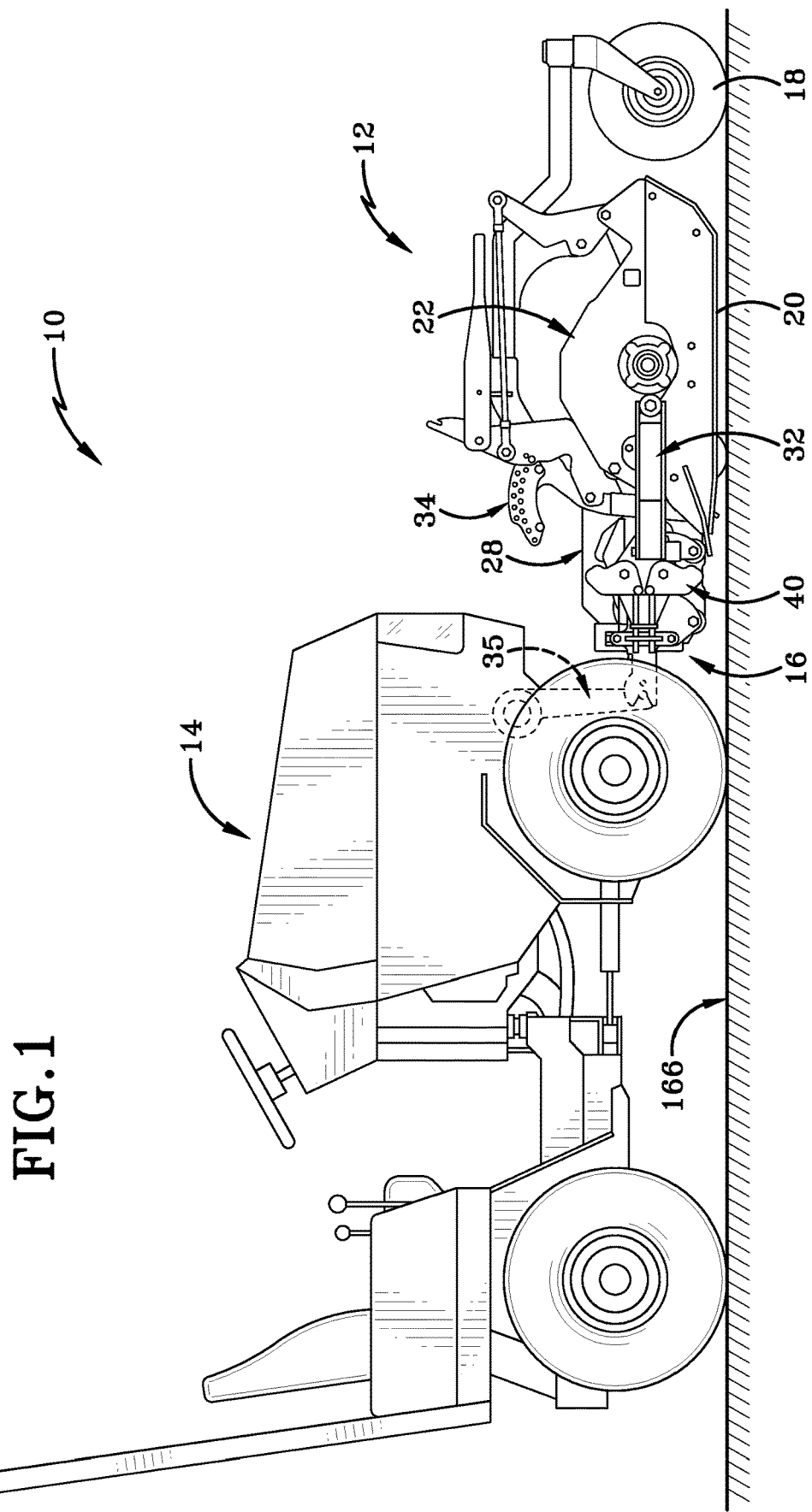
FIG. 1 (FIG. 1) is a side elevation view of a tractor and a forwardly-mounted implement utilizing an attachment mechanism according to one aspect of the present disclosure.

With reference to FIG. 1, an attachment for connecting a forward-driven implement to a tractor is shown and generally indicated at 10. At its most basic, the attachment system 10 includes an implement 12 connected to a tractor 14 using an attachment frame assembly 16.

Figure 2:
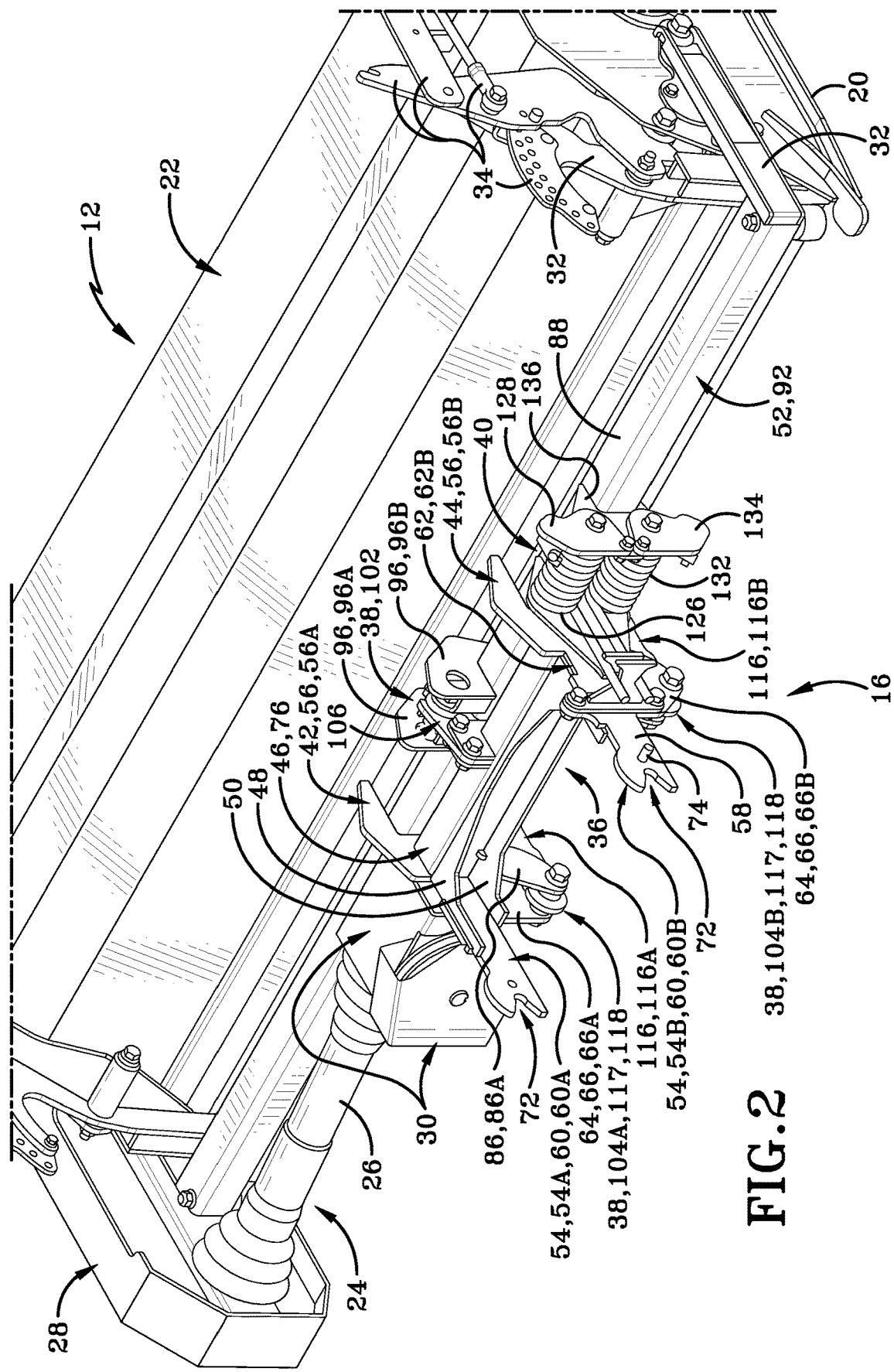
FIG. 2 (FIG. 2) is a top right side isometric perspective view of an implement and attachment mechanism according to one aspect of the present disclosure.

With references to FIGS. 1 and 2, implement 12 may be any implement 12 suitable for connection to a tractor, and although depicted and described herein as a front-driven implement, implement 12 may likewise be attached to a tractor 14 in any suitable position according to the desired implementation. For simplicity and clarity in the disclosure, implement 12 will be described generally as a flail mower; however, the attachment frame assembly 16 may be utilized with any suitable implement as will become apparent herein.

Implement 12 may include at least one ground-engaging member, which may be a wheel, a skid, a ski, or other suitable ground-engaging devices. Such ground-engaging surfaces are depicted and referenced herein as wheels 18 and skids 20. Collectively, these ground-engaging members may define the operational height of implement 12 as discussed further herein. Where implement 12 is a flail mower, wheels 18 and/or skids 20 may be adjusted to set the cut height of the mower, aka the height at which vegetation will be cut by the blades of the flail mower.

Implement 12 may further include a body 22 which may house one or more operational aspects of the implement. For example, where implement 12 is a flail mower, body 22 may house the blades, axles, and/or various drive and operational components. Implement 12 may further include a power system 24 which may be or include a power take-off (PTO) system 24. PTO 24 may further include a driveshaft 26 and other standard drive components, generally indicated at 28. PTO 24 may be powered via connection to one or more systems carried by tractor 14 according to the desired implementation. According to one aspect, PTO 24 may be powered by a belt-driven system, generally shown at reference 30 in FIG. 2. According to another aspect, PTO 24 may be chain-driven, hydraulically powered or may utilize any other suitable power transfer system as dictated by the desired implementation. According to another aspect, PTO 24 may be connected to a separate motor, such as a motor carried by implement 12, to power suitable aspects of implement 12, again as dictated by the desired implementation.

Implement 12 may further include one or more frame components generally indicated at 32 and may further include one or more adjustment mechanisms indicated generally at 34. It will be understood that these components, namely, frame components 32 and/or adjustment mechanisms 34, may vary depending on the type, size, and/or desired operation of implement 12 and may be configured or constructed according to known configurations and/or operation as dictated by the desired implementation and the particulars of any specific implement 12 employed with attachment system 10. It will be further understood that the adjustment mechanisms 34 may include one or more different types of adjustment mechanisms 34 that may allow for any suitable adjustments to implement as desired. According to one non-limiting example, adjustment mechanisms 34 may include operational height adjustment mechanisms as well as any suitable or desired adjustment system to raise or lower implement 12 from a stowed position to a deployed position and vice versa. Adjustment mechanisms 34 are therefore contemplated to include any suitable frame members, attachment mechanisms or fasteners, support members or structures, as well as any necessary and/or suitable adjustment means such as hydraulic cylinders, pneumatic actuators or the like. For purposes of clarity and simplicity in this disclosure, adjustment mechanisms 34 are understood to be included and operate according to known principles and will be omitted from further discussion herein unless specifically stated otherwise. Further, some structures and components described below may include mounting or attachment points for adjustment mechanisms 34 as needed, and will be omitted from discussion for clarity. It will be understood that these mounting and/or attachment points may be modified as necessary.

Frame components 32 of implement 12 may connect or otherwise secure implement 12 to the attachment frame assembly 16, which will be discussed in further detail below. Generally, frame components 32 may include any necessary or desired elements to support implement 12 and its various elements, and may vary in size, type, configuration, placement, and connection as dictated by the type of implement 12 used and the operational and structural needs thereof. Accordingly, as discussed herein, frame components 32 of implement 12 are discussed generally and attachment of other components thereto and removal therefrom may be accomplished by any suitable means, unless specifically stated otherwise.

Tractor 14 is shown in FIG. 1 and generally referenced as a tractor; however, it will be understood that tractor 14 may be any suitable powered vehicle capable of supporting, powering, and/or moving an implement 12 as discussed herein. According to a few non-limiting examples, tractor 14 may be a lawn tractor, a landscape tractor, a skid steer, a truck, an ATV or UTV, or any other suitable vehicle. Tractor 14 may further include a tractor frame 35 including one or more frame components operable to connect to attachment frame assembly 16 as discussed further herein. The components of tractor frame 35 may be standard components and include any suitable members for operable connection to a forward implement. It will be understood that the connection between tractor frame 35 and attachment frame assembly 16 may be accomplished through any suitable or desired means.

Accordingly, reference to tractor frame 35 will be understood to include any suitable components for operable connection to the elements and components of attachment frame assembly 16, unless specifically stated otherwise.

With reference to FIGS. 2-9, attachment frame assembly 16 is shown and will be described in more detail. At its most basic, attachment frame assembly 16 may provide several advantages which will be discussed further with regards to the operation thereof.

Attachment frame assembly 16 may generally include three sections, namely, the mount frame section, or mount frame 36, pivot assemblies 38, and spring assembly 40. Mount frame 36 may have a first side member 42 spaced apart from a second side member 44 and defining therebetween a transverse direction. Mount frame 36 may further include a first cross member 46, an upper transverse support 48 and a lower transverse support 50. Upper transverse support 48 may be spaced apart from lower transverse support 50 and may define a vertical direction therebetween. Mount frame 36 may further include a second cross member 52 which may be generally parallel to first cross member 46 and may extend transversely between the outermost edges or sides of implement 12 as discussed further herein. First and second cross member 46 may be pivotally connected to each other as discussed further below.

Figure 3:
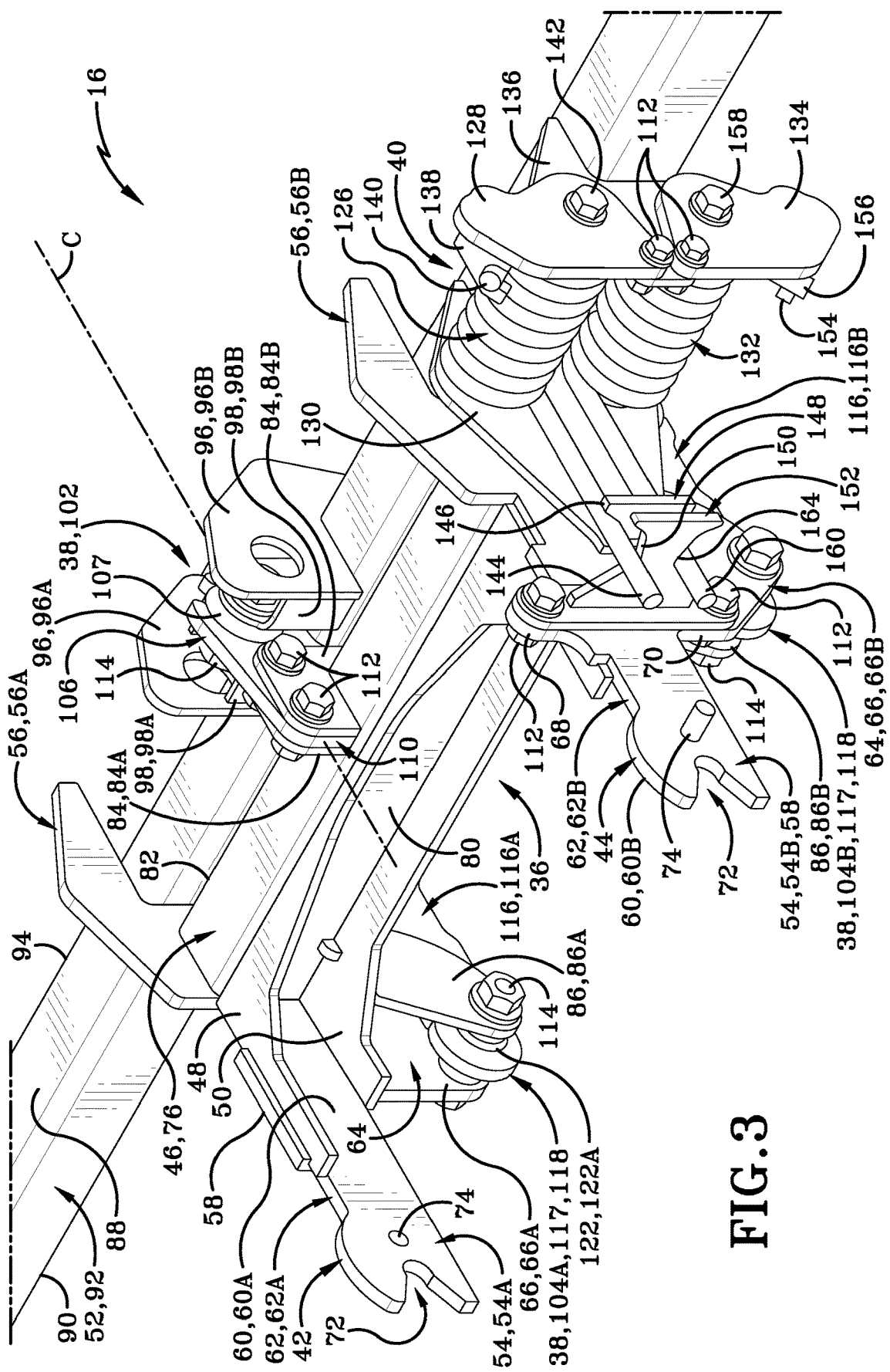
FIG. 3 (FIG. 3) is a top right isometric perspective close-up view of an attachment mechanism according to one aspect of the present disclosure.

Attachment frame assembly 16 may be generally symmetrical about a center line indicated in FIG. 3 as line C, which may extend longitudinally through a midpoint of attachment frame assembly 16, except for spring assembly 40, which may be positioned to one side of attachment frame assembly 16 without a counterpart on the opposite side. Attachment frame assembly 16 may be symmetrical about center line C in that a first side thereof may be a mirror image to a second side thereof, again excluding spring assembly 40. Accordingly, where features or components are substantially similar or identical to their opposite side counterpart, such components will be similarly numbered with the reference letter A (referring to the first side which may be defined as the left side as oriented in FIG. 3) or with the reference letter B (referring to the second side which may be defined as the right side as oriented in FIG. 3). For example, first side member 42 may have a rear arm 54A while second side member 44 may likewise have a rear arm 54B. It will be understood that although first side is indicated and discussed herein as the left side and second side is indicated and discussed herein as the right side given that the majority of components are symmetrical and mirror imaged, either side of center line C could be designated the first or second side. For purposes of clarity, this disclosure will limit its discussion to components on the first side being to the left of center line C (as viewed by an operator of the tractor 14 and as oriented in FIG. 3) and components on the second side being disposed on the right of center line C, unless specifically stated otherwise.

Figure 5:
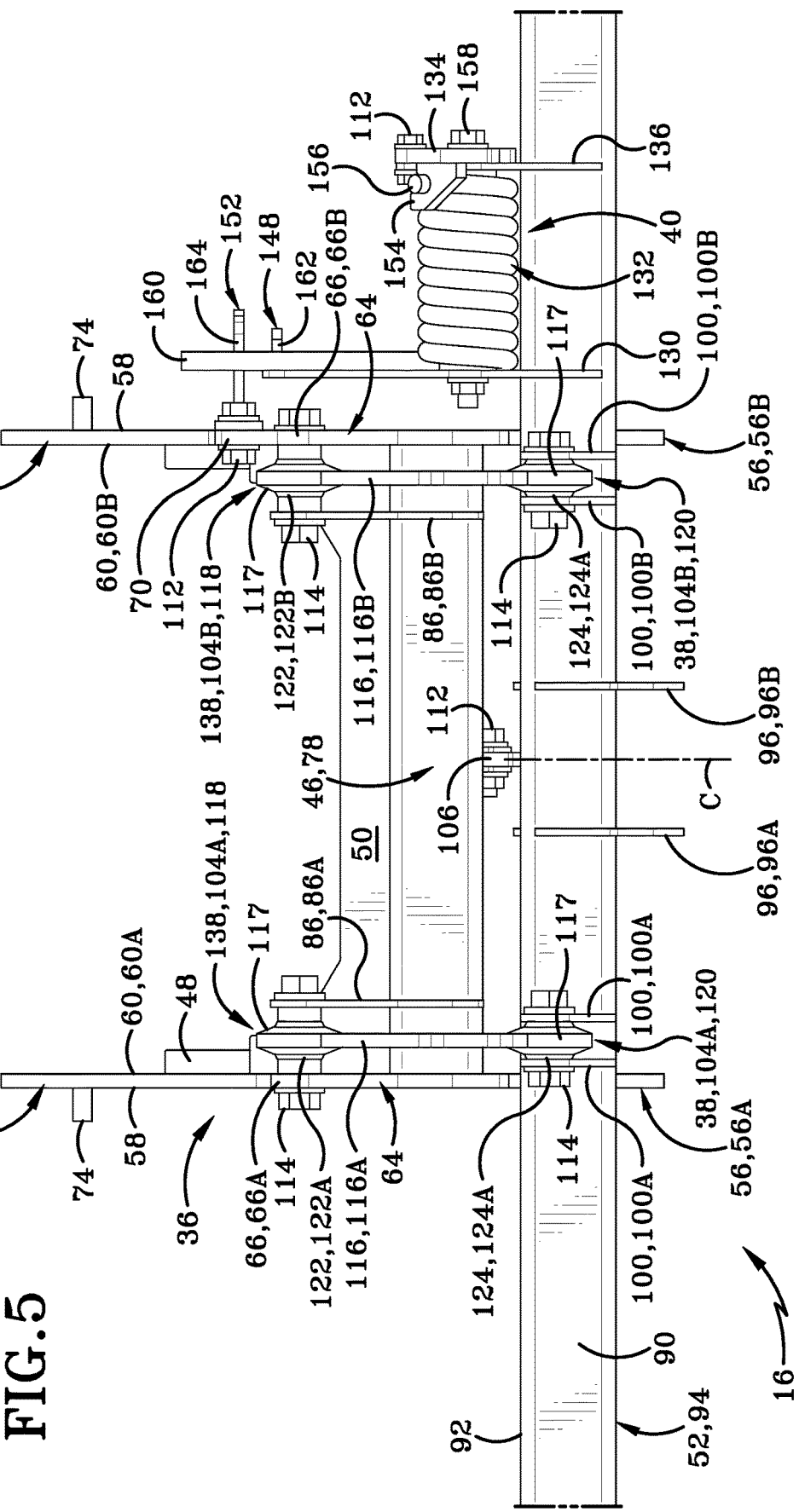
FIG. 5 (FIG. 5) is a bottom plan view of an attachment mechanism according to one aspect of the present disclosure.
Figure 6:
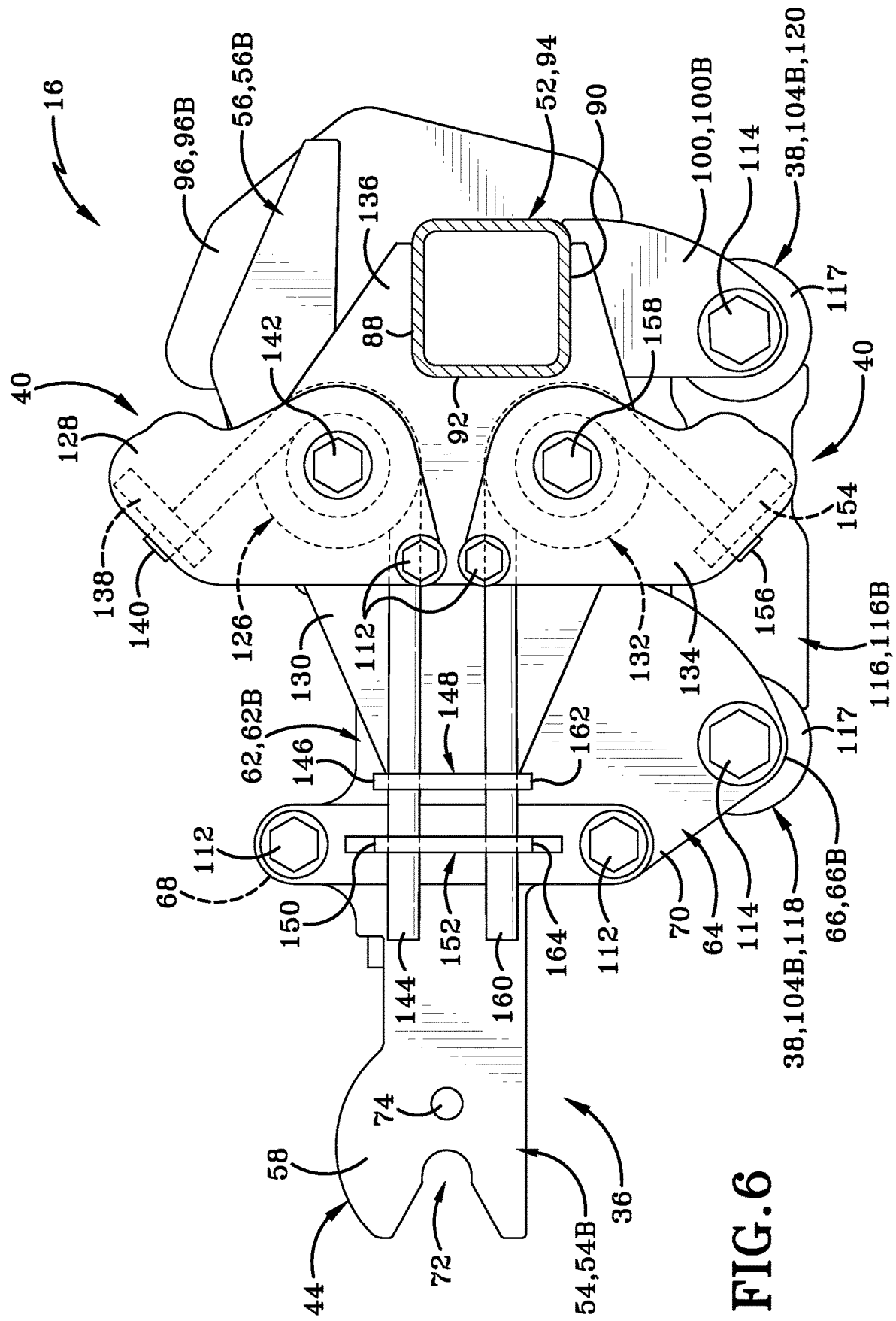
FIG. 6 (FIG. 6) is a right side elevation view looking in the direction of the line indicated in FIG. 4 according to one aspect of the present disclosure.
Figure 7:
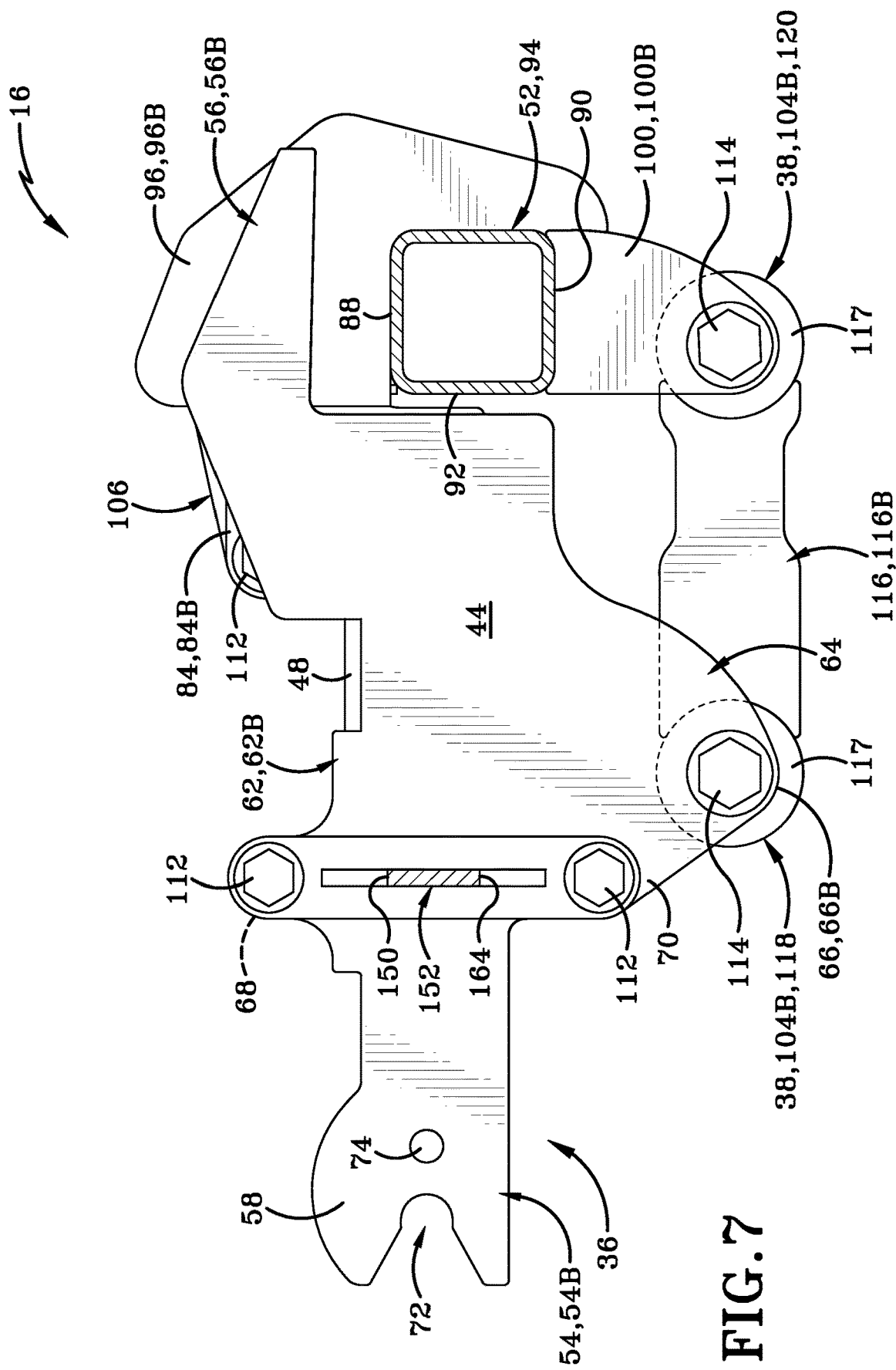
FIG. 7 (FIG. 7) is a right side elevation cross-sectional view looking in the direction of the line indicated in FIG. 4 according to one aspect of the present disclosure.
Figure 8:
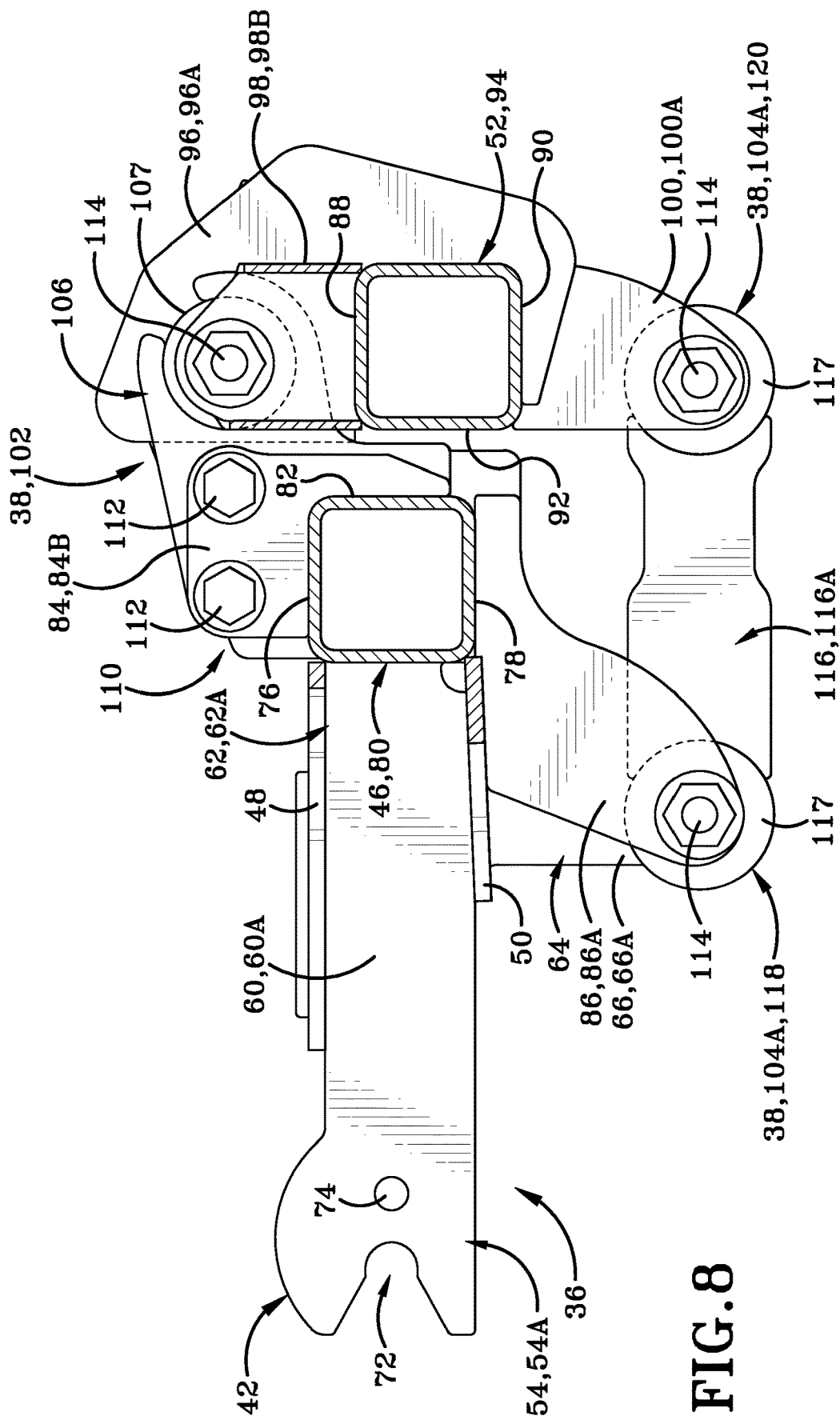
FIG. 8 (FIG. 8) is a right side elevation cross-sectional view looking in the direction of the line indicated in FIG. 4 according to one aspect of the present disclosure.

With continued reference to FIGS. 3-9, but as most easily seen in FIGS. 7 and 8, first and second side members 42, 44 include the rear arm 54, which may generally define the rearward most portion of first and second side members 42, 44, which may otherwise be understood to be the portion closest to tractor 14 and the portion that interacts with tractor frame 35. Rear arm 54 may be spaced apart from a front arm 56 and may define generally therebetween a longitudinal direction, which may be substantially parallel to center line C and substantially parallel to the direction of travel for tractor 14 when connected to an implement 12 via attachment frame assembly 16. Front arm 56 may extend forwardly and over second cross member 52 and may define a rotational maximum for second cross member 52 to prevent damage to implement 12 and to other components of attachment system 10, as discussed further herein. According to one aspect, front arm 56 may allow for a maximum of thirty degrees of rotation to either the left or the right side relative to the horizontal plane P, as discussed below.

First and second side members 42 and 44 may have an outer face 58 which may be generally oriented away from center line C and may have an inner face 60 oriented towards the center line C of attachment frame assembly 16. First and second side members 42 and 44 may further be oriented with front arm 56 at the top 62 of first and second side members 42 and 44. First and second side members 42 and 44 may further include a lower portion, or bottom 64, spaced vertically apart from top 62 which may include a lower pivot mount 66 for operational connection to lower pivot arms 116 as discussed further below. First and second side members 42 and 44 may be constructed of any suitable material including steel or other similar metals, or the like.

Second side member 44 may differ from first side member 42 in placement and orientation within frame 35, but also in the inclusion of upper and lower spring assembly mounts 68 and 70, respectively, for operational connection to second spring stop arm 152, as discussed further below. The upper and lower spring assembly mounts 68, 70 may be omitted from first side member 42 when spring assembly 40 is oriented to the second side of center line C. It will be understood; however, that in applications and/or implementations with spring assembly 40 mounted to the left side of center line C or in applications and/or implementations with more than one spring assembly 40 employed, first side member 42 may be modified or otherwise provided with similar spring assembly mounts 68, 70 as dictated by the specific implementation thereof and as discussed further herein.

First and second side members 42 and 44 may further include a rear mounting slot 72 and mounting pins 74 for use in a standard connection with tractor frame 35 of tractor 14. Both of first and second side members 42 and 44 may further include any shape or configuration for operation connection to the various components and need not be limited specifically to the configuration shown but instead may be modified according to the desired implementation.

First cross member 46 may extend laterally or transversely between first and second side members 42 and 44 and may include any suitable mounting hardware, as needed, to connect first cross member 46 to the inner faces 60A and 60B of first and second side members 42, 44, as needed. According to one aspect, first cross member 46 may be welded to the inner faces 60A, 60B of side members 42, 44. According to another aspect, first cross member 46 may be connected to side members 42 and 44 through any other suitable means, including but not limited to bolts, screws, rivets or the like. Alternatively, first cross member 46 may be integrally formed with first and second side members 42 and 44.

According to one aspect, first cross member 46 may be tubular with a square cross section as depicted in FIG. 8. According to another aspect, first cross member 46 may be formed from multiple separate components and/or may be a single member with any suitable cross section. Where first cross member 46 is chosen as a tubular member having a square or substantially square cross section, first cross member 46 may include a top face 76 spaced vertically apart from a bottom face 78 and a rear face 80 spaced longitudinally apart from a front face 82.

First cross member 46 may also include upper mounting flanges 84A and 84B extending upwards from top face 76, with upper mounting flange 84A just to the left of center line C and upper mounting flange 84B disposed just to the right of center line C such that center line C may pass between upper mounting flanges 84A and 84B. Upper mounting flanges 84A and 84B may be affixed to one or more of top face 76, front face 82, and/or bottom face 78 of first cross member 46 and may provide an attachment point to center pivot linkage 106, as discussed further below.

First cross member 46 may likewise include lower mounting arms 86A and 86B, which may extend downwards from bottom face 78 of first cross member for operational attachment to lower pivot mount 66A and 66B and lower pivot linkages 116A and 116B, as discussed further herein.

Upper and lower transverse supports 48 and 50 may be further connected to first cross member 46 and may extend between first and second side members 42 and 44 to provide support and additional structural integrity for first cross member 46 and first and second side members 42 and 44. According to one aspect, upper transverse support 48 may extend rearwardly from first cross member 46 and may be affixed through welding, adhesives, or any suitable attachment means to the rear face 80 of first cross member 46 and may be substantially planar with the top face 76 of first cross member 46. Upper support 48 may also be connected to or rest on top 62A and 62B of first and second side members 42 and 44, or alternatively may be affixed or connected to infer faces 60A and 60B thereof. Upper support 48 may be affixed or connected to first and second side members 42, 44 through any suitable means including welding, adhesives, bolts, rivets, screws, or any other suitable attachment mechanism.

Similarly, lower transverse support 50 may extend rearwardly from first cross member 46 and may be generally planar with the bottom face 78 of first cross member 46. As with upper support 48 and lower support 50 may be likewise affixed or otherwise attached to first and second side members 42 and 44 through any suitable means including welding, adhesives, bolts, rivets, screws, or any other suitable attachment mechanism. According to one aspect and as shown in the figures, upper and lower transverse supports 48 and 50 may be welded to first and second side members 42 and 44 and first cross member 46 which may include additional supports or welding points for structural integrity thereof.

Second cross member 52 may run substantially parallel to first cross member 46 and may likewise be formed as a tube having a square cross section. It will be similarly understood, however, that second cross member 52 may have any suitable shape and/or cross section. Second cross member 52 may be laterally symmetrical about center line C and may extend beyond the first and second side members 42 and 44, extending out to the outermost edges of implement 12. Where implement 12 is a flail mower, second cross member 52 may substantially define the back end of the flail mower.

Second cross member 52 may have a first end, which may be a left end, i.e. to the left of center line C and a second end, which may be a right end, for operational attachment to one or more frame components 32 of implement 12. According to one aspect, second cross member 52 may attach to frame components through removable means, as best seen in FIG. 2, such as bolts or the like. According the another aspect, second cross member 52 may be more permanently attached to frame components 32 of implement 12 such that second cross member 52 could be considered to be one of the frame components 32 of implement 12 and may attach and detach from mount frame 36 or, more particularly, from first cross member 46 as discussed further herein. According to this aspect, each implement 12 to be utilized with this attachment system 10 may have a separate second cross member 52 attached to a rearward end therefrom for operable attachment to and detachment from frame 16 and first cross member 46, as desired.

For purposes of this disclosure, second cross member 52 is depicted and described as a length of tubular steel having a square cross section (as best seen in FIGS. 6-9) which, again, is intended as a non-limiting example. According to this aspect, second cross member 52 may therefore have a top face 88 spaced vertically apart from a bottom face 90 and a rear face 92 spaced longitudinally apart from a front face 94. The length of cross member 52 may be determined based on the operational width of the implement 12 being used therewith and may vary according to the operational needs thereof.

Second cross member 52 may have upper mounting plates 96A and 96B, which may be affixed or attached to one or more of the top face 88, bottom face 90, and/or front face 94 of second cross member 52. Upper mounting plates 96 may be sized and configured to operably connect to upper pivot assembly 102, as discussed further below. Upper mounting plate 96A may be the mounting plate to the left of center line C while upper mounting plate 96B may be to the right of center line C. As best seen in FIG. 3, mounting plates 96A and 96B may be placed slightly further away from center line C than upper mounting flanges 84A and 84B of first cross member 46 such that mounting plates 96A and 96B are laterally outside of mounting flanges 84A and 84B. Mounting plates 96 may include a substantially U-shaped bracket 98 extending inwardly towards center line C which may further facilitate operable connection with upper pivot assembly 102, as discussed below. Brackets 98 may extend inwardly towards center line C such that the bottom of the U-shaped bracket 98 provides a mounting plane which is parallel to and substantially planar to mounting flanges 84A and 84B. This substantially shared plane may allow for proper alignment of pivot assembly 102 components.

As best seen in FIGS. 5 and 6, second cross member 52 may further include lower mounting arms 100 similar to mounting arms 86 (extending downward from bottom face 90 thereof). Specifically, lower mounting arms 100 may be arranged in pairs and affixed to and extended downward from second cross member 52 for operational connection to lower pivot assemblies 104A and 104B, and may be affixed or otherwise attached to bottom face 90 of second cross member 52 through any suitable means such as welding, adhesive, or other similar attachment methods.

Included in attachment frame assembly 16 are three pivot assemblies 38 namely, upper pivot assembly 102 and two lower pivot assemblies 104A and 104B. As discussed below, pivot assemblies 38 may work in unison to allow pivotal movement of second cross member 52 relative to first cross member 46 about substantially central and longitudinal axis generally defined by center line C. This rotation about this longitudinal axis may allow implement 12 to have vertical and lateral movement relative to first cross member 46.

Figure 4:
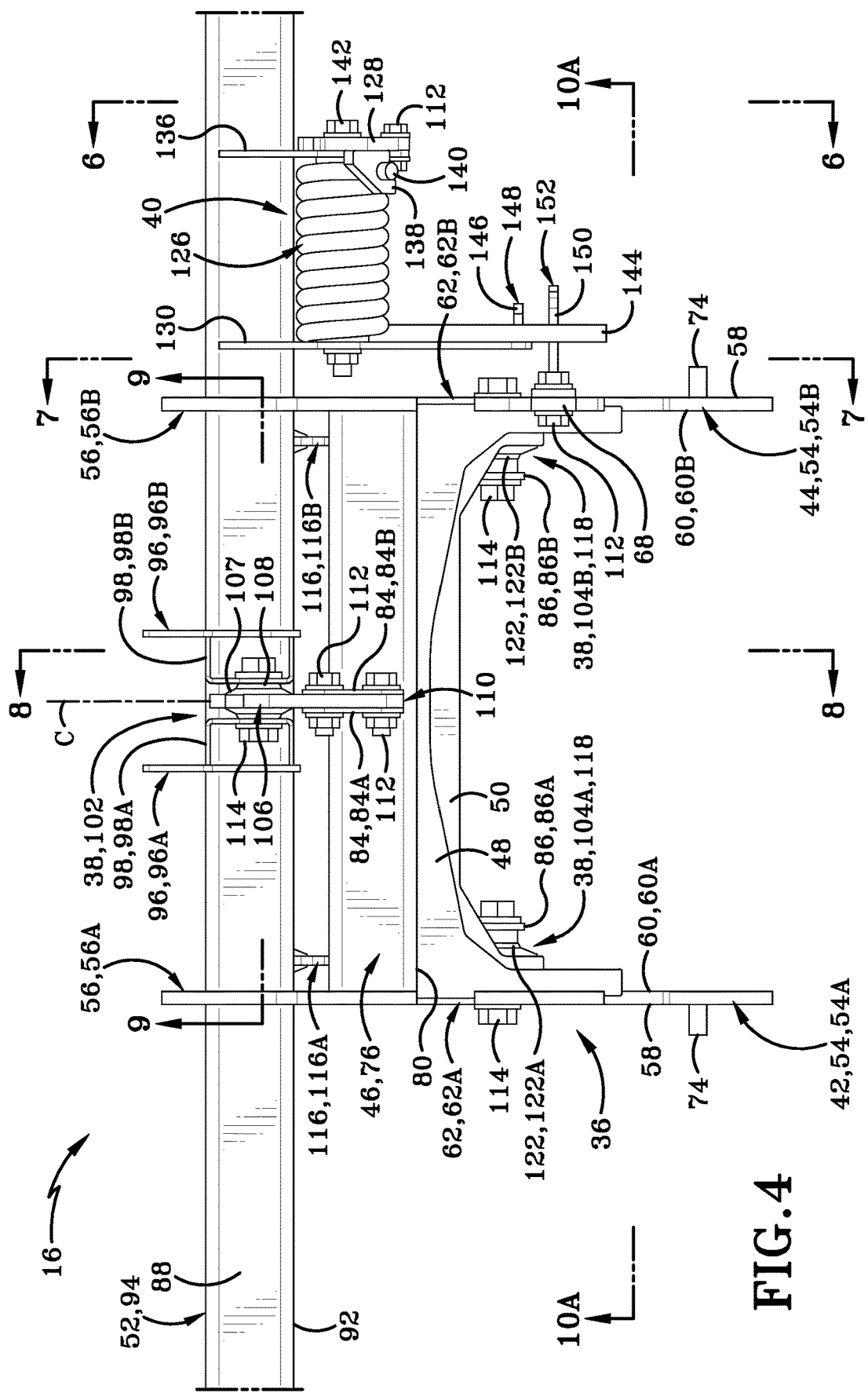
FIG. 4 (FIG. 4) is an overhead plan view of an attachment mechanism according to one aspect of the present disclosure.
Figure 9:
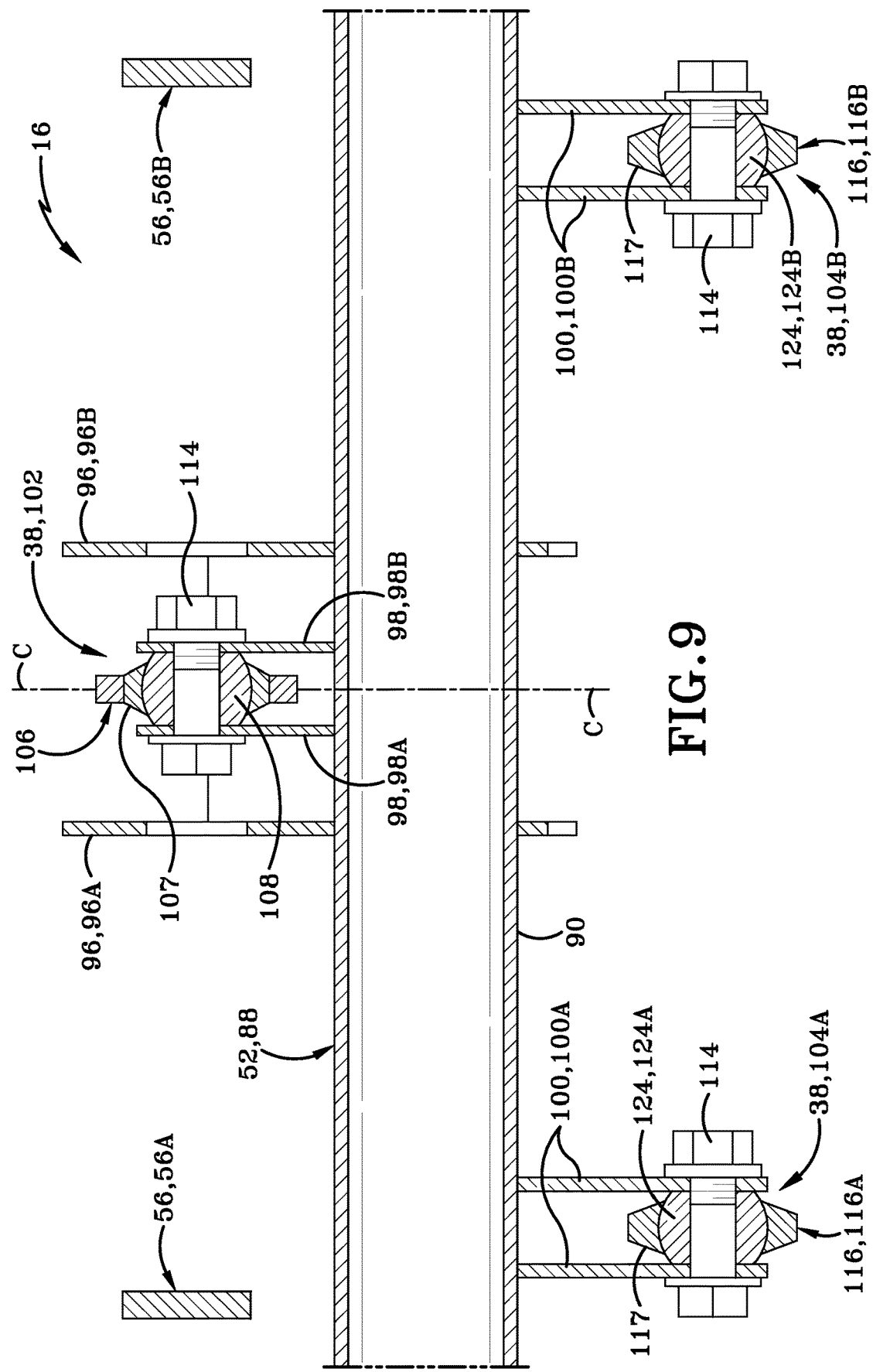
FIG. 9 (FIG. 9) is a rear elevation cross-sectional view looking in the direction of the line indicated in FIG. 4 according to one aspect of the present disclosure.

Upper pivot assembly 102 may be best seen in FIGS. 3, 4, and 9 and may include an upper pivot linkage 106 and an upper pivot ball 108. Pivot linkage 106 may be a longitudinally extending plate that may be secured on a rearward end 110 between upper mounting flanges 84A and 84B and secured in place therein by any suitable means including by bolts 112, as shown in the figures, or by any other suitable mechanism. According to another aspect, pivot linkage 106 may be welded and/or integrally formed with upper mounting flanges 84A and 84B as to constitute a single piece unit. Pivot linkage 106 may then extend forward and above second cross member 52 and may have a housing 107 formed in or fixed thereto that may contain upper pivot ball 108 therein. Housing 107 may be integrally formed with linkage 106, or may alternatively be fixedly connected thereto via welding or any other suitable attachment mechanism. Therefore, as used herein, further reference to pivot linkage 106 is understood to include housing 107 therewith, unless specifically stated otherwise. Upper pivot ball 108 may then be aligned with brackets 98A and 98B and secured thereto with a pivot bolt 114. Bolts 112 may differ from pivot bolts 114 in that bolts 112 may be designed or employed for securing two components together with no movement therebetween while pivot bolts 114 may be designed for securing a pivot ball such as upper pivot ball 108 or lower rear and front pivot balls 122 and 124 (discussed below) while not impeding or otherwise affecting the rotational movement thereof.

Upper pivot ball 108 may be a standard and commercially available hitch ball that may be secured within housing 107 in the pivot linkage 106 through known means including a tensioning screw or lock screw (not shown) or through any other suitable mechanism. According to one aspect, pivot ball 108 may be a ball joint commercially available from Danuser Machine Company or other similar type ball joints. Movement of pivot ball 108 within housing 107 of pivot linkage 106 may allow for partial rotational movement transverse to pivot linkage 106 and housing 107, as discussed herein with reference to the movement of implement 12 and second cross member 52 relative to first cross member 46.

With continued reference to FIGS. 3-9, but as best seen in FIGS. 5-9, lower pivot assemblies 104A and 104B may be substantially similar to each other (but for their placement in mount frame 36) and may include a lower pivot linkage 116, with 116A representing the lower pivot linkage 116 to the left of center line C and connected to first side member 42 and with 116B representing the lower pivot linkage 116 to the right of center line C and connected to second side member 44. Lower pivot linkages 116A and 116B may be rigid or semi-rigid and may extend longitudinally from a rearward end 118 (closest to the tractor 14) to a forward end 120 (furthest from the tractor 14). Lower pivot linkages 116A and 116B may include a housing 117 at each end 118 and 120 thereof connecting linkages 116A and 116B to a lower rear pivot ball 122 and a lower front pivot ball 124, respectively. As with linkage 106 and housing 107, lower linkages 116A and 116B may be integrally formed with housings 117 at each end, or may alternatively be fixedly connected thereto via welding or any other suitable attachment mechanism. Similarly, as used herein, further reference to pivot linkages 116A and 116B are understood to include housings 117, unless specifically stated otherwise. Rear and front pivot balls 122 and 124 may be substantially identical to each other and to upper pivot ball 108 of the upper pivot assembly 102 but for their location within pivot assemblies 38 and/or attachment frame assembly 16 overall.

Lower pivot linkages 116A and 116B may be sized such that rear pivot balls 122A and 122B may be aligned between the lower pivot mounts 66A and 66B of first and second side members 42 and 44 and the lower mounting arms 86A and 86B extending downward from first cross member 46, as previously discussed herein. Rear pivot ball 122 and lower pivot linkage 116 may then be secured in position by pivot bolts, such as pivot bolts 114 or the like.

Similarly, lower pivot linkages 116A and 116B may extend forward such that the front pivot ball 124 may be aligned with and between lower mount arm pairs 100A and 100B extending downward from second cross member 52 and may be secured therein via pivot bolts 114. This configuration, as best seen in FIG. 5, allows for pivot linkages 116 to be placed between first and second side members 42 and 44 closer to center line C while both allowing pivotal movement of second cross member 52 relative to first cross member 46 while also helping to support attachment frame assembly 16 for a more secure attachment between first and second cross members 46 and 52.

Lower pivot linkages 116 may permit rotational movement of second cross member 52 and implement 12 as discussed further herein, but may further limit or prevent movement in other directions. For example, the rigid nature of lover linkages 116 may prevent front-to-back or side-to-side movement of second cross member 52 and implement 12, while still allowing rotational movement about the pivot axis defined by centerline C, as discussed herein.

As previously discussed herein, the elements and components of attachment frame assembly 16 described up through this point in the disclosure may be generally symmetrical and/or mirror-imaged about center line C but for spring assembly 40, which may be placed to one side of center line C. As depicted in the figures and discussed herein, spring assembly 40 may be located to the right of center line C, outside of second side member 44. However, it will be understood that the positioning of spring assembly 40 could be reversed such that spring assembly 40 may be located to the left of center line C in a similar position outside of first side member 42. According to another aspect, where desired or advantageous, a second spring assembly 40 may be provided such that two spring assemblies 40 may be employed to either side of center line C. Therefore, the following discussion of such spring assembly 40 may be understood to be applicable to any configuration including configurations with a single spring assembly 40 as disposed on either side of center line C, or in configurations employing more than one spring assemblies 40. According to one aspect, where implement 12 includes a PTO system 24, as shown in the figures, the weight of that PTO system 24 may be offset wholly or in part but the placement of spring assembly 40 on the opposite side of implement 12. For example, where implement 12 is a flail mower having a PTO system 24 on the left side thereof, the placement of the spring assembly 40 on the right side thereof may further facilitate the weight balance about centerline C to keep implement level during transport and operation.

Spring assembly 40 may be, at its most basic, a biasing mechanism, which may bias the second cross member 52, and therefore implement 12, into a substantially level orientation wherein top face 88 of second cross member 52 is substantially coplanar with top face 76 of first cross member 46. As discussed further below, in relation to the operation of attachment system 10, the biasing force of spring assembly 40 ensures that rotational movement of second cross member 52 and thereby implement 12 only occurs when sufficient forces act upon implement 12 as to overcome the biasing force, thus reducing unwanted bouncing and/or unintentional rotation thereof.

Accordingly, spring assembly 40 may include an upper spring 126, an upper spring mount 128, a side plate 130, a lower spring 132, and a lower spring mount 134. Upper and lower spring mounts 128, 134 may be connected to a spring mount plate 136.

Upper spring 126 may be any suitable spring, such as a torsion spring, and may be coiled around a centrally located upper spring bolt 142, which may substantially define a pivot axis about which upper spring 126 may rotate when force is applied. Upper spring mount 128 may further include an upper spring catch flange 138 which may interact with a first leg 140 of upper spring 126. A second leg 144 of upper spring 126 may then extend rearwardly from the upper spring 126 coil and may interact with a top edge 146 of first spring stop arm 148 and a top edge 150 of second spring stop arm 152. The combination of first and second spring stop arms 148, 150, and the upper spring catch flange 138 may keep the legs 140, 144 of upper spring 126 under tension to provide downward biasing force to the second cross member 52 and implement 12. This downward biasing force may be in the rotational direction opposite arrows AA, BB, and CC shown in FIGS. 11A-11C.

Similarly, lower spring 132 may be any suitable spring, such as a torsion spring, and may be coiled around a centrally located lower spring bolt 158, which may substantially define the pivot axis about which lower spring 132 may rotate when force is applied. Lower spring mount 134 may further include a lower spring catch flange 154 which may interact with a first leg 156 of lower spring 132. A second leg 160 of lower spring 132 may then extend rearwardly from the lower spring 132 coil and may interact with a bottom edge 162 of first spring stop arm 148 and a bottom edge 164 of second spring stop arm 152. The combination of first and second spring stop arms 148, 150, and the lower spring catch flange 154 may keep the legs 156, 160 of lower spring 132 under tension to provide upward biasing force to the second cross member 52 and implement 12. This upward biasing force may be in the rotational direction opposite arrows DD, EE, and FF shown in FIGS. 12A-12C.

Spring assembly 40 may be carried by second cross member 52 such that side plate 130 and spring mount plate 136 may be welded or otherwise attached to one or more of top face 88, rear face 92 and/or front face 94 of second cross member 52 for support thereof. Upper and lower spring bolts 142 and 158 may then be operable to connect upper spring mount 128, lower spring mount 134 and spring mount plate 136 to side plate 130 while also extending through the coils of upper and lower springs 126 and 132 to secure upper and lower springs 126, 132 in position between the spring mounts 128, 134 and side plate 130. Additional bolts or attachments may be provided to further secure spring assembly 40 together. For example, as depicted in FIG. 3, additional bolts 112 may be employed to further secure spring mounts 128, 134 to spring mount plate 136.

Side plate 130 may then extend rearwardly from second cross member 52 and may include first spring stop arm 148 thereon, such that side plate 130 and first spring stop arm 148 may form an integral unit. Other than second spring stop arm 152, spring assembly 40 may be entirely disconnected from mount frame 36 and/or pivot assemblies 38 but for the interaction of upper and lower springs 126 and 132 with second spring stop arm 152. Second spring stop arm 152 may be disconnected from the remainder of spring assembly 40 in that it may be attached to, or otherwise carried by, outer face 60B of second side member 44 at the upper spring assembly stop mount 68 and lower spring assembly top mount 70, as discussed previously herein.

As discussed further below in more detail, the interaction of second arm 144 of upper spring 126 and second arm 160 of lower spring 132 with first and second spring stop arms 148 and 152 may provide the aforementioned biasing force to attachment frame assembly 16.

Having thus described the elements and components of attachment system 10, the operation and advantages thereof will not be discussed.

With reference to FIG. 10A through FIG. 12C, attachment system 10 is shown in various operational configurations. At its most basic, attachment system 10 provides a longitudinal pivot axis that is generally defined by the center line C of attachment frame assembly 16. This central axis is parallel to and generally defines the direction of travel for tractor 14 with implement 12 and attachment frame assembly 16 connected thereto.

With current or previous systems, when tractor is operated on a substantially even or flat ground surface, an implement attached thereto would remain horizontally level and may follow the ground; however, in such prior systems, when the ground surface is uneven or slanted, these current implements maintain their level orientation relative to tractor, not relative to ground. Accordingly, when the ground surface is slanted or uneven, one side of an implement connected thereto may be operated at a different height relative to the ground surface, which may cause an uneven application of the implement. Where the implement is, as discussed herein, a flail mower (or other mowing attachment), this may result in uneven cut height and/or damage to the ground surface as the current systems do not allow for horizontal adjustment. According to one simplified example, where the ground surface is sloped downwards right to left from the perspective of the operator of the tractor, a current system would provide that the right of the implement would remain in contact with the ground surface while the left side may raise up and may no longer contact the ground surface. Accordingly, current systems either result in uneven application of the implement, or alternatively tend to require multiple passes from multiple angles on uneven or sloped terrain to achieve a uniform application and result. Multiple passes; however, require additional time, expense, and danger as the additional passes and angles increase the chance of an accident occurring due to the uneven terrain and the number of times that terrain must be traversed.

With the attachment system 10 of the present disclosure, an implement 12 may be operated to more closely follow or track the terrain on which it is being used to provide a more consistent and level application of the implement regardless of the level and/or slope of that terrain.

Figure 10A:
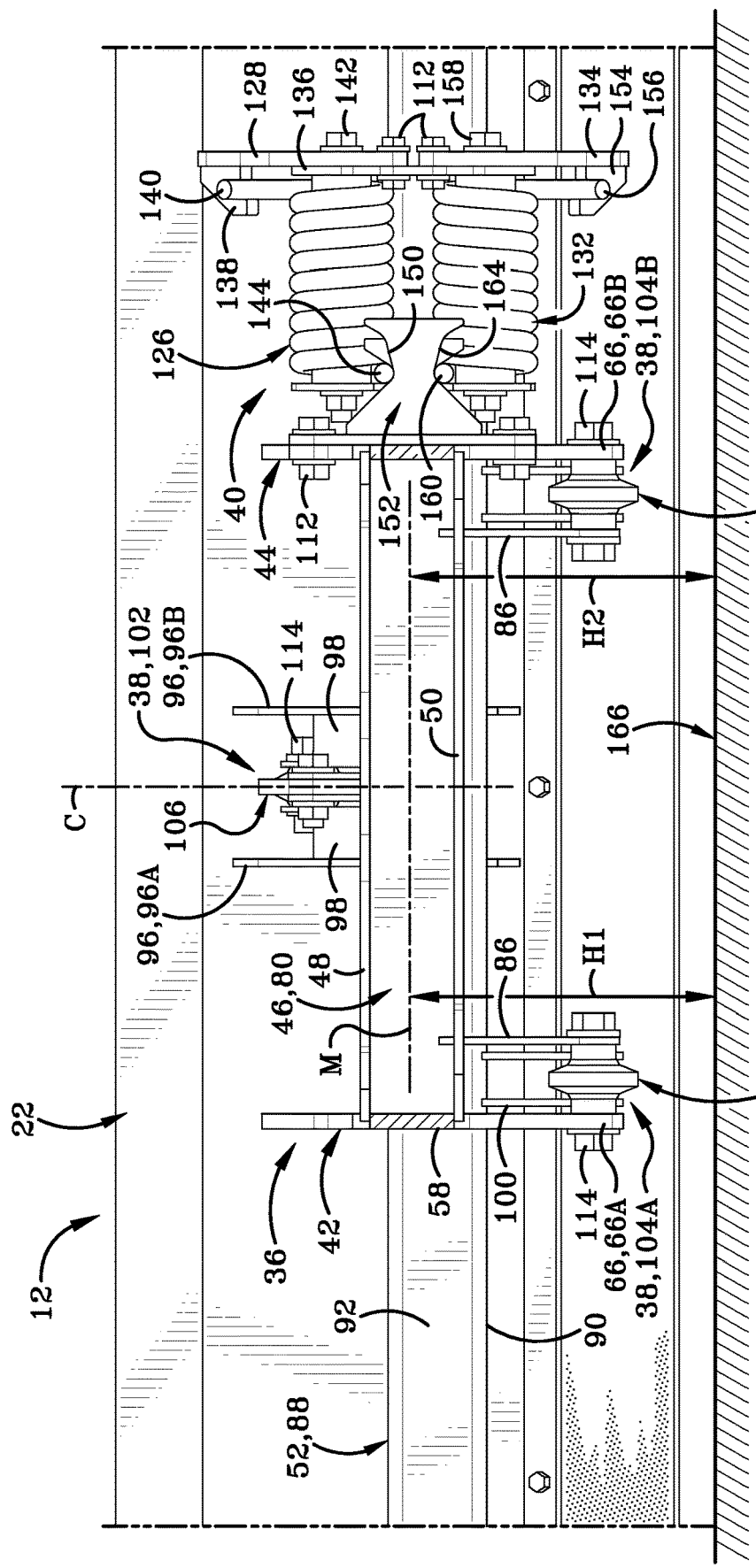
FIG. 10A (FIG. 10A) is a rear partial cross-sectional view looking in the direction of the line indicated in FIG. 4 according to one aspect of the present disclosure.
Figure 10B:
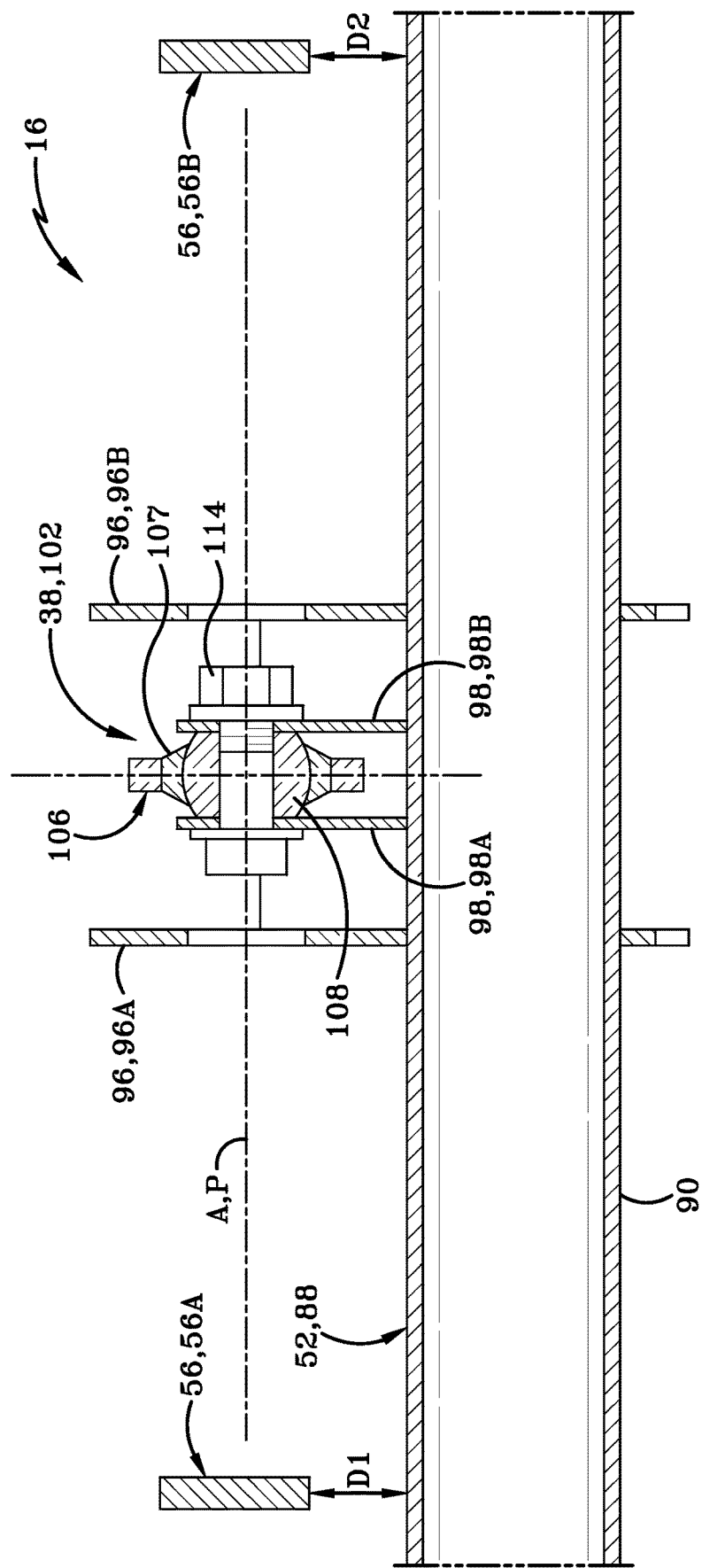
FIG. 10B (FIG. 10B) is a rear cross-sectional operational view of a pivot assembly of an attachment mechanism according to one aspect of the present disclosure.

With reference then to FIG. 10A and FIG. 10B, when operated on a level and even surface, implement 12 may be generally maintained in a horizontal and level position by spring assembly 14. This generally horizontal or level position may be a first position of the implement 12 and is based on the position of an imaginary midline M that laterally bisects first cross member 46, as seen in the figures, to the ground surface 166 on which the implement 12 is being operated, and not relative to the tractor 14. Specifically, the horizontal position is considered when the height H1 of the midline M relative to the ground surface 166 on the left side of first cross member 46 is equal to height H2 relative to the ground surface 166 on the right side thereof, as best seen in FIG. 10A.

As best seen in FIG. 10B, a horizontal axis A defined by pivot bolt 114 in upper pivot assembly 102 may be substantially parallel to the midline M of first cross member 46. Further, the distance D1 between the top face 88 of second cross member 52 and the forward arm 56A of first side member 42 is equal to the distance D2 between the top face 88 of second cross member 52 and the forward arm 56B of second side member 44 when in this first position.

In the horizontal first position in particular, upper spring 126 may be positioned to provide biasing force on the top edges 146 and 150 of first and second spring stop arms 148 and 152, respectively. This may maintain the top edges 146 and 150 in generally a level position wherein the top edges 146 and 150 are substantially positioned in the same plane. Likewise, lower spring 132 may provide biasing force to the bottom edges 162 and 164 of first and second spring stop arms 148 and 152, respectively. Again, biasing these spring stop arms 148 and 152 into a position wherein the bottom edges 162 and 164 thereof are aligned and generally co-planar. Thus, in this position, both first and second cross members 46 and 52 are generally parallel and level relative to each other while upper pivot ball 108 is maintained in a generally level position.

Figure 11A:
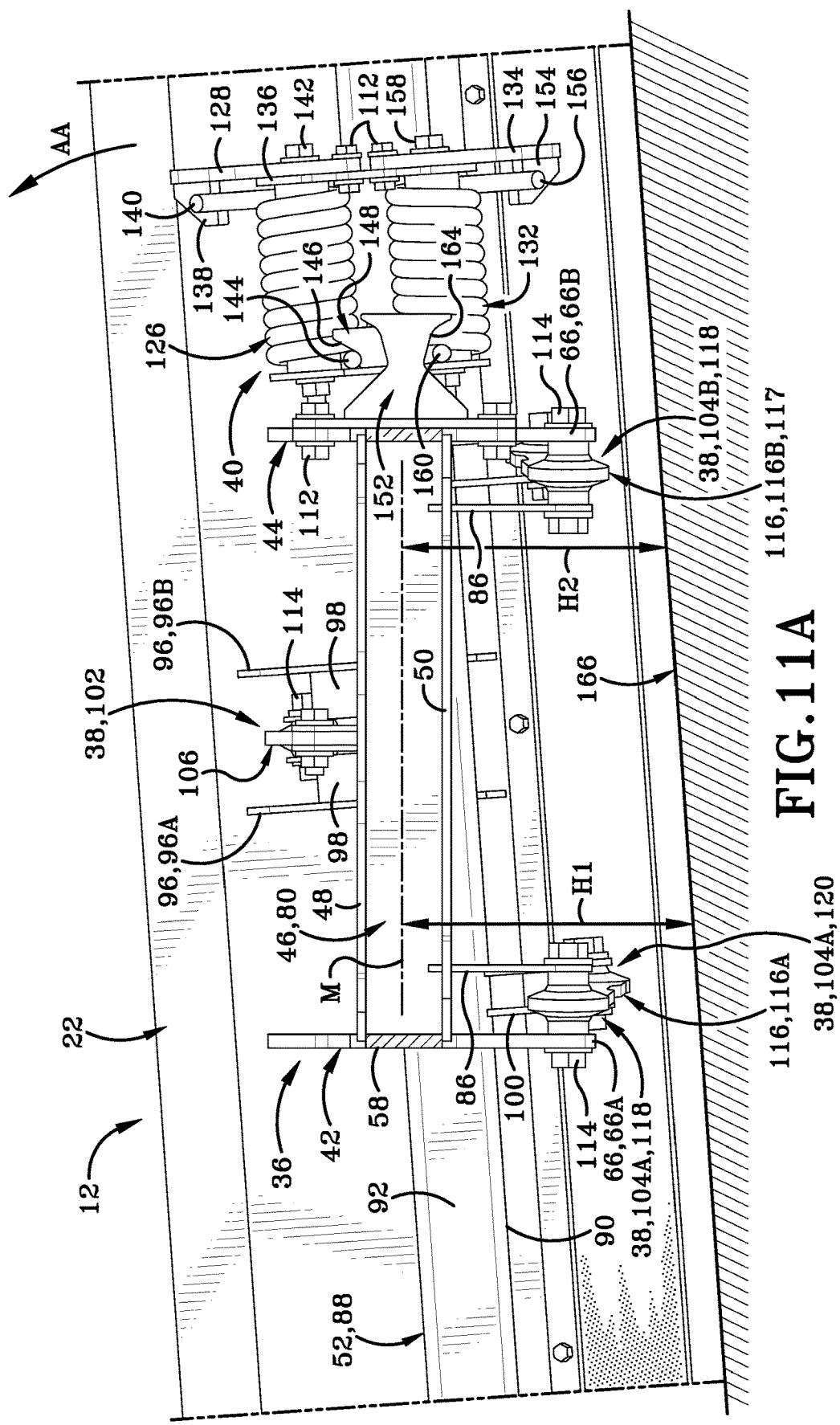
FIG. 11A (FIG. 11A) is a rear elevation operational view of an attachment mechanism according to one aspect of the present disclosure.
Figure 11B:
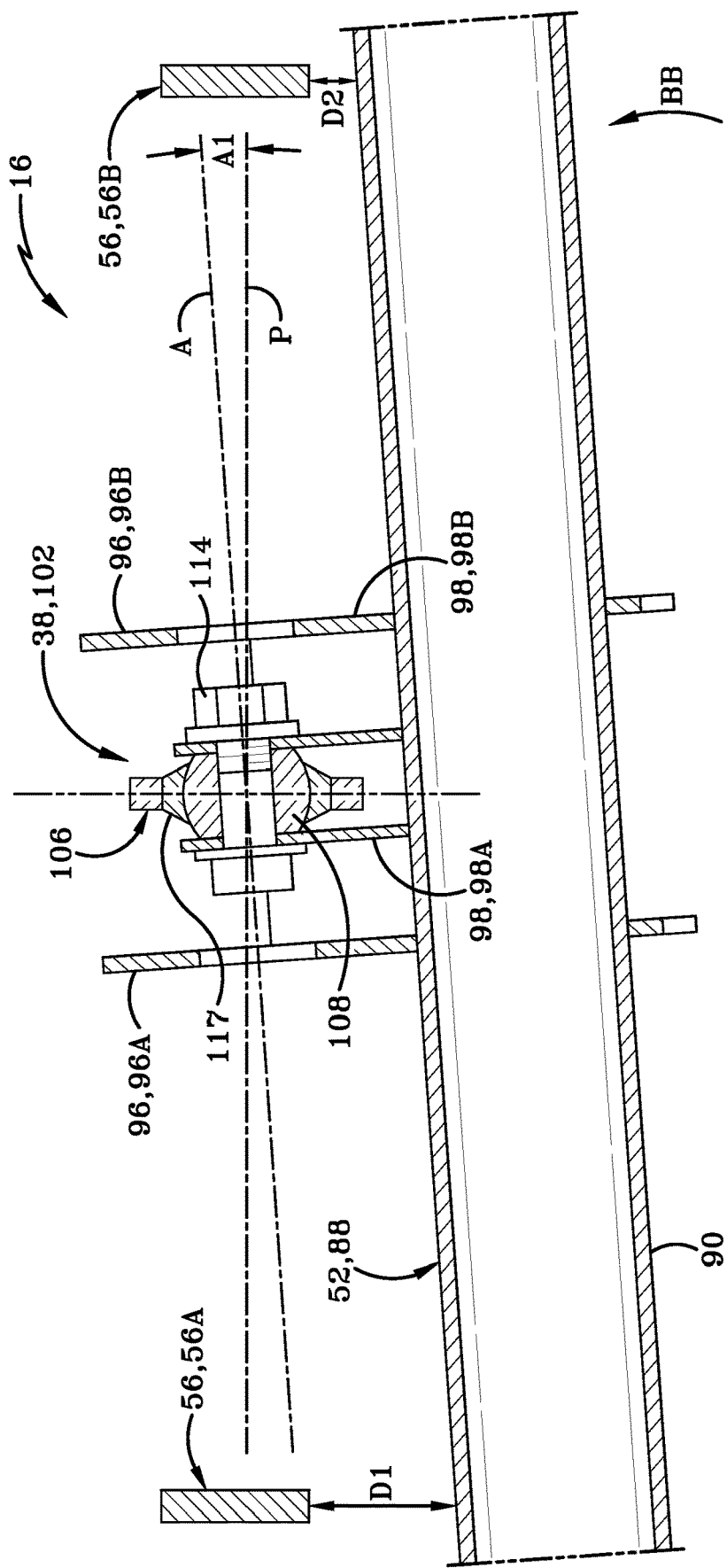
FIG. 11B (FIG. 11B) is a rear cross-sectional operational view of a pivot assembly of an attachment mechanism according to one aspect of the present disclosure.

With reference to FIG. 11A through FIG. 11C, when the implement 12 is operated on a slope or on uneven ground wherein the right side (again from the perspective of the operator on tractor 14) is higher than the left side of implement, the ground surface may cause force to be applied to the right side wheel 18 and/or skids 20 of implement 12, thus driving the right side up in the direction of arrow AA as seen in FIG. 11A. In this configuration, the right side of implement 12 may be raised while causing the left side of implement 12 to be lower relative to the tractor 14; however, relative to the ground surface, the height H1 of midline M of first cross member 46 is larger than height H2, thus providing that first cross member 46 is angled relative to the ground surface 166, while second cross member 52 (and thereby implement 12) maintains contact with and is level relative to the ground surface 166. Put another way, second cross member 52 and implement 12 track the ground surface while the first cross member 46 remains fixed relative to the tractor 14. In this position, which may be a second position of the implement 12, the second cross member 52 may likewise be angled relative to the first cross member 46.

As best seen in FIG. 11B, horizontal axis A defined by pivot bolt 114 in upper pivot assembly 102 may now be angled in a first direction relative to midline M of first cross member 46. This angle (represented by angle A1 defined above plane P, representing a parallel plane to midline M) may vary depending upon the slope of the ground surface 116, with the maximum angle being defined by the position of forward arm 56B in this first direction. According to one aspect, angle A1 may have a maximum value of thirty degrees above the horizontal plane P. According to another aspect, angle A1 may be any value between zero and approximately thirty degrees above the horizontal plane P, as defined by the placement of forward arm 56B and the amount of upwards force applied to the right side of implement 12. When implement 12 and second cross bar 52 are rotated as shown in FIGS. 11A-11C, the distance D1 between the top face 88 of second cross member 52 and the forward arm 56A of first side member 42 is greater than the distance D2 between the top face 88 of second cross member 52 and the forward arm 56B of second side member 44.

Further, in this second position shown in FIGS. 11A-11C, the ground surface may exert sufficient force on the right side of implement 12 to overcome the biasing force asserted by upper spring 126, thus driving the first spring stop arm 148 upwards and moving the second arm 144 of upper spring 126 from its position wherein it is engaged with the top edge 150 of second spring stop arm 152. This may allow rotational movement of pivot balls 108, 122A, 122B, 124A, and 124B as well as the related angular movement of the related pivot linkages 106, 116A, and 116B.

When the implement is returned to more even or level ground, the biasing force provided by upper spring 126 of spring assembly 40 may cause the implement to return to a substantially horizontal or level position (e.g. to the first position as seen in FIG. 10A).

Figure 12A:
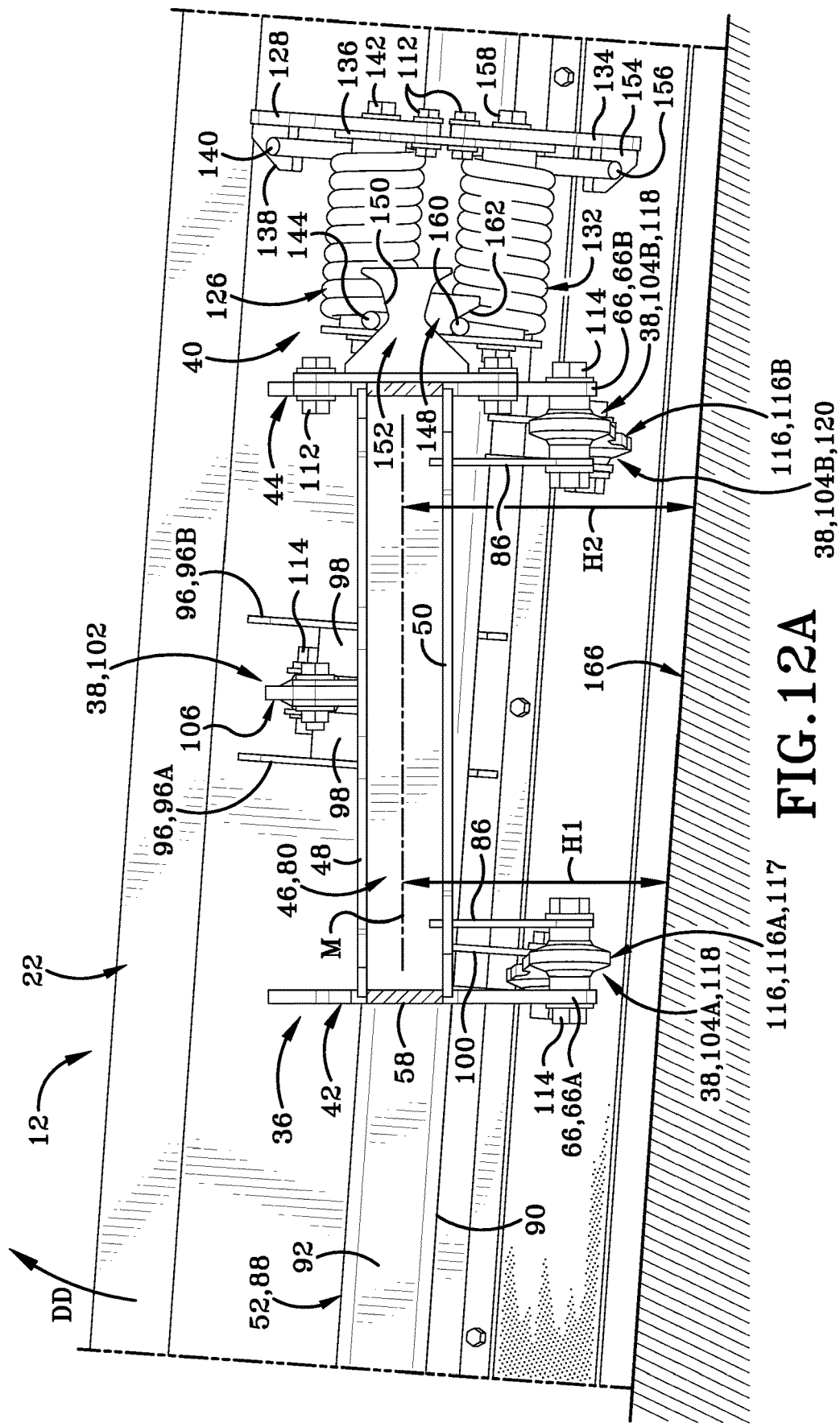
FIG. 12A (FIG. 12A) is a rear elevation operational view of an attachment mechanism according to one aspect of the present disclosure.
Figure 12B:
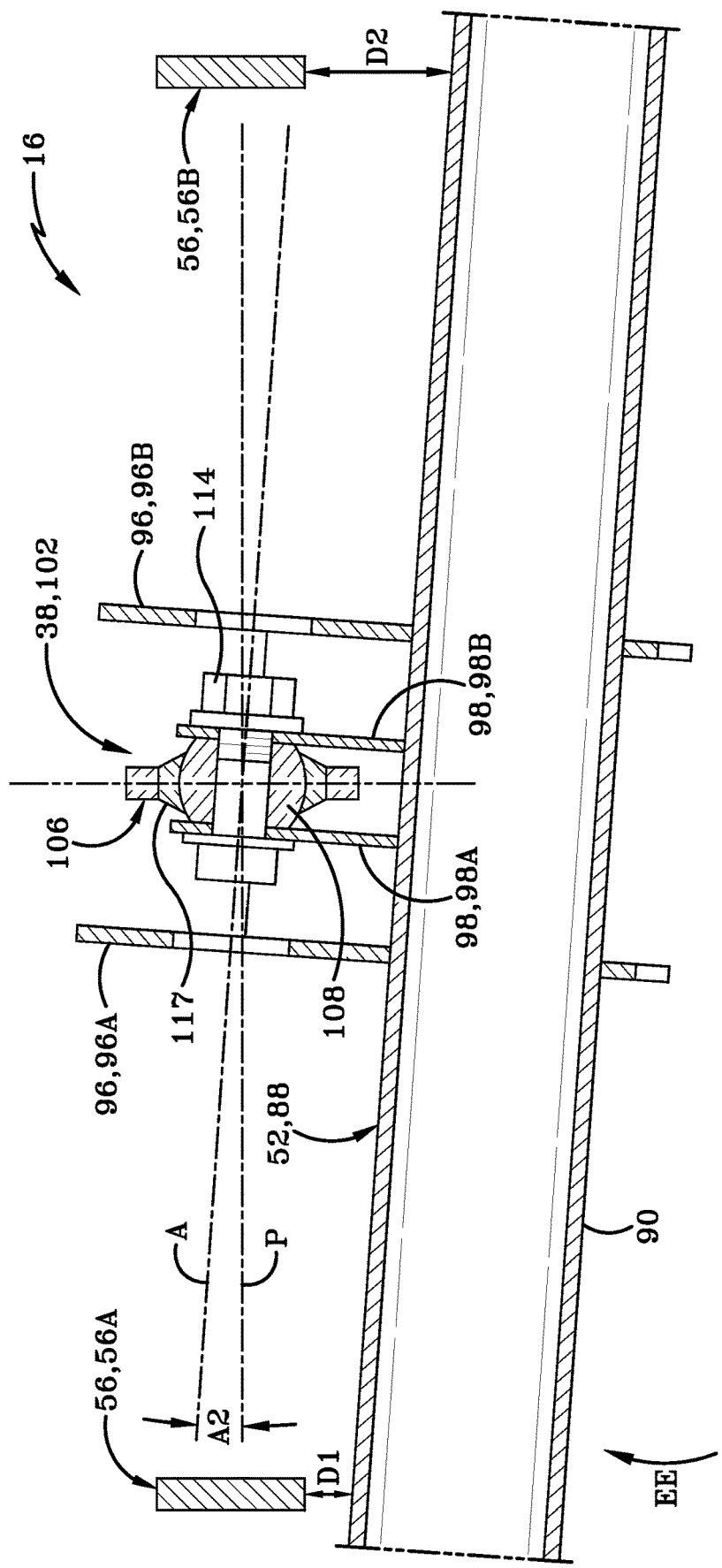
FIG. 12B (FIG. 12B) is a rear cross-sectional operational view of a pivot assembly of an attachment mechanism according to one aspect of the present disclosure.
Figure 12C:
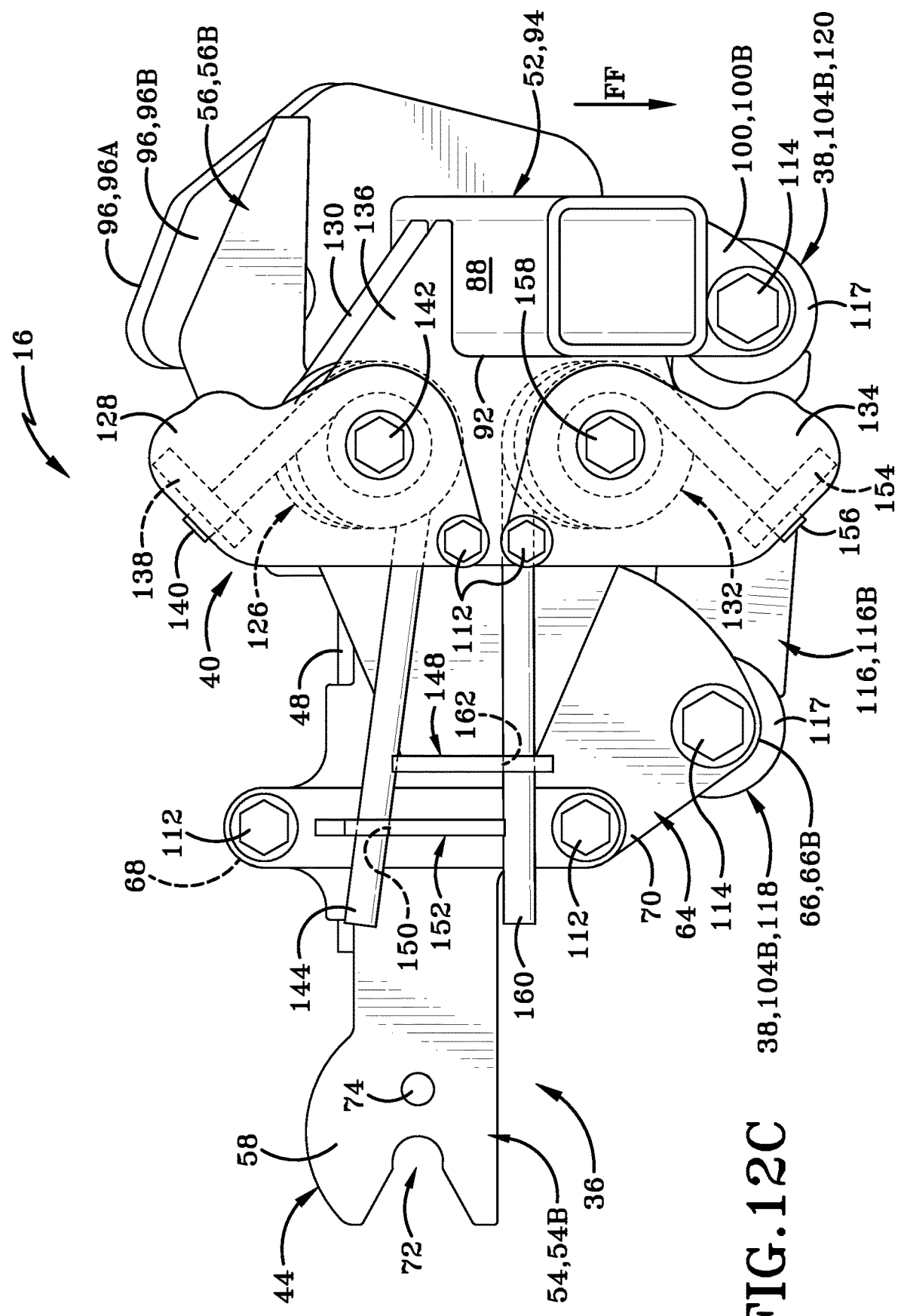
FIG. 12C (FIG. 12C) is a left side elevation operational view of an attachment mechanism according to one aspect of the present disclosure.

With reference to FIG. 12A through 12C, when implement 12 is then operated on a ground surface 166 wherein the left side (again relative to the view of the operator of tractor 14) is higher than the right side, the ground surface 166 may similarly exert force on the left side of implement 12, thus causing the left side to rotate upwards in the direction of arrow DD in FIG. 12A. Again, in this position, which may be a third position, first cross member 46 may maintain a fixed orientation relative to tractor 14, but may be angled relative to ground surface 166 as illustrated by the fact that height H1 of midline M on the left side is now smaller than height H2 on the right, relative to the ground surface 166, as seen in FIG. 12A. As with the second position, in this third position, second cross member 52 is likewise angled relative to first cross member 46, albeit in a direction opposite that of the second position.

As best seen in FIG. 12B, horizontal axis A defined by pivot bolt 114 in upper pivot assembly 102 may now be angled in a second direction relative to midline M of first cross member 46. This angle (represented by angle A2, again defined above plane P) may vary depending upon the slope of the ground surface 116, with the maximum angle being defined by the position of forward arm 56A in this second direction. According to one aspect, angle A2 may have a maximum value of thirty degrees above the horizontal plane P. According to another aspect, angle A2 may be any value between zero and approximately thirty degrees above the horizontal plane P, as defined by the placement of forward arm 56A and the amount of upwards force applied to the left side of implement 12. When implement 12 and second cross bar 52 are rotated as shown in FIGS. 12A-12C, the distance D1 between the top face 88 of second cross member 52 and the forward arm 56A of first side member 42 is less than the distance D2 between the top face 88 of second cross member 52 and the forward arm 56B of second side member 44.

In this third position, the force exerted from the ground surface on the left side of implement 12 may overcome the biasing force of lower spring 132, again causing a separation of the first spring stop arm 148 and second spring stop arm 152, such that the top and bottom edges 146, 150, 162 and 164 thereof are no longer co-planar. Again, as discussed above, this may likewise cause pivot balls 108, 122A, 122B, 124A, and 124B to rotate and pivot linkages 106, 116A, and 116B to move angularly to allow for the rotation of implement 12. When implement 12 is returned to a level surface, the biasing forces applied by spring assembly 40 will again cause implement 12 to return to a horizontal and level position (e.g. FIG. 10A).

The use of biasing springs 126, 132 helps ensure that implement 12 does not bounce when encountering small or minor imperfections or obstructions, thus preventing an uneven application of implement 12. For example, where implement 12 is again a flail mower, without the biasing force of spring assembly 40, when a wheel 18 encounters a rock or a small depression it may cause implement 12 to bounce, thus affecting the cut height momentarily and resulting in an uneven cut, or uneven spot. Accordingly, the presence of spring assembly 40 helps ensure that implement 12 remains both level relative to the ground surface, i.e.

parallel to the ground surface, while also maintaining its position without bouncing or "slop" in the application thereof.

Additionally, the inclusion of spring assembly 40 may ensure that the transitions of implement 12 and second cross member 52 between positions may be incremental and continuous as tractor 14 and implement 12 traverse the ground surface 166 and as the ground surface changes in condition (i.e. as ground surface 166 changes between level, sloped, uneven, and/or any combinations thereof).

Similarly, the inclusion of spring assembly 40 and the biasing forces provided therefrom may allow implement 12 to maintain a level orientation when raised for transport but not otherwise in operation. In this instance, this would prevent the edges or sides of implement from contacting the ground when cornering or turning the tractor 14 but otherwise not employing or operating the implement 12.

While spring assembly 40 may generally maintain the rotational positions of implement 12 and second cross member 52 relative to first cross member 46, there may be instances where the slope of the ground surface 166 exceeds the rotational capability of implement 12 and second cross member 52. In these instances, the inclusion of forward ends 56 of first and second side members 42 and 44, and their positioning over second cross member 52, may function as a rotational maximum stop. Put another way, forward ends 56 of side members 42, 44 may prevent over-rotation of implement 12 and second cross member 52 by mechanically blocking second cross member 52 from rotating beyond the structural limits of mounting frame 36, pivot assemblies 38, and/or spring assembly 40, thus preventing damage thereto.

Accordingly, the advantages of the present attachment system 10 include that the tractor 14 and implement 12 need fewer operational passes over an area with uneven or sloped terrain, thus reducing time, cost, maintenance, and danger, while simultaneously providing for a uniform application of the implement 12 to the operational area. Further, the present system 10 has the advantage of reducing or eliminating the need or motivation to loosen or modify connections, thus increasing safety for the operator and/or bystanders, while also providing for less wear, resulting in a longer life for the implement 12, tractor 14, and attachment frame assembly 16.

While described herein with regards to forward mounted implements, it will be understood that similar principles may be applied for side or rearward mounted implements. It will be further understood that the operation may change slightly for implements other than flail mowers; however, the same principles as discussed herein will still apply.

Figure 13:
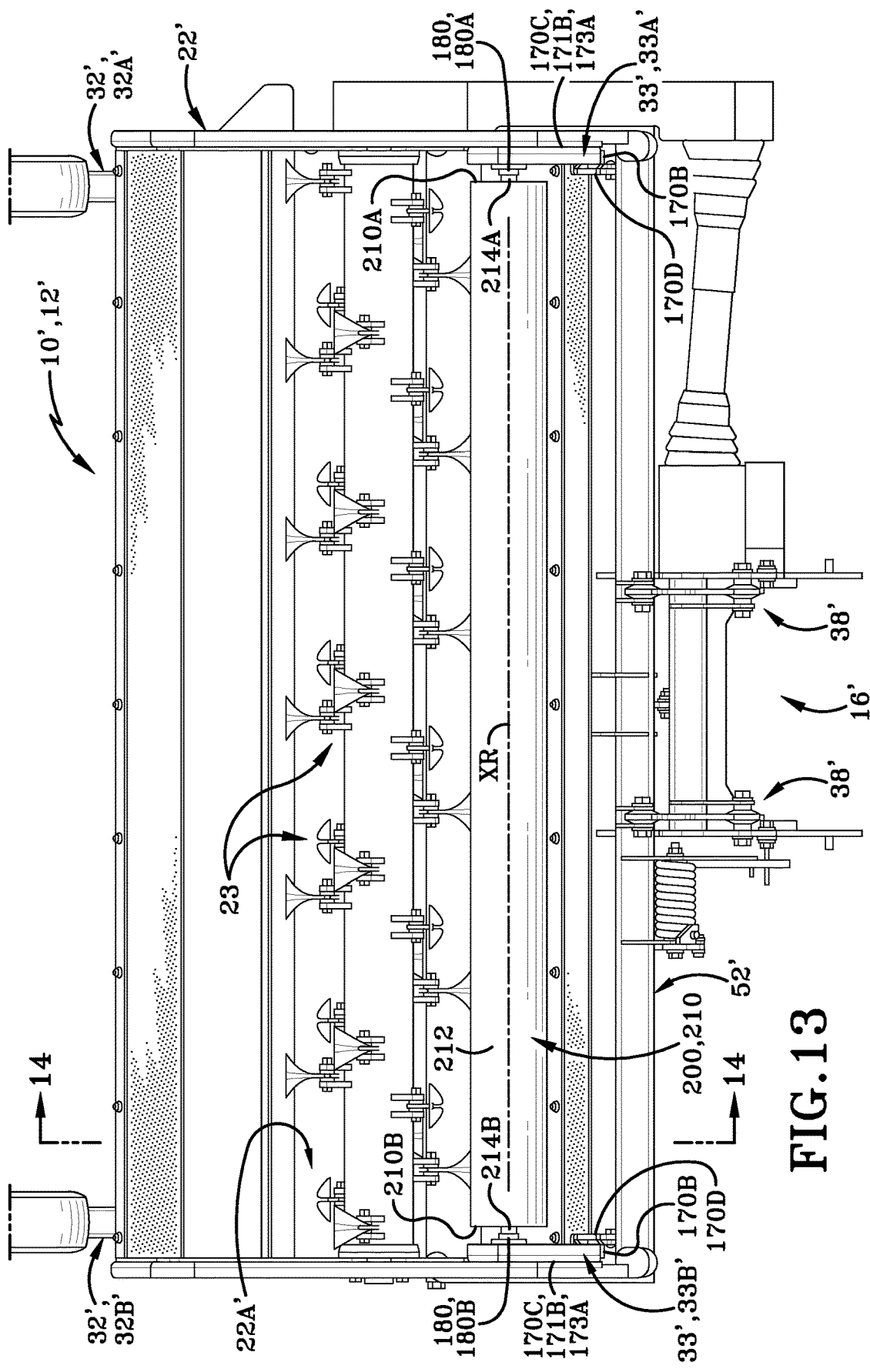
FIG. 13 (FIG. 13) is a bottom plan view of another forwardly-mounted implement utilizing a striping assembly according to one aspect of the present disclosure.
Figure 14:
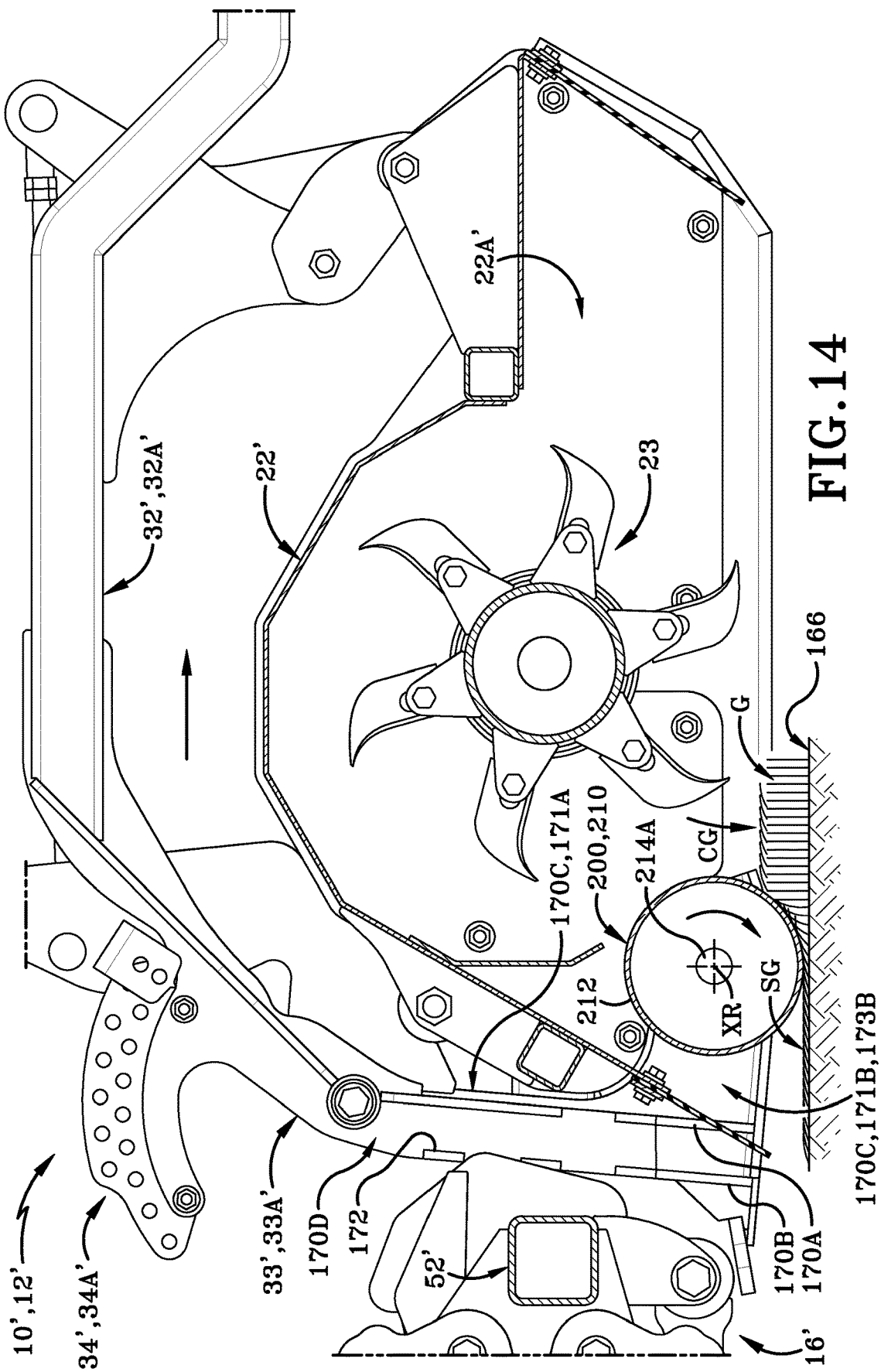
FIG. 14 (FIG. 14) is a right side cross-sectional operational view of the striping assembly as shown in FIG. 13.

FIGS. 13 and 14 illustrates an alternative attachment system 10'. The attachment system 10' is similar to the attachment system 10 illustrated in FIGS. 1-12. The attachment system 10' operably engages with the tractor 14 in a substantially similar way as illustrated in FIGS. 1-12. As described and illustrated herein, the prime indicia accompanying certain callouts (e.g., attachment system 10') signifies that additional members or components have been added these existing assemblies and/or members that were previously described and illustrated herein. As such, alternative attachment system 10' has an implement 12' that includes a striping assembly 200 operably engaged to an alternative attachment frame assembly 16'. The implement 12' and all associated parts and/or assemblies of the implement 12' are similar to implement 12 illustrated in FIGS. 1-12, except as detailed below. In addition, the attachment frame assembly 16' and all associated parts and/or assemblies of the attachment frame assembly 16' are similar to attachment frame assembly 16 illustrated in FIGS. 1-12, except as detailed below.

As illustrated in FIG. 14, frame components 32' may include a pair of carriers 32A', 32B' operably engaged with associated adjustment mechanisms 34' provided on the implement 12'. The carriers 32A', 32B' are identical to one another and are engaged with the associated adjustment mechanism 34' in a mirrored-image arrangement. Inasmuch as the carriers 32A', 32B' are identical, the following description will relate to first carrier 32A'. It should be understood, however, that the description of the first carrier 32A' applies equally to the second carrier 32B'.

Referring to FIG. 14, the first carrier 32A' may be operably engaged with a first adjustment mechanism 34A'. In the illustrated embodiment, the first carrier 32A' is operably connected to an associated adjustment mechanism 34' via locking mechanisms (e.g., fasteners and nuts). In another illustrated embodiment, a first carrier 32A' may be operably engaged with a first adjustment mechanism 34A' in any suitable way or arrangement. Such engagement between the first carrier 32A' and the adjustment mechanism 34' allows a user to collectively adjust the implement 12' and the striping assembly 200 together during operation of the implement 12'. As such, the implement 12' and the striping assembly 200 may be maintained at any desired angle and/or height relative to a second cross member 52' during operation via the engagement between the carriers 32A', 32B' and the associated adjustment mechanisms 34', which is described in more detail below In addition, the frame components 32' may also include a pair of support arms 33' that is operably engaged with the pair of carriers 32A', 32B' on the implement 12'. The support arms 33' are identical to one another and are engaged with the pair of carriers 32A', 32B' in a mirrored-image arrangement. Inasmuch as the support arms 33A', 33B' are identical, the following description will relate to first support arm 33A'. It should be understood, however, that the description of the first support arm 33A' applies equally to the second support arm 33B'.

Referring now to FIG. 14, the first support arm 33A' has a front wall 170A, an opposing rear wall 170B, an outer wall 170C positioned between the front wall 170A and the rear wall 170B, and an opposing inner wall 170D positioned between the front wall 170A and the rear wall 170B. Still referring to FIG. 14, each of the front wall 170A, rear wall 170B, outer wall 170C, and inner wall 170D defines a set of notches 172. The set of notches 172 defined in each of the front wall 170A, rear wall 170B, outer wall 170C, and inner wall 170D allows the front wall 170A, rear wall 170B, outer wall 170C, and inner wall 170D to operably engage with one another to define the first support arm 33A'. The structural configuration of the second support arm 33B' is substantially similar to this structural configuration of the first support arm 33A'. Still referring to FIG. 14, the front wall 170A of the first support arm 33A' may be operably engaged with the outer wall 170C, the inner wall 170D, and the associated adjustment mechanism 34'. The inner wall 170D of the first support arm 33A' may be operably engaged with the first carrier 32A' and the associated adjustment mechanism 34' along with the front wall 170A and the rear wall 170B. In the illustrated embodiment, the front wall 170A, rear wall 170B, outer wall 170C, and inner wall 170D are operably connected to each other via the set of notches 172 to define the first support arm 33A'. In other illustrated embodiments, a front wall, a rear wall, an outer wall, and an inner wall may be operably engaged in any suitable way and/or arrangement to define a support arm. Examples of operably engaging a front wall, a rear wall, an outer wall, and an inner wall include attaching, affixing, connecting, fastening, interlocking, joining, linking, locking, securing, welding, and other suitable way of operably engaging a front wall, a rear wall, an outer wall, and an inner wall for a particular embodiment.

Still referring to FIG. 14, the outer wall 170C has a first portion 171A and a second portion 171B. The first portion 171A defines the set of notches 172 to allow the outer wall 170C to operably engage with the front and rear walls 170A, 170B. The second portion 171B extends laterally away from the first portion 171A where the second portion 171B is substantially orthogonal to the first portion 171A. In addition, the second portion 171B has an exterior surface 173A and an opposing interior surface 173B. Such use of the second portion 171B is described in more detail below.

A pair of couplers (not illustrated) may be operably engaged with the first and second support arms 33A', 33B'. In particular, a first coupler may be operably engaged with the first support arm 33A', and a second coupler may be operably engaged with the second support arm 33B'. The couplers are identical to one another and are engaged with the pair of support arms 33A', 33B' in a mirrored-image arrangement. Inasmuch as the couplers are identical, the following description will relate to first coupler. It should be understood, however, that the description of the first coupler applies equally to the second coupler.

A groove (not illustrated) may be defined by the first coupler that extends along a transverse axis of the first coupler orthogonal to the longitudinal axis of the first coupler defining a U-shape. The groove is positioned between each end of the first coupler. In addition, the first groove of the first coupler and the second groove of the second coupler are coaxial with one another when the first coupler is operably engaged with the first support arm 33A' and the second coupler is operably engaged with the second support arm 33B'.

Referring to FIG. 13, the striping assembly 200 includes a roller 210. The roller 210 has a first end 210A, an opposing second end 210B, and a longitudinal axis "XR" that extends therebetween. The roller 210 also has a circumferential wall 212 that extends from the first end 210A to the second end 210B along the longitudinal axis "XR" (as best seen in FIG. 14). The roller 210 also has a first shaft 214A that extends away from the first end 210A of the roller 210 along the longitudinal axis "XR." The roller 210 also has an opposing second shaft 214B that extends away from the second end 210B of the roller 210 along the longitudinal axis "XR." In the illustrated embodiment, the first shaft 214A and the second shaft 214B extend away from one another on the roller 210.

As illustrated in FIG. 13, a pair of pillow block bearings 180 may be operably engaged with the first and second shafts 214A, 214B of the roller 210. In particular, a first pillow block bearing 180A may be operably engaged with the first shaft 214A, and a second pillow block bearing 180B may be operably engaged with the second shaft 214B. The pillow block bearings 180A, 180B are identical to one another and are engaged with the first and second shafts 214A, 214B in a mirrored-image arrangement. Inasmuch as the pillow block bearings 180A, 180B are identical, the following description will relate to first pillow block bearing 180A. It should be understood, however, that the description of the first pillow block bearing 180A applies equally to the second pillow block bearing 180B.

Referring to FIG. 13, the first pillow block bearing 180A may be adapted to receive a connector and/or fastener for operably engaging the first pillow block bearing 180A with the first coupler and the first support arm 33A'. Similarly, the second pillow block bearing 180B is adapted to receive a connector and/or fastener for operably engaging the second pillow block bearing 180B with the second coupler and the second support arm 33B'. In one exemplary embodiment, a first pillow block bearing may be operably engaged with a first coupler and a first support arm in any suitable arrangement. Examples of operably engaging a first pillow block bearing with a first coupler and a first support arm include attaching, affixing, connecting, fastening, interlocking, joining, linking, locking, securing, welding, and other suitable ways of operably engaging a first pillow block bearing with a first coupler and a first support arm for a particular embodiment. In another exemplary embodiment, a second pillow block bearing may be operably engaged with a second coupler and a second support arm in any suitable arrangement. Examples of operably engaging a second pillow block bearing with a second coupler and a second support arm include attaching, affixing, connecting, fastening, interlocking, joining, linking, locking, securing, welding, and other suitable ways of operably engaging a second pillow block bearing with a second coupler and a second support arm for a particular embodiment.

Still referring to FIG. 13, the first pillow block bearing 180A may be adapted to receive the first shaft 214A of the roller 210 such that the first pillow block bearing 180A is operably engaged with the roller 210. In addition, the second pillow block bearing 180B may be adapted to receive the second shaft 214A of the roller 210 such that the second pillow block bearing 180B is operably engaged with the roller 210. In one exemplary embodiment, a first pillow block bearing may define a set of attachment openings (not illustrated) for receiving fasteners to operably engage the first pillow block bearing with a first shaft of a roller. In another exemplary embodiment, a second pillow block bearing may define a set of attachment openings (not illustrated) for receiving fasteners to operably engage the second pillow block bearing with a second shaft of a roller. During operation of the striping assembly 200, the roller 210 and the first and second pillow block bearings 180A, 180B rotate about the longitudinal axis "XR" of the roller 210 in either the clockwise direction (i.e., when the tractor 14 is traveling in a forward direction) or the counter-clockwise direction (i.e., when the tractor is moving in a rearward direction).

In the illustrated embodiment, the striping assembly 200 uses a roller 210 for striping a lawn with the implement 12. While the striping assembly 200 includes a roller, such as roller 210, a striping assembly may include any suitable device for striping a lawn. Examples of suitable devices that may be used for striping a lawn in a striping assembly include at least one heavy weight bar, at least one brush, at least one piece of rubber and/or similar types of flexible or resilient material, and other suitable devices that may be used for striping lawn in a striping assembly.

As described and illustrated herein, the term "lawn" or "lawns" may include any vegetation and/or organic material in which a striping assembly 200 may stripe certain patterns thereon during a cutting operation. As described herein, the lawn or lawns may include grass; however, it will be understood that other vegetation and/or organic material may be utilized as dictated by the desired implementation. Examples of other vegetation and/or organic material that may be included in the lawn or lawns include clover, weeds, flowers, cultivated plants, and other suitable vegetation and/or organic material found provided in a lawn or lawns.

In the illustrated embodiment, each end 210A, 210B of the roller 210 is operably engaged to a body 22' of the implement 12' via the couplers provided with the support arms 33' at each end of the roller 210. While the roller is operably engaged to the body 22' of the implement 12' via the couplers provided with the support arms 33', other suitable structural configurations and/or arrangements may be used for operably engaging a roller with an implement. In one exemplary embodiment, a roller may be operably engaged to an implement via at least one support arm that is positioned between the ends of the roller.

When assembled, the striping assembly 200 and a portion of the support arms 33A', 33B' are positioned inside of an interior chamber 22A defined by the body 22' of the implement 12'. As illustrated in FIGS. 13 and 14, the second portion 171B of the outer wall 170C of each support arm 33A', 33B', the couplers, the roller 210, and the pillow block bearings 180 are positioned inside of an interior chamber 22A' defined by the body 22' of the implement 12'. In addition, the striping assembly 200 is also positioned behind the at least one blade and/or cutting member 23 of the implement 12' inside of the interior chamber 22A' defined by the body 22' of the implement 12'. In FIG. 14, the striping assembly 200 is also positioned at a distance away from the blades 23 of the implement 12' such that the striping assembly 200 may not impede or hinder the cutting ability of the blades 23 during a cutting operation. Moreover, the striping assembly 200 is positioned at a distance away from the blades and/or cutting member of the implement 12' to suitably depress a predetermined amount of grass onto the lawn that is cut by the blades 23 of the implement 12'. Such operation of the cutting and striping by the implement 12' and the striping assembly 200 is described in more detail below.

Having described the structure of the striping assembly 200 and the various components and connections thereof, methods of using the striping assembly 200 will now be described.

Prior to using the striping assembly 200, the operator of the tractor 14 may manually adjust the implement 12' (via the associated adjustment mechanisms 34') to a desired height once the implement 12' is operably engaged to the tractor 14. Any height adjustment of the implement 12' also adjusts the height of the striping assembly 200 due to the striping assembly 200 being operably engaged to the body 22' of the implement 12'. Once a desired height is chosen for the implement 12', the operator of the tractor 14 may then use the implement 12' with the striping assembly 200 to cut and stripe a cut lawn "G" on the ground surface 166.

During a cutting operation, the blades 23 of the implement 12' may cut a desired height or volume of vegetation from the lawn. The cut vegetation at the desired height may be discharged or mulched onto the ground surface 166 via the blades 23 of the implement 12'. As illustrated in FIG. 14, the path of travel for the cut vegetation ends at the ground surface 166 at a point that is intermediate of the blades 23 and the roller 210 of the striping assembly 200. As illustrated in FIG. 14, the path of travel for the cut vegetation has been denoted by an arrow labeled "CG". At this point in the cutting process, the cut vegetation is covering the cut lawn "G" at a position forward of the roller 210.

During a cutting operation, the roller 210 of the striping assembly 200 freely rotates about the longitudinal axis "XR" when the roller 210 contacts the ground surface 166 (such as the cut lawn "G"). Once the cut vegetation is covering the cut lawn "G", the roller 210 of the striping assembly 200 then asserts a rotational pressing force onto the cut vegetation and the cut lawn "G". The rotational pressing force asserted by the roller 210 may create a suitable stripping pattern "SG" that is be visible on the cut lawn "G". In the illustrated embodiment, the creation of the striping pattern "SG" is created inside of the interior chamber 22A' of the body 22' of the implement 12'. In another exemplary embodiment, a creation of a striping pattern may be created exterior to an interior chamber defined by a body of an implement. Furthermore, the process of cutting and striping a portion of the cut lawn "G" may be repeated until the cut lawn "G" has been fully and adequately cut by the operator.

While the striping assembly 200 has been illustrated and described herein as being operably engaged inside of the body 22 of the implement 12', a striping assembly may be operably engaged to any suitable part of a body of an implement. In one exemplary embodiment, a striping assembly may be operably engaged to the outside of a body of an implement in which the striping assembly may be operably engaged to a rear portion of the body. In another exemplary embodiment, a striping assembly may be operably engaged to the outside of a body of an implement in which the striping assembly may be operably engaged to each side portion of the body.

FIGS. 15-26 illustrate an alternative attachment system 10". The attachment system 10" is similar to the attachment system 10 illustrated in FIGS. 1-12 and attachment system 10' illustrated in FIGS. 13-14, excepted as detailed below. The attachment system 10" operably engages with the tractor 14 in a substantially similar way as illustrated in FIGS. 1-12. As described and illustrated herein, the prime indicia accompanying certain callouts (e.g., attachment system 10") signifies that additional members or components have been added to these existing assemblies and/or members that were previously described and illustrated herein. As such, the alternative attachment system 10" has an implement 12" that includes a flip-up assembly 300 operably engaged to an alternative attachment frame assembly 16". The implement 12" and all associated parts and/or assemblies of the implement 12" are similar to implement 12 illustrated in FIGS. 1-12, except as detailed below. In addition, the attachment frame assembly 16" and all associated parts and/or assemblies of the attachment frame assembly 16" are similar to attachment frame assembly 16 illustrated in FIGS. 1-12, except as detailed below.

Figure 16:
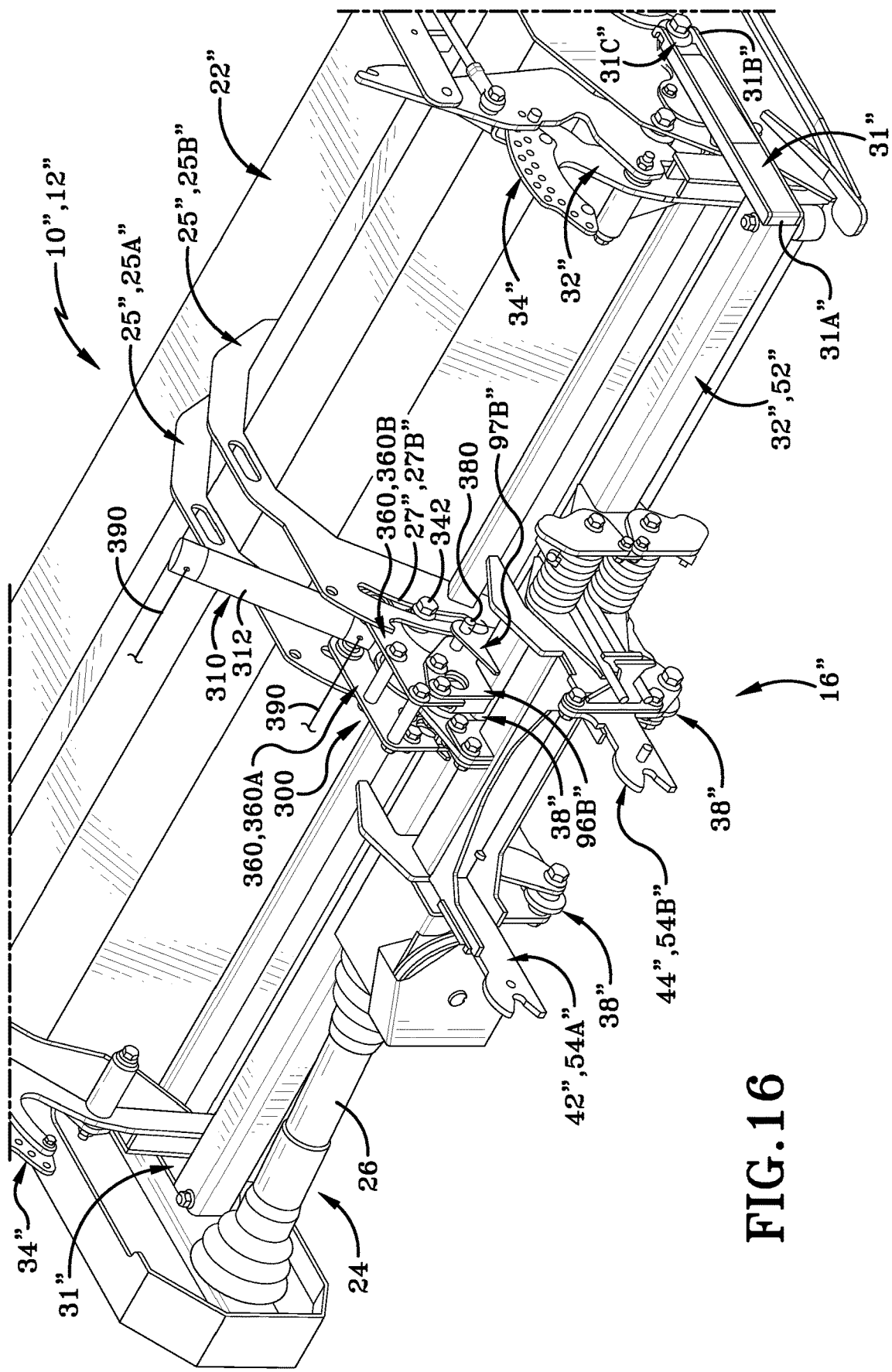
FIG. 16 (FIG. 16) is a partial top, rear, right side isometric perspective view of the forwardly-mounted implement utilizing the flip-up assembly as shown in FIG. 15.

As illustrated FIG. 16 the implement 12" may include at least one cross frame bracket 25" that is operably engaged to the body 22" of the implement 12". The at least one cross frame bracket 25" may include a first cross frame bracket 25A" and a second cross frame bracket 25B". The cross frame brackets 25A", 25B" are identical to one another and are engaged with the implement 12' in a mirrored-image arrangement.

Figure 17:
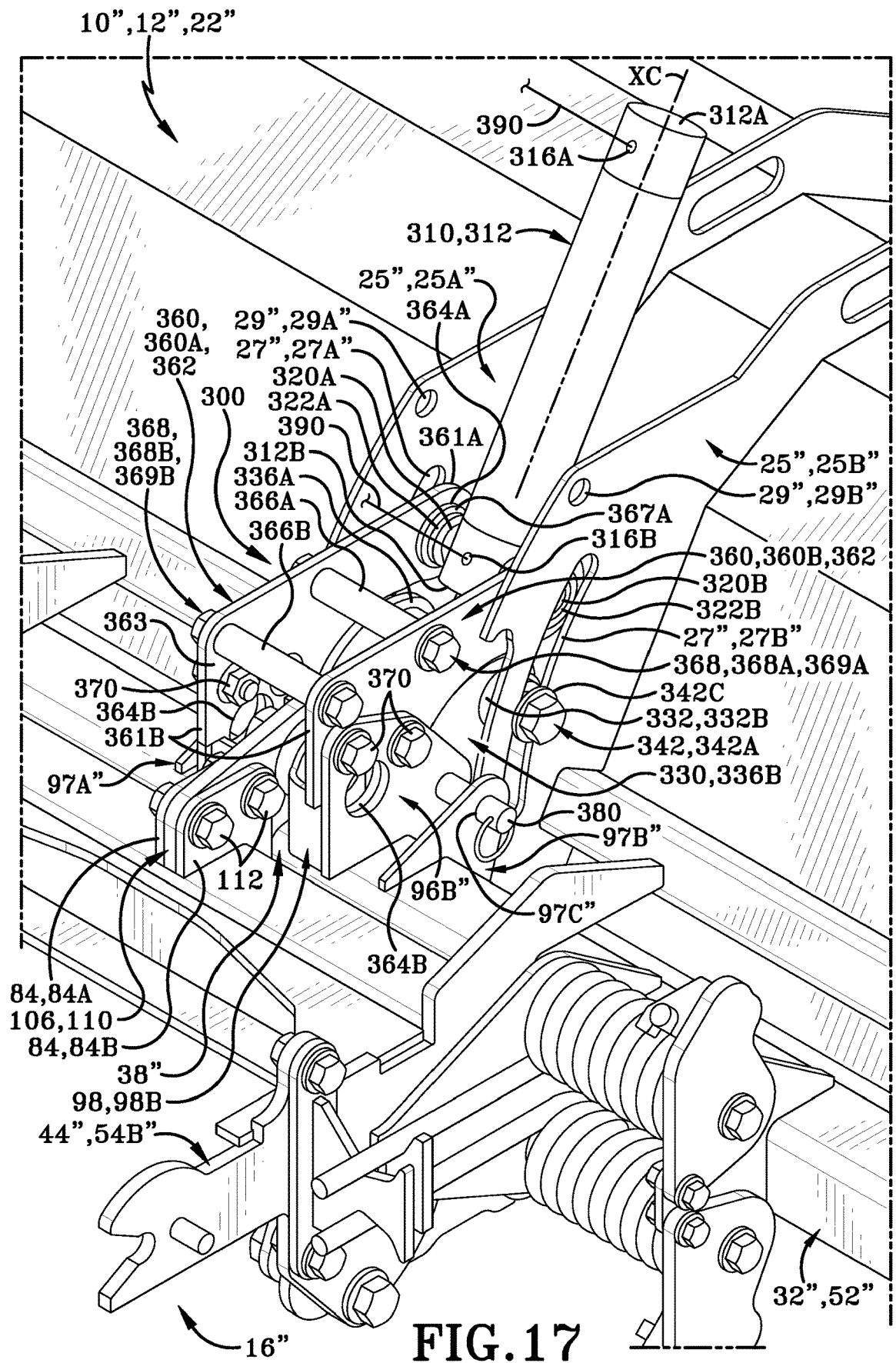
FIG. 17 (FIG. 17) is a partial top, rear, right side isometric perspective view of the forwardly-mounted implement utilizing the flip-up assembly as shown in FIG. 15.

Referring to FIGS. 16-17, a first slot 27A" is defined by the first cross frame bracket 25A", and a second slot 27B" is defined by the second cross frame bracket 25B". Such use of the first slot 27A" and the second slot 27B" is described in more detail below. In addition, the cross frame brackets 25A", 25B" may also define openings 29A", 29B". The first cross frame bracket 25A" may define a first opening 29A" that is positioned above the first slot 27A". Similarly, the second cross frame bracket 25B" may define a second opening 29B" that is positioned above the second slot 27B". Still referring to FIGS. 16-17, the first opening 29A" and the second opening 29B" are coaxial with one another due to the positioning of the first cross frame bracket 25A" and the second cross frame bracket 25B" on the body 22" of the implement 12'. Such use of the first and second openings 29A", 29B" is described in more detail below. While the first and second cross frame brackets 25A", 25B" may define first and second openings 29A", 29B", first and second cross frame brackets may define other suitable features. In one exemplary embodiment, a first cross frame bracket may define a first notch that extends into the first cross frame bracket, and a second cross frame bracket may define a second notch that extends into the second cross frame bracket.

Referring to FIG. 16, the implement 12" may have a pair of lateral arms 31" that operably engage the implement 12" to a cross member 52" of the attachment frame assembly 16" (substantially identical to the second cross member 52 of the attachment frame assembly 16 described above). Each lateral arm 31" is identical to one another and is operably engaged with the cross member 52" in a mirrored-image arrangement. Inasmuch as the lateral arms 31" are identical, the following description will relate to a first lateral arm 31. It should be understood, however, that the description of the first lateral arm 31" applies equally to an opposing second lateral arm 31.

As illustrated in FIG. 16, the first lateral arm 31" has a first end 31A", an opposing second end 31B", and a longitudinal axis defined therebetween. The first end 31A" of the first lateral arm 31" operably engages with the cross member 52" of the attachment frame assembly 16" where the first end 31A" is immovable. The second end 31B" of the first lateral arm 31" is adapted to operably engage with a bearing assembly 31C". The second end 31B" and the bearing assembly 31C" of the first lateral arm 31" may be operably engaged to the body 22" of the implement 12" via an attachment assembly (e.g., a fastener operably engaged with a nut to operably engaged the second end 31B" and the bearing assembly 31C" of the first lateral arm 31" to the body 22"). In the illustrated embodiment, the bearing assembly 31C" may allow rotation of the body 22" of the implement 12" relative to the first lateral arm 31" and/or the cross member 52" of the attachment frame assembly 16". Such rotation of the implement 12" is described in more detail below.

Figure 18:
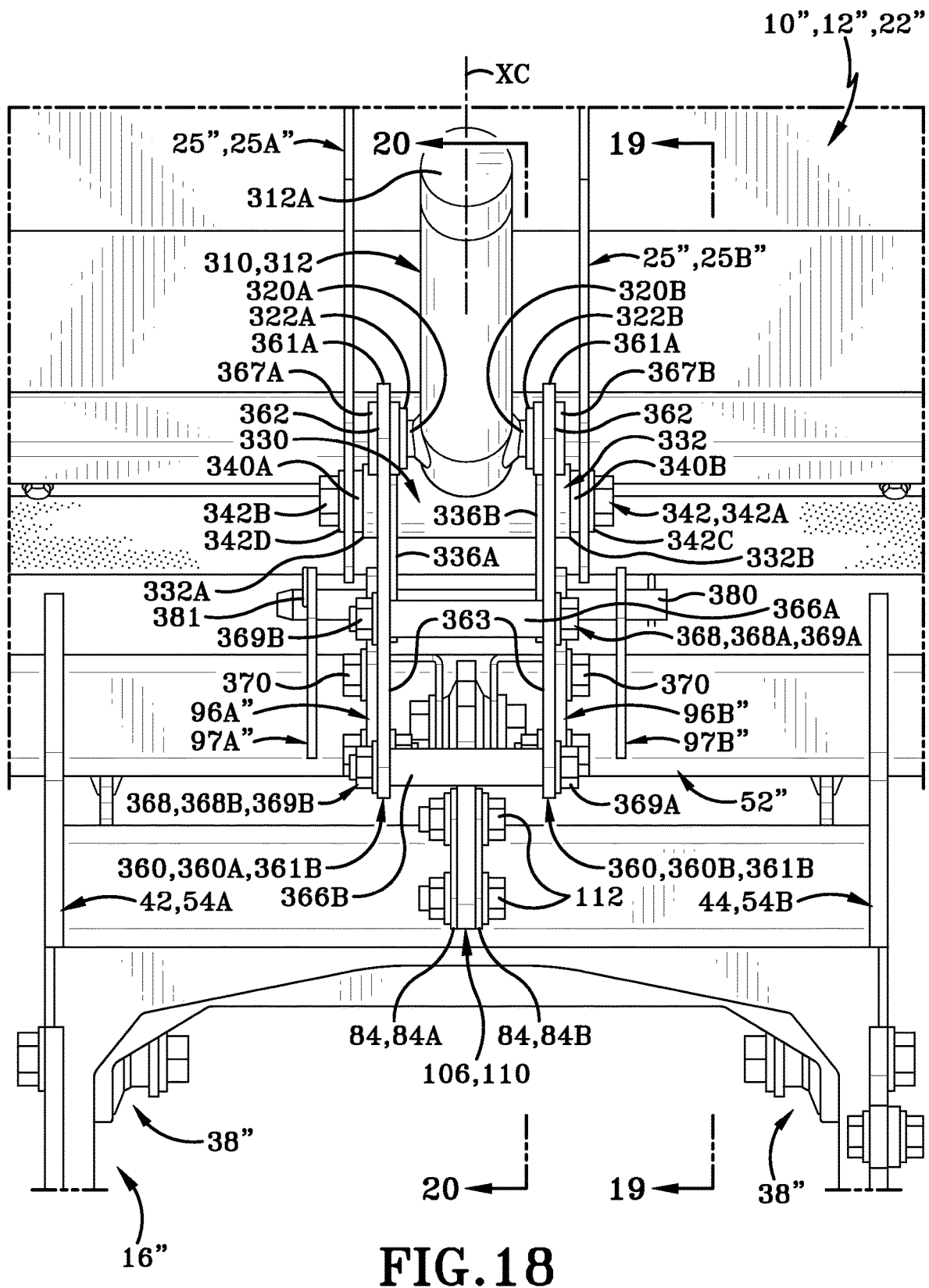
FIG. 18 (FIG. 18) is a top plan view of the forwardly-mounted implement utilizing the flip-up assembly as shown in FIG. 15.

As illustrated in FIGS. 16-18, the flip-up assembly 300 may include a force generating device 310. The force generating device 310 may be a hydraulic or pneumatic actuator or other similar device. As described herein, it may be a hydraulic actuator; however, it will be understood that other suitable devices may be utilized as dictated by the desired implementation. Examples of suitable devices for a force generating device in a flip-up assembly includes pneumatic actuator, electrical actuator, thermal actuators, mechanical actuators, and other suitable devices may be utilized as dictated by the desired implementation.

Figure 20:
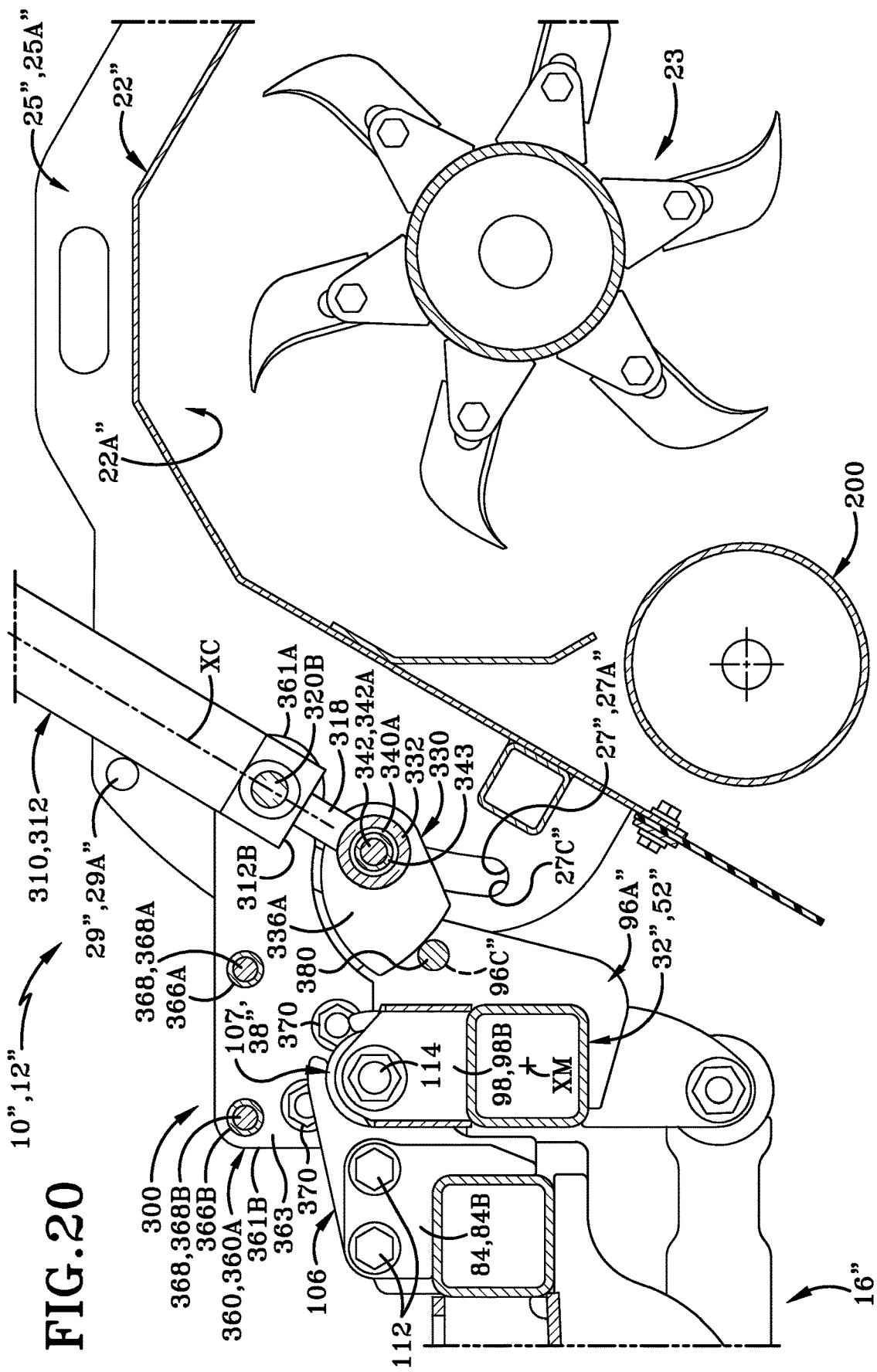
FIG. 20 (FIG. 20) is a partial cross-sectional view of the forwardly-mounted implement utilizing the flip-up assembly taken in the direction of line 20-20 labeled in FIG. 18.
Figure 21:
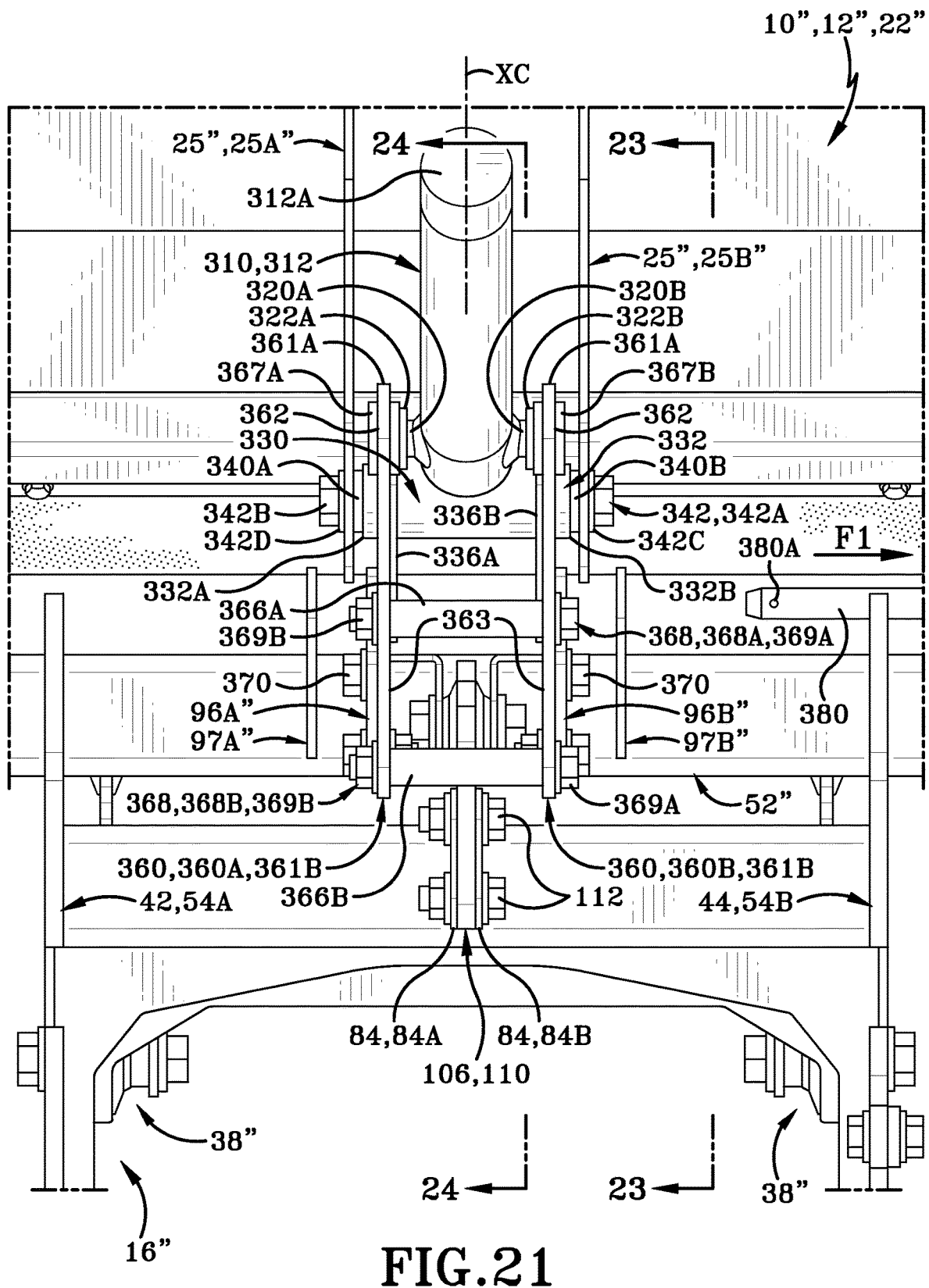
FIG. 21 (FIG. 21) is a partial top plan view of the forwardly-mounted implement utilizing the flip-up assembly shown in FIG. 15; wherein a removable pin is being removed.
Figure 22:
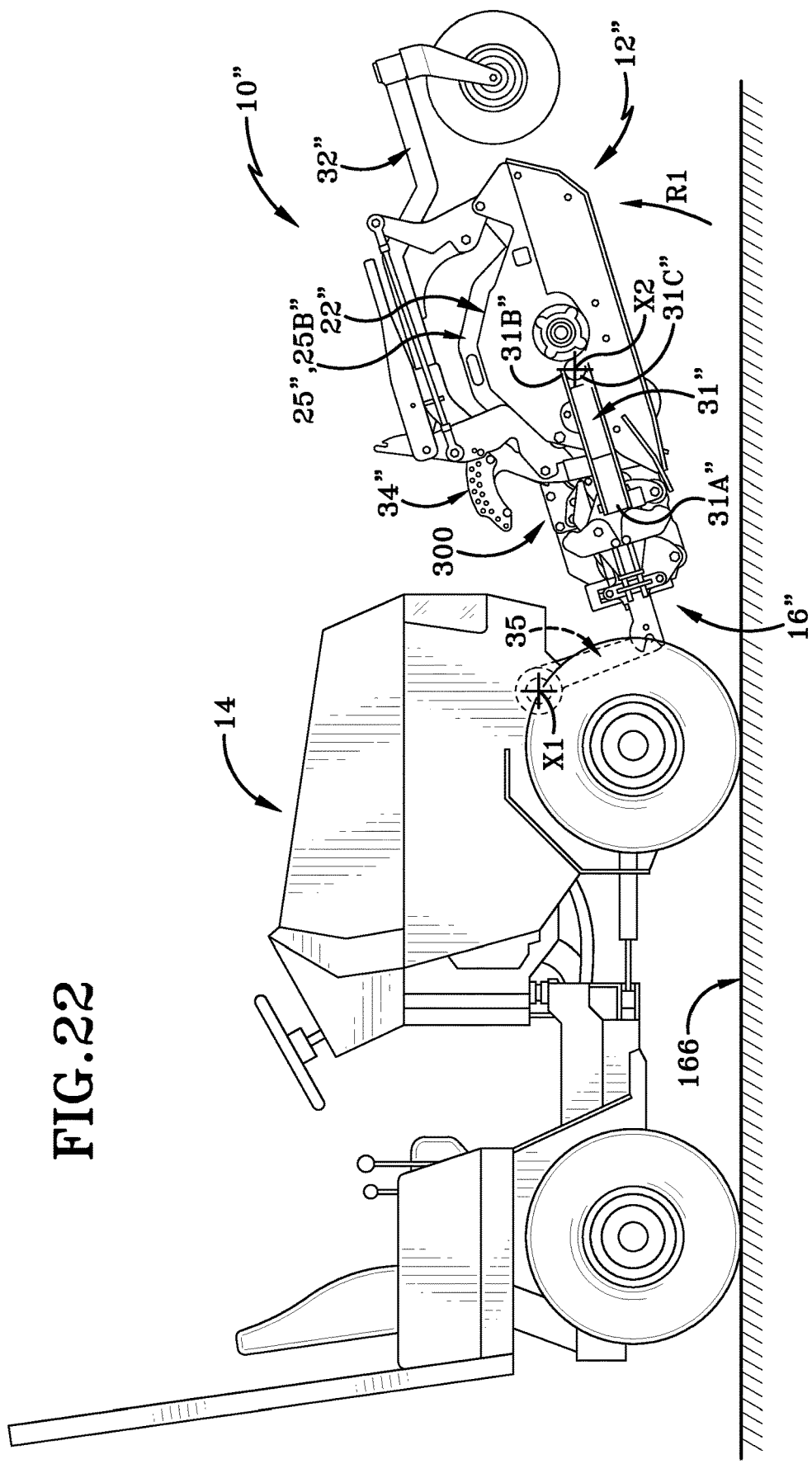
FIG. 22 (FIG. 22) is a right side elevation view of the forwardly-mounted implement utilizing the flip-up assembly as shown in FIG. 15; wherein the forwardly mounted implement and an attachment frame assembly is rotated via the tractor.
Figure 24:
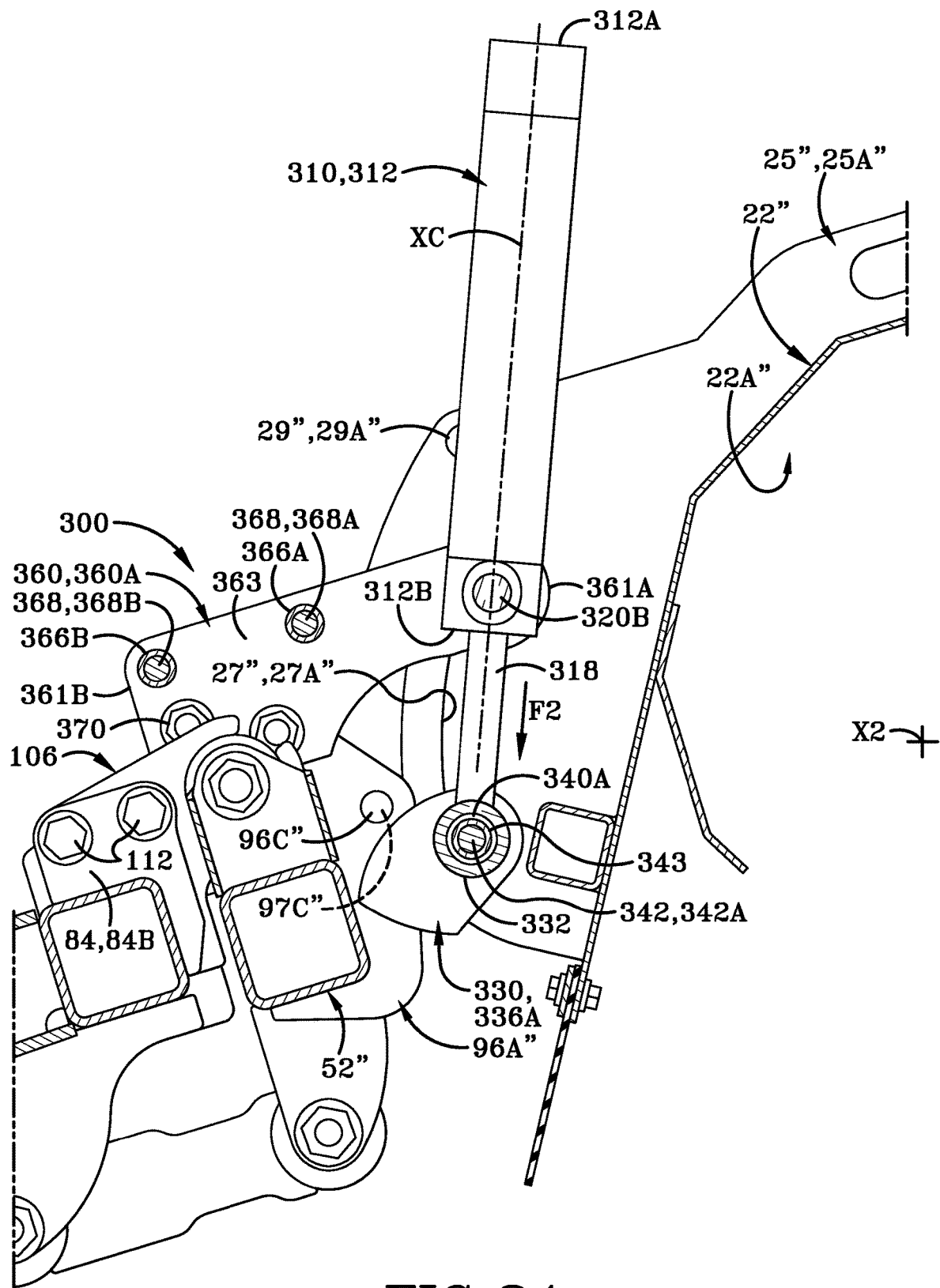
FIG. 24 (FIG. 24) is a partial cross-sectional view of the forwardly-mounted implement utilizing the flip-up assembly taken in the direction of line 24-24 labeled in FIG. 21; wherein the force generating device is transitioning the forwardly-mounted implement from an initial, non-pivoted position to a translated, pivoted position.
Figure 25:
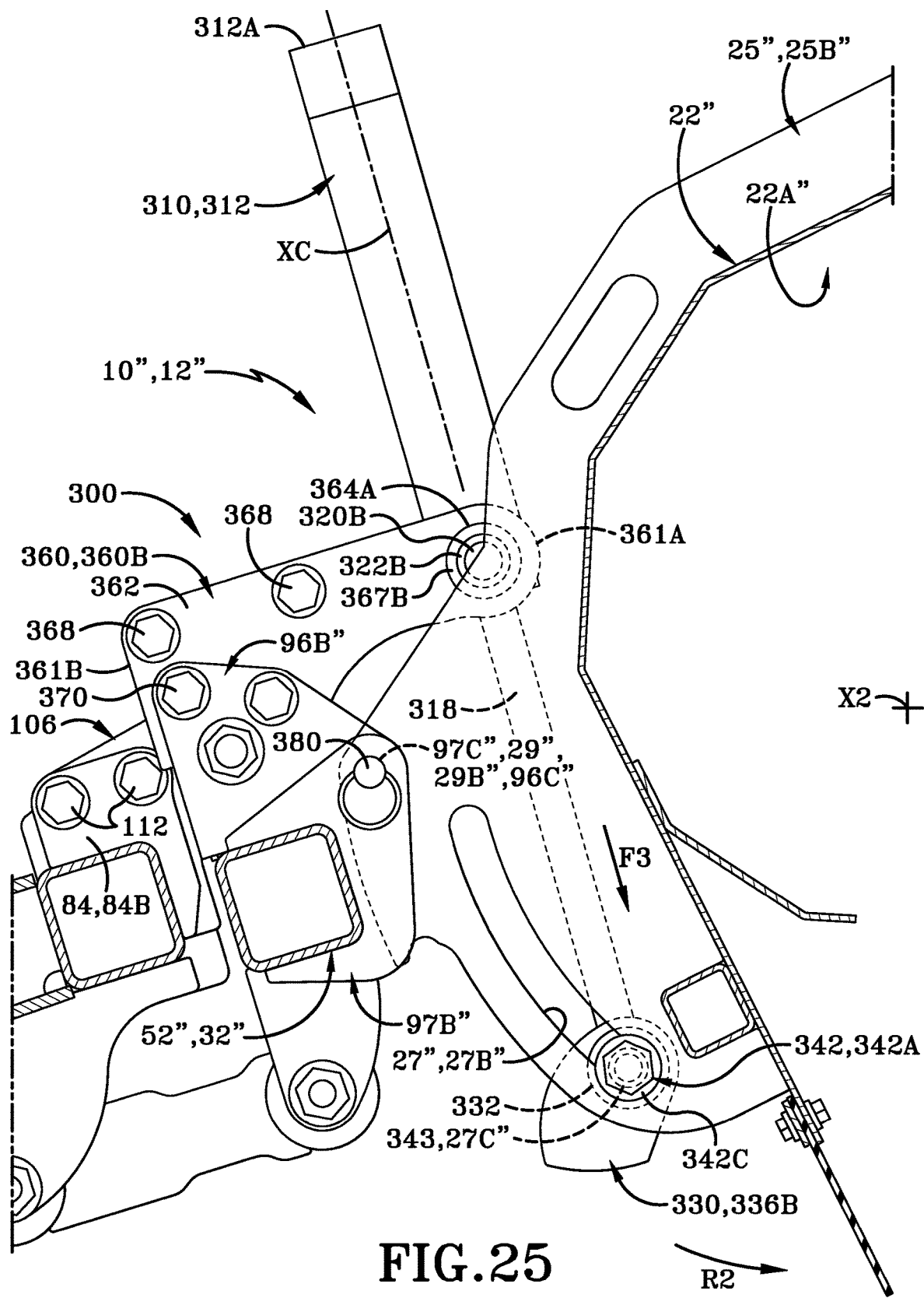
FIG. 25 (FIG. 25) is a partial cross-sectional view of the forwardly-mounted implement utilizing the flip-up assembly as shown in FIG. 24; wherein the force generating device transitioned the forwardly-mounted implement to the translated, pivoted position.

Referring to FIG. 17, the force generating device 310 includes a cylinder 312 that has a top end or first end 312A, a bottom end or second end 312B, and a longitudinal axis "XC" (best seen in FIGS. 17 and 20) that extends therebetween. Referring to FIGS. 24-25, the cylinder 312 defines a central passageway (not illustrated) that extends between the top end 312A and the bottom end 312B. Referring to FIGS. 16-17, the cylinder 312 also defines a first inlet opening 316A proximate to the top end 312A of the cylinder 312. The first inlet opening 316A provides fluid communication between the central passageway and the external environment of the cylinder 312. Still referring to FIGS. 16-17, the cylinder 312 also defines a second inlet opening 316B proximate to the bottom end 312B of the cylinder 312. The second inlet opening 316B provides fluid communication between the central passageway and the external environment of the cylinder 312. Referring to FIGS. 20 and 24, the cylinder 312 defines a bottom opening (not illustrated) at the bottom end 312B of the cylinder 312. The bottom opening provides fluid communication between the central passageway and the external environment of the cylinder 312.

Still referring to FIGS. 19-20 and 23-25, the force generating device 310 also includes a rod 318 that is provided inside a central passageway defined by the cylinder 312. The rod 318 may include a piston (not illustrated) that is disposed inside of the cylinder 312. During operation, the rod 318 linearly move between the top end 312A and the bottom end 312B of the cylinder 312 based on the force inputted into either the first inlet opening 316A or the second inlet opening 316B of the cylinder 312 to rotate the implement 12" independently of the attachment frame assembly 16", which is described in further detail below.

Referring to FIGS. 17-18, the cylinder 312 also includes a first protruding arm 320A and an opposing second protruding arm 320B. Each of first protruding arm 320A and the second protruding arm 320B are positioned proximate to the bottom end 312B of the cylinder 312. Additionally, each of the first protruding arm 320A and the second protruding arm 320B extends laterally away from the cylinder 312 and away from one another relative to a transverse axis of the cylinder 312 that is orthogonal to the longitudinal axis "XC" of the cylinder 312. Still referring to FIGS. 17-18, the force generating device 310 also includes a first bushing 322A and a second bushing 322B. The first bushing 322A is sized and configured to receive and operably engage with the first protruding arm 320A of the cylinder 312. The second bushing 322B is sized and configured to receive and operably engage with the second protruding arm 320B of the cylinder 312.

As illustrated in FIGS. 16-18, the flip-up assembly 300 includes a connector 330 that operably engages with the rod 318 of the force generating device 310 (specifically at the bottom end of the rod 318 in FIG. 20) and the cross frame brackets 25A", 25B" of the implement 12". Referring to FIG. 18, the connector 330 includes a support member 332 that has a first end or right side 332A, an opposing second side or left side 332B, and a longitudinal axis that extends therebetween. Referring to FIG. 20, the support member 332 defines a passageway 334 that extends from the first end 332A to the second end 332B. In the illustrated embodiment, the passageway 334 is in fluid communication with the external environment surrounding the support member 332 at either the first end 332A or the second end 332B.

Referring to FIGS. 17-18, the connector 330 includes a first lateral plate 336A and a second lateral plate 336B operably engaged to the support member 332. In the illustrated embodiment, the first lateral plate 336A operably engages to the support member 332 proximate to the first end 332A of the support member 332. Additionally, the second lateral plate 336B operably engages to the support member 332 proximate to the second end 332B of the support member 332. Each of the first lateral plate 336A and the second lateral plate 336B extends laterally away from the support member 332 along a longitudinal axis that is orthogonal to the longitudinal axis of the support member 332.

Referring to FIG. 18, the connector 330 also includes a first bushing 340A and a second bushing 340B. As illustrated in FIGS. 17-18, the first bushing 340A is operably engaged with the support member 332 where the first bushing 340A is operably engaged at the first end 332A of the support member 332. A portion of the first bushing 340A is disposed inside of the passageway 334, which is configured to be operably engaged with support member 332, and another portion of the first bushing 340A is disposed outside of the passageway 334. Referring to FIG. 18, the second bushing 340B is operably engaged with the support member 332 where the second bushing 340B is operably engaged at the second end 332B of the support member 332. A portion of the second bushing 340B is disposed inside of the passageway 334, which is configured to be operably engaged with support member 332, and another portion of the second bushing 340B is disposed outside of the passageway 334.

Figure 19:
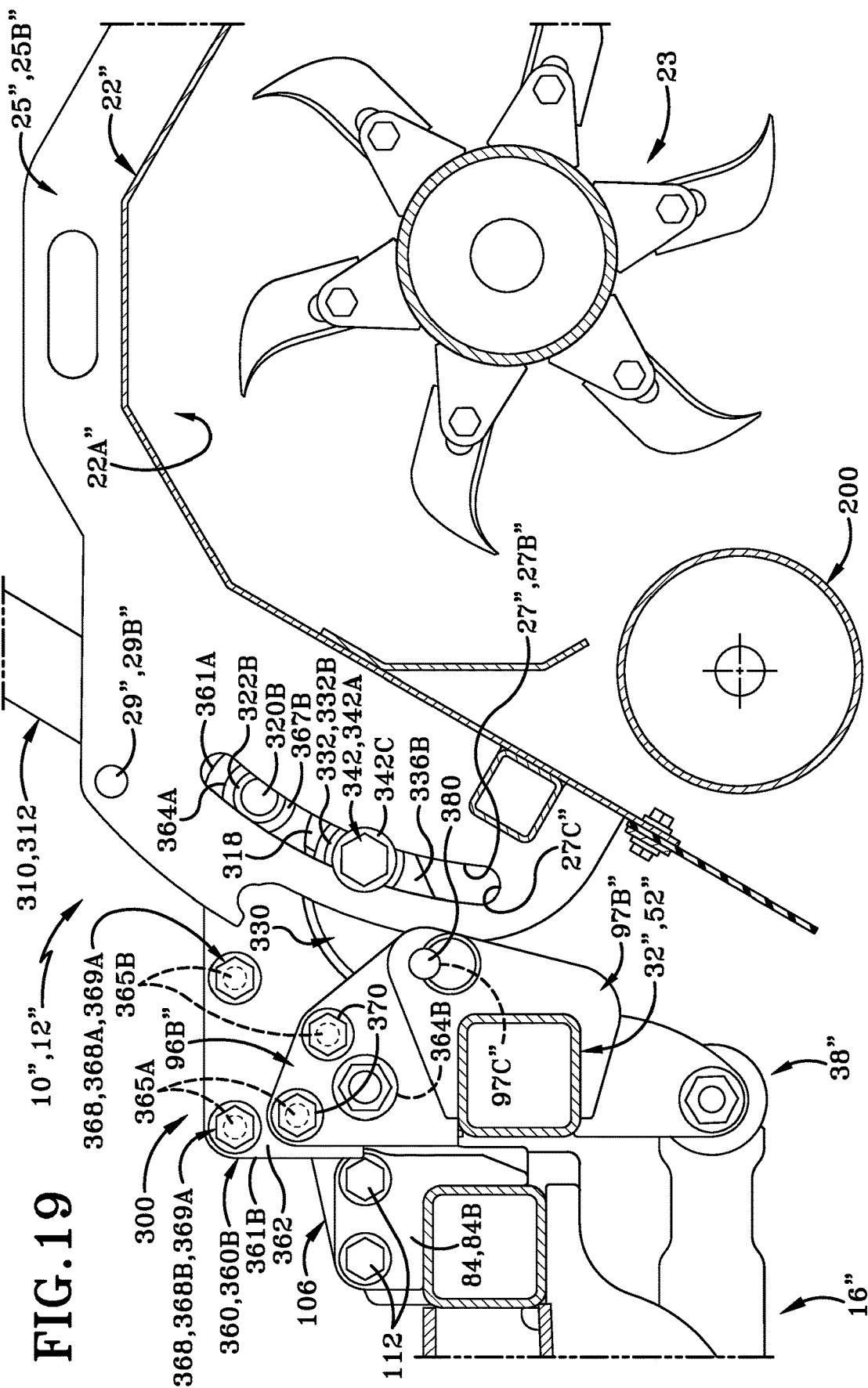
FIG. 19 (FIG. 19) is a partial cross-sectional view of the forwardly-mounted implement utilizing the flip-up assembly taken in the direction of line 19-19 labeled in FIG. 18.

Referring to FIGS. 18-19, each of the first bushing 340A and the second bushing 340B is adapted to receive a fastener 342A of a locking mechanism 342. In the illustrated embodiment, the fastener 342A extends through each of the cross frame brackets 25", the support member 332, and the bushings 340. The fastener 342A remains operably engaged to the cross frame brackets 25", the support member 332, and the bushings 340 via a nut 342B operably engaged to the fastener 342A. The engagement between the fastener 342A and the nut 342B creates the locking mechanism 342 that operably engages the connector 330 and the force generating device 310 to the implement 12". In addition, a first washer 342C may be positioned proximate to the bolt head of the fastener 342A, and a second washer 342D may be positioned away from the bolt head of the fastener 342A and proximate to the nut 342B.

Figure 23:
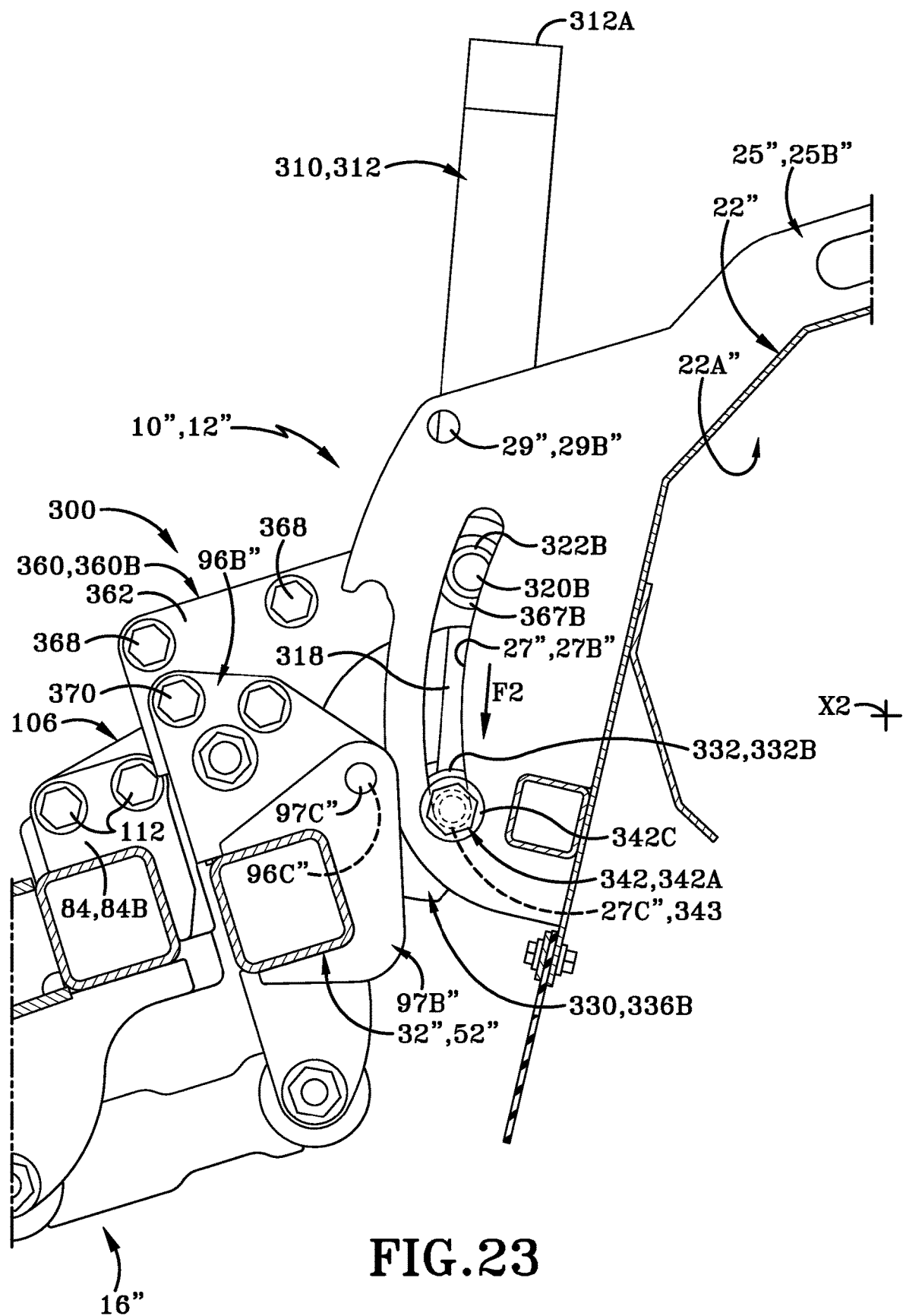
FIG. 23 (FIG. 23) is a partial cross-sectional view of the forwardly-mounted implement utilizing the flip-up assembly taken in the direction of line 23-23 labeled in FIG. 21; wherein a force generating device is translating the forwardly-mounted implement from an initial, non-pivoted position to a translated, pivoted position.

As illustrated in FIGS. 23-25, the locking mechanism 342 and the first and second bushings 340A, 340B slideably engage with the first and second cross frame brackets 25" of the implement 12". In the illustrated embodiment, an outer surface of the first bearing 340A and/or the second washer 342D may operably engage with the first cross frame bracket 25A" on opposing sides of the first cross frame bracket 25A". Such engagement of the first bearing 340A and the second washer 342D with the first cross frame bracket 25A" may allow the force generating device 310 and the connector 330 to be slidably moveable along the slot 27A" of the first cross frame bracket 25A" when pivoting and/or rotating the implement 12" during operation. Similarly, an outer surface of the second bearing 340B and/or the first washer 342C may operably engage with the second cross frame bracket 25B" on opposing sides of the second cross frame bracket 25B". Such engagement of the second bearing 340B and the first washer 342C with the second cross frame bracket 25B" may allow for the force generating device 310 and the connector 330 to be slidably moveable along the slot 27B" of the second cross frame bracket 25B" when pivoting and/or rotating the implement 12" during operation. Such movement during operation is described in more detail below.

Referring to FIG. 20, a liner 343 may be disposed inside of the connector 330 and extends between the first bushing 340A and the second bushing 340B. The liner 343 in the connector 330 may operably engage with the fastener 342A of the locking mechanism 342 where the liner 343 is disposed circumferentially about the fastener 342A. The liner 343 allows the fastener 342A of the locking mechanism 342 to rotate inside of the first bushing 340A and the second bushing 340B during operation of the flip-up assembly 300, which is described in more detail below. In one exemplary embodiment, a linear may be made of any suitable material to allow for a locking mechanism to rotate inside of a first bushing and a second bushing of a connector described and illustrated herein.

Referring now to FIGS. 16-18, the flip-up assembly 300 may also include at least one mounting plate 360. In the illustrated embodiment, the at least one mounting plate 260 includes first and second mounting plates 360A, 360B. The first and second mounting plates 360A, 360B may be operably engaged with one another and operably engaged with the attachment frame assembly 16" via securement mechanisms (described in more detail below). The mounting plates 360A, 360B are identical to one another and are engaged with the attachment frame assembly 16 in a mirrored-image arrangement. Inasmuch as the mounting plates 360A, 360B are identical, the following description will relate to first mounting plate 360A. It should be understood, however, that the description of the first mounting plate 360A applies equally to the second mounting plate 360B.

Referring to FIGS. 17-18, the first mounting plate 360A has a front end or first end 361A, an opposing rear end or second end 361B, and a longitudinal axis defined therebetween. The first mounting plate 360A also has an outer surface 362 that extends between front end 361A and the rear end 361B. The first mounting plate 360A also has an opposing inner surface 363 that extends between the front end 361A and the rear end 361B. Referring to FIG. 19, the first mounting plate 360A defines a front opening 364A that is proximate to the front end 361A of the first mounting plate 360A and extends entirely through the first mounting plate 360A such that the outer surface 362 and the inner surface 363 are in fluid communication at the front opening 364A.

Referring to FIG. 17, the first mounting plate 360A also defines a lower opening 364B that is proximate to the rear end 361B of the first mounting plate 360A and extends entirely through the first mounting plate 360A such that the outer surface 362 and the inner surface 363 are in fluid communication at the front opening 364A. Referring to FIG. 19, the first mounting plate 360A also defines a first plurality of attachment apertures 365A and a second plurality of attachment apertures 365B. The first plurality of attachment apertures 365A is proximate to the rear end 361B of the first mounting plate 360A. The first plurality of attachment apertures 365A extends entirely through the first mounting plate 360A such that the outer surface 362 and the inner surface 363 are in fluid communication at the first plurality of attachment apertures 365A. The second plurality of attachment apertures 365B is defined between the first plurality of attachment apertures 365A and the lower opening 364B of the first mounting plate 360A. The second plurality of attachment apertures 365B extends entirely through the first mounting plate 360A such that the outer surface 362 and the inner surface 363 are in fluid communication at the second plurality of attachment apertures 365B.

Referring now to FIGS. 17-18, at least one tubular member 366 may be provided between the first mounting plate 360A and the second mounting plate 360B. In one exemplar embodiment, the at least one tubular member 366 may be operably engaged to one of the first mounting plate 360A and the second mounting plate 360B. In another exemplary embodiment, the at least one tubular member 366 may be independent of the first mounting plate 360A and the second mounting plate 360B. In the illustrated embodiment, the at least one tubular member 366 may include a first tubular member 366A that is provided between the first mounting plate 360A and the second mounting plate 360B. The first tubular member 366A may be aligned with one of the attachment apertures 365A of the first mounting plate 360A and the second mounting plate 360B where the first tubular member 366A is coaxial with the one of the attachment apertures 365A of the first mounting plate 360A and the second mounting plate 360B. In the illustrated embodiment, the at least one tubular member 366 may also include a second tubular member 366B that is provided between the first mounting plate 360A and the second mounting plate 360B. The second tubular member 366B may be aligned with another attachment aperture 365A of the first mounting plate 360A and the second mounting plate 360B where the second tubular member 366B is coaxial with the another attachment aperture 365A of the first mounting plate 360A and the second mounting plate 360B.

Referring to FIG. 18, a first sleeve 367A may be operably engaged with the first mounting plate 360A inside of the front opening 364A. The first sleeve 367A may be operably engaged with the first bushing 322A where the first sleeve 367A is disposed circumferentially about the first bushing 322A. Still referring to FIG. 18, a second sleeve 367B may be operably engaged with the second mounting plate 360B inside of the front opening 364A. The second sleeve 367B may be operably engaged with the second bushing 322B where the second sleeve 367B is disposed circumferentially about the second bushing 322B. During operation of the flip-up assembly 300, the first sleeve 367A and the second sleeve 367B allow the first bushing 322A and second bushing 322B to rotate inside of the first mounting plate 360A and the second mounting plate 360B. In order words, the first sleeve 367A and the second sleeve 367B allows the force generating device 310 to pivot inside of the first mounting plate 360A and the second mounting plate 360B, which is described in more detail below.

In the illustrated embodiment, upper mounting plates 96A", 96B" are similar to the upper mounting plates 96A, 96B described previously and illustrated herein, except as detailed below.

Still referring to FIGS. 17-18, a securement mechanism 368 may be used to operably engage the first mounting plate 360A and the second mounting plate 360B to one another. In the illustrated embodiment, a securement mechanism 368 may include a fastener 369A operably engaged to a nut 369B for operably engage the first mounting plate 360A and the second mounting plate 360B to one another. As such, a fastener 369A of a first securement mechanism 368A may be inserted through the first mounting plate 360A, the first tubular member 366A, and the second mounting plate 360B to be operably engaged with a nut 369B of the first securement mechanism 368A. A fastener 369A of a second securement mechanism 368B may be inserted through first mounting plate 360A, the second tubular member 366B, and the second mounting plate 360B to be operably engaged with a nut 369B of the second securement mechanism 368B. Additional securement mechanisms 368 may be used to operably engage the first mounting plate 360A to an upper mounting plate 96A" of the attachment frame assembly 16" and the second mounting plate 360B to an upper mounting plate 96B" of the attachment frame assembly 16".

Still referring to FIGS. 17-18, attachment mechanisms 370 may operably engage the mounting plates 360A, 360B with the upper mounting plates 96A", 96B". Such attachment mechanisms 370 are substantially similar to the configuration of the securement mechanism 368 described above where each attachment mechanism 370 includes a fastener, a nut, and other devices to suitable engage the mounting plates 360A, 360B with the first mount plate 96A" and the second mount plate 96B"

Referring now to FIGS. 17-20, the flip-up assembly 300 may also include a removable pin 380 to maintain the implement 12" between an initial, non-pivoted position and a translated, pivoted position. The removable pin 380 operably engages with a top mounting plate 97A" and the upper mounting plate 96A" to maintain the first lateral plate 336A of the connector 330 at the initial, non-pivoted position. Similarly, the removable pin 380 also operably engages with a top mounting plate 97B" and the upper mounting plate 96B" to maintain the second lateral plate 336B of the connector 330 at the initial, non-pivoted position. When the removable pin 380 is provided with the attachment frame assembly 16" and the implement 12", the removable pin 380 prohibits the lateral movement of the implement 12" caused by the flip-up assembly 300 when the implement 12" and the tractor 14 are traveling over rough and/or uneven terrain. In other words, the removable pin 380 may directly abut the first lateral plate 336A and the second lateral plate 336B of the connector 330 to prevent movement of the implement 12" caused by the flip-up assembly 300 when the implement 12" and the tractor 14 are traveling over rough and/or uneven terrain. The removable pin 380 may define a through hole 380A that is sized and configured to receive a clip or cotter pin 381. The clip 381 prevents the removable pin 380 from backing out during a cutting operation or a maintenance/service operation.

Figure 26:
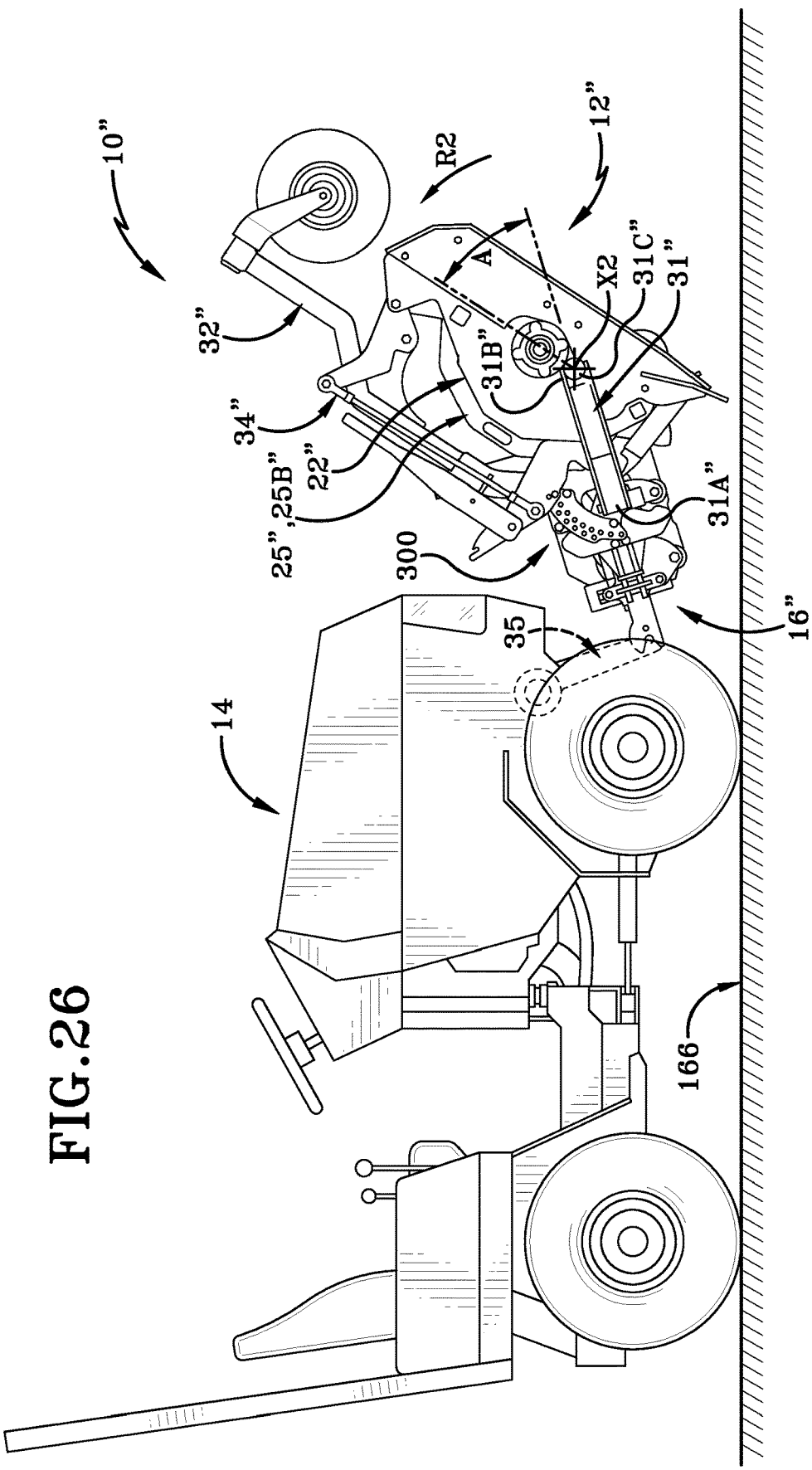
FIG. 26 (FIG. 26) is a right side elevation view of the forwardly-mounted implement utilizing the flip-up assembly as shown in FIG. 15; wherein the forwardly mounted implement transitioned to the translated, pivoted position independently of the attachment frame assembly.

Referring to FIGS. 25-26, the removable pin 380 may also maintain the implement 12" at the translated, pivoted position. In the illustrated embodiment, the removable pin 380 may operably engage with the top mounting plate 97A" and the upper mounting plate 96A" to maintain the implement 12" at the translated, pivoted position by also operably engaging with the first cross frame bracket 25A", via the first opening 29A". Similarly, the removable pin 380 may also operably engage with the top mounting plate 97B" and the upper mounting plate 96B" to maintain the implement 12" at the translated, pivoted position by also operably engaging with the second cross frame bracket 25B", via the second opening 29B". An operator of the implement 12" may desire to translate the implement 12' from the initial, non-pivoted position to the translated, pivoted position for maintenance and/or service repairs of the implement 12" before using the implement 12" for a cutting operation or upon completion of using the implement 12" for a cutting operation.

Referring now to FIGS. 16-17, the flip-up assembly 300 may also include a pair of hydraulic tubing 390 that operably engages with the force generating device 310. In the illustrated embodiment, the hydraulic tubing 390 is illustrated in diagrammatic form for clarity purposes. The first hydraulic tubing 390A operably engages a mechanical power source (not illustrated) on the tractor 14 to the force generating device 310 at the first inlet opening 316A. The second hydraulic tubing 390B also operably engages the mechanical power source on the tractor to the force generating device 310 at the second inlet opening 316B. Such connection between the mechanical power source of the tractor 14 and the force generating device 310 allows the operator to control the pivoting and/or rotation of the implement 12" due to the operator having control over the mechanical power source on the tractor 14. In the illustrated embodiment, the mechanical power source is a hydraulic pump. However, other types of mechanical power sources may be used to control the rotation of an implement.

While not illustrated herein, the flip-up assembly 300 may include a tubing bracket that may be operably engaged to the attachment frame assembly 16". The tubing bracket may be adapted to hold and maintain the tubing 390 away from implement 12" and the pivot assemblies 38". Such capability of the tubing bracket would protect the tubing 390 from being pinched or compressed by any pivoting or moving parts associated with the implement 12", the attachment frame assembly 16", or the flip-up assembly 300.

As illustrated in FIGS. 19-20, the attachment system 10" may include a striping assembly 200 as described herein and illustrated in FIGS. 13-14. During operation, striping assembly 200 may rotate with the implement 12" when the flip-up assembly 300 rotates the implement 12" from the initial, non-pivoted position to the translated, pivoted position. In addition, a roller 210 of the striping assembly 200 may rotate about its longitudinal axis "XR" that is defined along the length of the roller 210.

Having described the structure of the flip-up assembly 300 and the various components and connections thereof, methods of using the flip-up assembly 300 will now be described.

Figure 15:
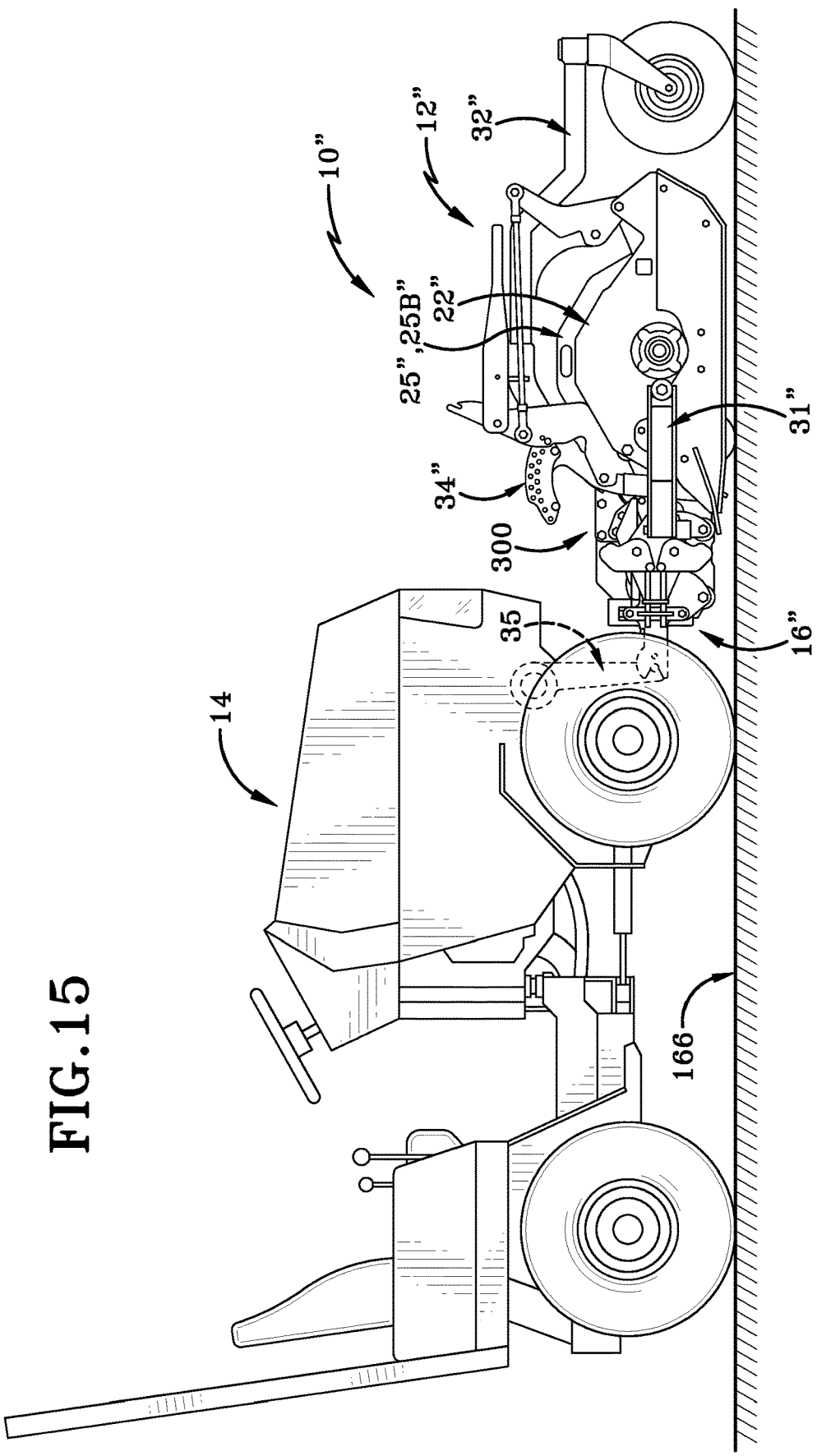
FIG. 15 (FIG. 15) is a right side elevation view of another forwardly-mounted implement utilizing a flip-up assembly according to one aspect of the present disclosure.

Prior to utilizing to the flip-up assembly 300, the operator may operably engage the tractor 14 with the attachment system 10" that includes the flip-up assembly 300. As such, the tractor frame 35 may operably engage with a rear arm 54A" of a first side member 42" and a rear arm 54B" of a second side member 44" substantially similar to the tractor frame operably engaging with the attachment system 10 described herein and illustrated in FIGS. 1-12. The operator may also operably connect the mechanical power source of the tractor 14 to the force generating device 310 of the flip-up assembly 300 via the pair of hydraulic tubing 390. Once connected, the operator may then control the rotation of the implement 12" from the tractor 14 through the force generating device 310. As illustrated in FIGS. 15 and 20, the implement 12" is provided in the initial, non-pivoted position where the implement 12" is substantially parallel with the attachment frame assembly 16". In other words, the implement 12" is provided in the initial, non-pivoted position where the longitudinal axis of the implement 12" is substantially parallel with a longitudinal axis "XM" (FIG. 20) of the second cross member 52".

In the initial, non-pivoted position, the removable pin 380 operably engages with a top mounting plate 97A" and the upper mounting plate 96A" to maintain the first lateral plate 336A of the connector 330 at the initial, non-pivoted position. Similarly, the removable pin 380 also operably engages with a top mounting plate 97B" and the upper mounting plate 96B" to maintain the second lateral plate 336B of the connector 330 at the initial, non-pivoted position. When the removable pin 380 is provided with the attachment frame assembly 16" and the implement 12", the removable pin 380 prohibits the lateral movement of the implement 12" caused by the flip-up assembly 300 when the implement 12" and the tractor 14 are traveling over rough and/or uneven terrain. In other words, the removable pin 380 may directly abut the first lateral plate 336A and the second lateral plate 336B of the connector 330 to prevent movement of the implement 12" caused by the flip-up assembly 300 when the implement 12" and the tractor 14 are traveling over rough and/or uneven terrain.

Once the operator has completed use of the implement 12" for cutting a lawn, the operator may desire to transition the implement 12" from the initial, non-pivoted position to the translated, pivoted position. To perform this task, the operator may remove the removable pin 380 from the upper mounting plates 96A", 96B", the top mounting plates 97A", 97B", and the cross frame brackets 25A", 25B". The operator may remove the removable pin 380 by apply a first force directed away from the flip-up assembly 300 (see FIG. 21). The first force applied by the operator onto the removable pin 380 is denoted by an arrow labeled "F1" in FIG. 21. Such removal of the removable pin 380 allows the connector 330 to move along the slots 27A", 27B" of the cross frame brackets 25A", 25B" of the implement 12" via the force exerted by the force generating device 310. After removal of the removable pin 380, the operator may operatively pivot the implement 12" and the attachment frame assembly 16" about a first axis of rotation "X1" defined along a member operably engaging the tractor frame 35 to the tractor 14. The rotation of the implement 12" and the attachment frame assembly 16" is denoted by an arrow labeled "R1" in FIG. 22. Such pivoting of the implement 12" and the attachment frame assembly 16 away from the ground surface 166 may be performed by making a first input on a hydraulic motor (not illustrated) of the tractor 14 (see FIG. 22). Such pivot of the implement 12" and the attachment frame assembly 16" elevates the implement 12" away from the ground surface 166 where the ground surface 166 may not hinder the pivoting of the implement 12" by the flip-up assembly 300 (described below). Once elevated, the operator may then operably control the hydraulic motor of the tractor 14 by making a second input on said hydraulic motor to operatively pivot the implement 12" from the initial, non-pivoted position to the translated, pivoted positioned.

As illustrated in FIGS. 23-24, a first input on the mechanical power source creates a first pressure differential inside of the cylinder 312 by exerting a second force against the rod 318 and the piston. Such second force exerted against the rod 318 is denoted by an arrow labeled "F2" in FIGS. 23-24. The second force "F2" exerted against the rod 318 inside of the cylinder 312 linearly moves the rod 318 away from the top end 312A of the cylinder 312 towards the bottom end 312B of the cylinder 312. As the rod 318 linearly move downwardly towards the bottom end 312B of the cylinder 312, the bottom end of the rod 318 transitions the connector 330 downwardly away from the cylinder 312 (as illustrated in FIGS. 23 and 24). The bushings 340A, 340B of the connector 330 allows the connector 330 to slideably move along the inner surfaces of the first and second cross frame brackets 25A", 25B" when force is exerted on the connector 330 via the rod 318.

Once the fastener 342A of the locking mechanism 342 reaches terminal ends 27C" of the slots 27A", 27B", the fastener 342A of the locking mechanism 342 directly contacts the first and second cross frame brackets 25A", 25B" inside of the slots 27A", 27B". Such contact between the fastener 342A and the cross frame brackets 25A", 25B" allows the force generating device 310 to pivot and/or rotate the implement 12" due to the connector 330 being pinned against cross frame brackets 25A", 25B" while the force generating device 310 is exerting a downwardly third force against said connector 330 via the rod 318. The third force exerted by the force generating device 310 is denoted by an arrow labeled "F3" in FIG. 25. The bearing assemblies 31C" of the lateral arms 31" allows the implement 12" to rotation about the bearing assemblies 31C" from the initial, non-pivoted position to the translated, pivoted position. The operator may continue to make the first input on the mechanical power source of the tractor 14 until the openings 29A", 29B" of the first and second cross brackets 25A", 25B" are substantially aligned with the openings 96C" of the upper mounting plates 96A", 96B" and the openings F of the top mounting plates 97A", 97B" (see FIG. 25). The rotation of the implement 12" caused by the force generating device 310 is denoted by an arrow labeled "R2" in FIGS. 25-26.

As illustrated in FIG. 26, the implement 12" is provided in the translated, pivoted position. In this position, the implement 12" pivoted independently of the attachment frame assembly via the flip-up assembly 300 provided with the implement 12". Referring to FIG. 26, the implement 12" has been rotated about an axis of rotation "X2" defined between fasteners operably engaging the lateral arms 31" to the implement 12". Still referring to FIG. 26, the transverse axis of the implement 12" is pivoted at an angle "A" relative to the axis of rotation "X2" of the lateral arms 31".

Once the openings 29A", 29B" are substantially aligned with the openings 96C" of the upper mounting plates 96A", 96B" and the openings 97C" of the top mounting plates 97A", 97B", the operator may then cease the second input on the mechanical power source of the tractor 14. Such ceasing of the first input ceases the pressure differential created inside of the cylinder 312 via the mechanical power source. Such ceasing of the pressure differential created inside of the cylinder 312 also ceases the force exerted on the connector 330 by the rod 318. The operator may then operably engage the removable pin 380 with the upper mounting plate 96A", 96B", the top mounting plates 97A", 97B", and the cross frame brackets 25A", 25B" to further ensure the implement 12" remains at the translated, pivoted position (see FIG. 25). Once the removable pin 380 is inserted into and operably engages with the upper mounting plate 96A", 96B", the top mounting plates 97A", 97B", and the cross frame brackets 25A", 25B", the operator may then perform maintenance, repair, cleaning, and/or any other suitable function on the implement 12".

Once the operator has completed maintenance, repair, cleaning, and/or any other suitable function on the implement 12", the operator may rotate the implement 12" from the translated, pivoted position to the initial, non-pivoted position. The operator may remove the clip 381 from the removable pin 380 and then remove the removable pin 380 from the upper mounting plate 96A", 96B", the top mounting plates 97A", 97B", and the cross frame brackets 25A", 25B" so that the implement 12" is once again moveable. Such removal of the removable pin 380 allows the connector 330 to move along the slots 27A", 27B" of the cross frame brackets 25A", 25B" of the implement 12" via the force exerted by the force generating device 310. After removal of the removable pin 380, the operator may then operably control the mechanical power source of the tractor 14 by making a second input on said mechanical power source of the tractor 14. The second input on the mechanical power source creates a second different pressure differential inside of the cylinder 312 where the rod 318 linearly move upwardly away from the bottom end 312B of the cylinder 312 and towards the top end 312A of the cylinder 312.

As the rod 318 linearly move towards the top end 312A of the cylinder 312, the connector 330 transitions upwardly towards the cylinder 312 due to the bottom end of the rod 318 relieving force from connector 330. Since the rod 318 is relieving force from the connector 330, the connector 330 transitions upwardly towards the cylinder 312 due to the weight of the implement 12" exerting a downward force on the implement 12" causing the implement 12" to rotate back to the initial, non-pivoted position. The bushings 340A, 340B of the connector 330 allows the connector 330 to slideably move along the inner surfaces of the first and second cross frame brackets 25A", 25B". The operator may continue to make the second input on the mechanical power source of the tractor 14 until the first lateral plate 336A and the second lateral plate 336B of the connector 330 are above the openings 96C" of the upper mounting plates 96A", 96B" and the openings 97C" of the top mounting plates 97A", 97B" (see FIGS. 19 and 20).

Once the first lateral plate 336A and the second lateral plate 336B of the connector 330 are above the openings 96C" of the upper mounting plates 96A", 96B" and the openings 97C" of the top mounting plates 97A", 97B", the operator may then cease the second input on the mechanical power source of the tractor 14. Such ceasing of the second input ceases the pressure differential created inside of the cylinder 312 via the mechanical power source. Such ceasing of the pressure differential created inside of the cylinder 312 also ceases the movement of the connector 330 by exerting a downward force on the connector 330 by the rod 318. The operator may then operably engage the removable pin 380 with the upper mounting plate 96A", 96B' and the top mounting plates 97A", 97B" to further ensure the implement 12" remains at the initial, non-pivoted position. The removable pin 380 may also operably engage with the first lateral plate 336A and the second lateral plate 336б to maintain the connector 330 and the implement 12" at the initial, non-pivoted position. Once the removable pin 380 is inserted into and operably engages with the upper mounting plate 96A", 96B', the top mounting plates 97A", 97B", and the first and second lateral plates 336A, 336б of the connector 330, the operator may then perform a cutting operation with the implement 12" once again.

Figure 27:
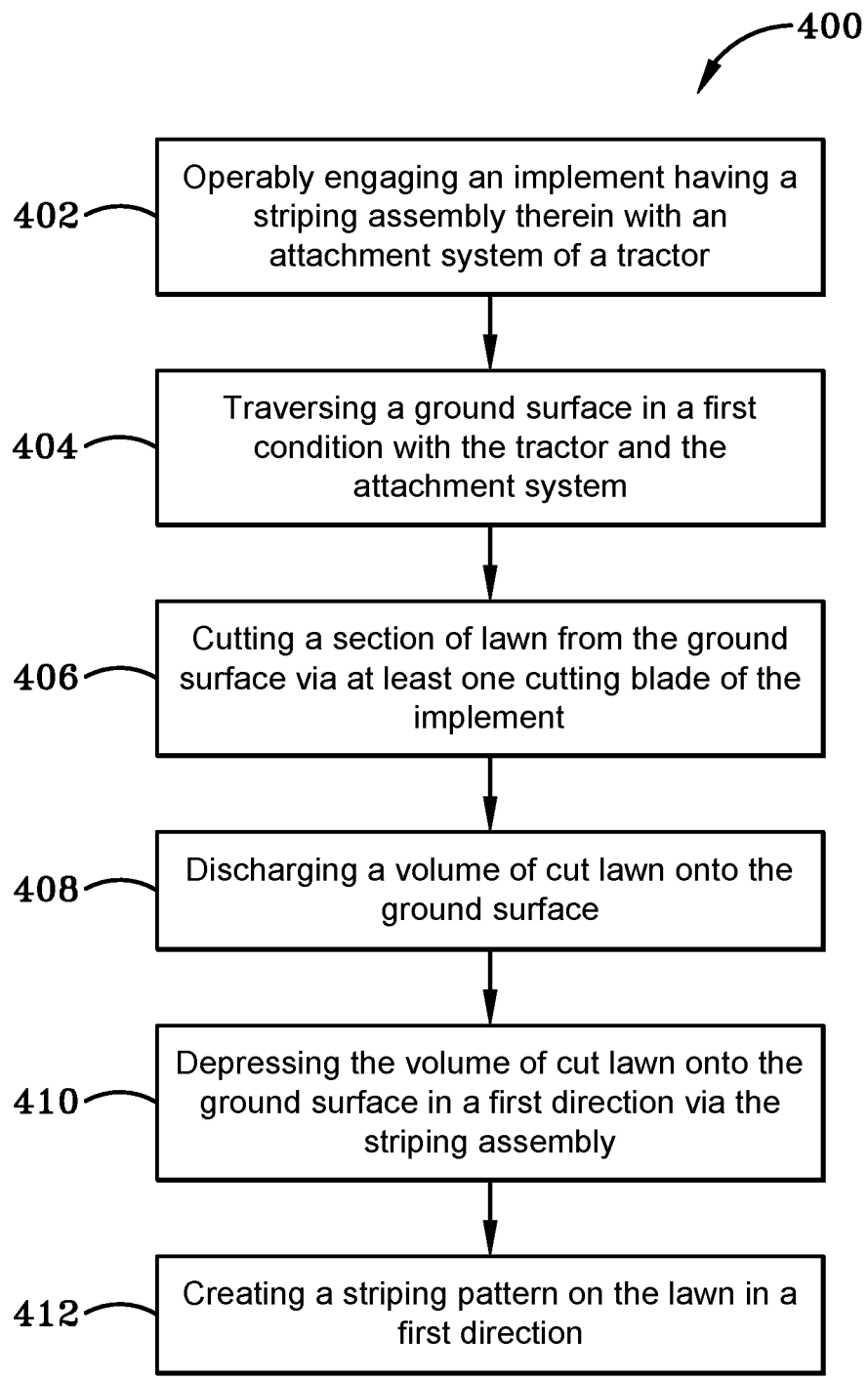
FIG. 27 (FIG. 27) is an exemplary method flowchart of striping a ground surface with an attachment system.

FIG. 27 illustrates a method 400. An initial step 402 of method 400 comprises operably engaging the attachment system carrying an implement and a striping system thereon with a tractor. Another step 404 comprises traversing a ground surface in a first condition with the tractor and the attachment system. Another step 406 comprises cutting a section of lawn from the ground surface via at least one cutting blade of the implement. Another step 408 comprises discharging a volume of cut lawn onto the ground surface. Another step 410 comprises depressing the volume of cut lawn onto the ground surface in a first direction, via the striping assembly, inside of an interior chamber defined by a body of the implement. Another step 412 comprises creating a striping pattern in a first direction.

In an exemplary embodiment, method 400 may include additional steps herein. An optional step may further provide that the step of traversing a ground surface in a first condition with the tractor and the implement includes the implement being level with a centerline of the attachment system. Optional steps may further provide traversing the ground surface in a second condition; rotating the implement and the striping assembly about a longitudinal axis defined by a centerline of a attachment frame from a first position to a second position, wherein the implement and the striping assembly is generally horizontal relative to a cross member of the attachment frame assembly in the first position, and wherein the implement and the striping assembly is angled relative to the cross member of the attachment frame assembly in response to the change of ground surface from the first condition to the second condition; and biasing the implement and the striping assembly back to the first position with a spring assembly when the level of the ground surface reverts to the first condition. Optional steps may further provide traversing the ground surface in a third condition with the tractor along with the implement and the striping assembly; and rotating the implement and the striping assembly from one of the first position and the second position to a third position wherein the implement is angled relative to the cross member of the attachment frame assembly in an opposite direction than the second position. An optional step may further provide that the implement is a flail mower.

Figure 28:
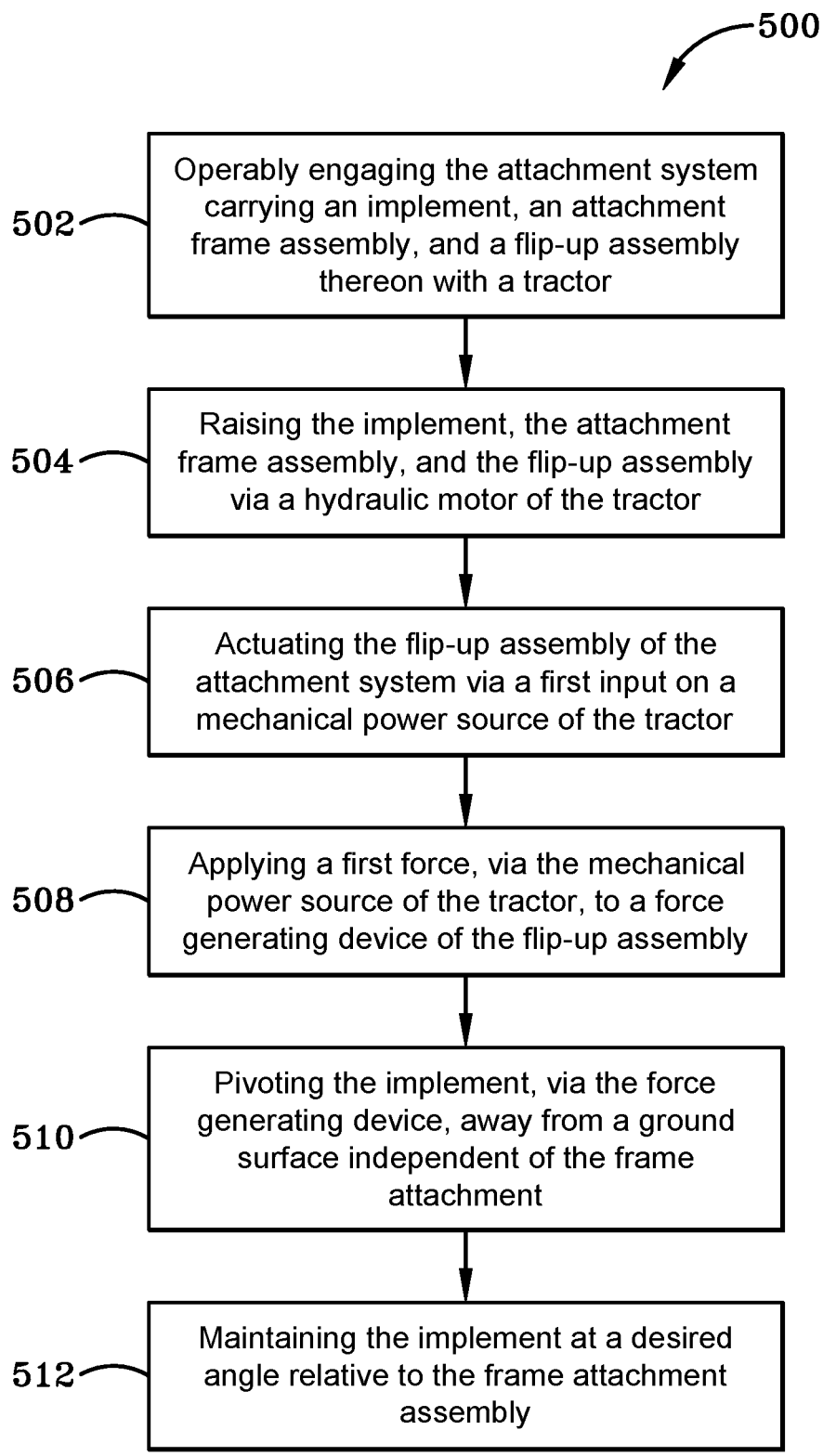
FIG. 28 (FIG. 28) is an exemplary method flowchart of adjusting an implement with an attachment system.

FIG. 28 illustrates a method 500 of adjusting an implement with an attachment system. An initial step 502 comprises operably engaging the attachment system carrying an implement, an attachment frame assembly, and a flip-up assembly thereon with a tractor. Another step 504 comprises raising the implement, the attachment frame assembly, and the flip-up assembly via a hydraulic motor of the tractor. Another step 506 comprises actuating the flip-up assembly of the attachment system via a first input on a mechanical power source of the tractor. Another step 508 comprises applying a first force, via the mechanical power source of the tractor, to a force generating device of the flip-up assembly. Another step 510 comprises pivoting the implement, via the force generating device, away from a ground surface independent of the frame attachment assembly. Another step 512 comprises maintaining the implement at a desired angle relative to the frame attachment assembly.

In an exemplary embodiment, method 500 may include additional steps of adjusting an implement with an attachment system. An optional step may further provide operably engaging a removable pin between the implement and the attachment frame assembly when the implement is maintained at an angle relative to the attachment frame assembly. Optional steps may further provide actuating the flip-up assembly of the attachment system via a second input on the mechanical power source of the tractor; applying a second force, via the mechanical power source of the tractor, to the force generating device of the flip-up assembly; pivoting the implement, via the force generating device, towards the ground surface independent of the frame attachment assembly; and maintaining the implement substantially parallel to the frame attachment assembly. An optional step may further provide operably engaging a removable pin between the implement and the attachment frame assembly to maintain the implement substantially parallel to the attachment frame assembly. An optional step may further provide that the implement is a flail mower.

Figure 29:
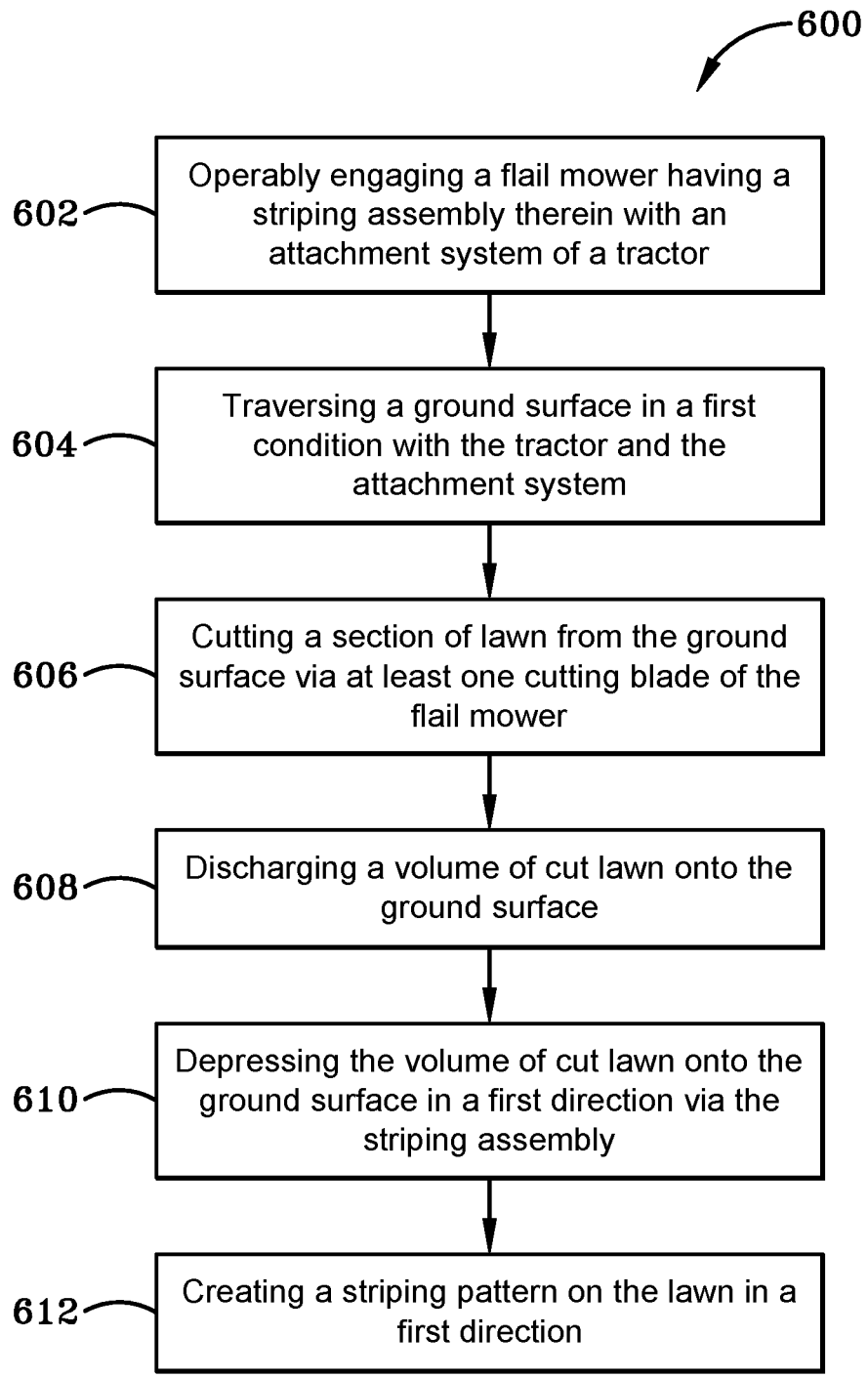
FIG. 29 (FIG. 29) is another exemplary method flowchart for striping a ground surface with an attachment system.

FIG. 29 illustrates a method 600. An initial step 602 of method 600 comprises operably engaging a flail mower having a striping assembly therein with an attachment system of a tractor. Another step 604 comprises traversing a ground surface in a first condition with the tractor and the attachment system. Another step 606 comprises cutting a section of lawn from the ground surface via at least one cutting blade of the flail mower. Another step 608 comprises discharging a volume of cut lawn onto the ground surface. Another step 610 comprises depressing the volume of cut lawn onto the ground surface in a first direction via the striping assembly. Another step 612 comprises creating a striping pattern on the lawn in the first direction.

In an exemplary embodiment, method 600 may include additional steps herein. An optional step may further provide that the step of traversing a ground surface in a first condition with the tractor and the flail mower includes the flail mower being level with a centerline of the attachment system. Optional steps may further provide traversing the ground surface in a second condition; rotating the flail mower and the striping assembly about a longitudinal axis defined by a centerline of an attachment frame assembly from a first position to a second position, wherein the flail mower and the striping assembly is generally horizontal relative to a cross member of the attachment frame assembly in the first position, and wherein the flail mower and the striping assembly is angled relative to the cross member of the attachment frame assembly in response to the change of ground surface from the first condition to the second condition; and biasing the flail mower and the striping assembly back to the first position with a spring assembly when the level of the ground surface reverts to the first condition. Optional steps may further provide traversing the ground surface in a third condition with the tractor along with the flail mower and the striping assembly; and rotating the flail mower and the striping assembly from one of the first position and the second position to a third position wherein the flail mower is angled relative to the cross member of the attachment frame assembly in an opposite direction than the second position. Another optional step may further provide depressing the volume of cut lawn onto the ground surface, via the striping assembly, inside of an interior chamber defined by a body of the flail mower. Another optional step may further provide depressing the volume of cut lawn onto the ground surface, via the striping assembly, exterior to an interior chamber defined by a body of the flail mower."

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. An attachment system for a tractor, comprising:
    an implement having a body;
    an attachment frame assembly having at least one pivot assembly operably engaged to the implement; and
    a flip-up assembly operably engaged to the body of the implement and the attachment frame assembly, wherein the flip-up assembly is adapted to independently rotate the implement in a first direction about a longitudinal axis relative to the attachment frame assembly;
    wherein the at least one pivot assembly allows the implement and the flip-up assembly to collectively rotate in a second direction about a longitudinal direction of the tractor.

2. The attachment system of claim 1, further comprising:
    a mechanical power source provided with the tractor, wherein the mechanical power source is adapted to pneumatically control the flip-up assembly to rotate the implement between an initial, non-pivoted position to a translated, pivoted position.

3. The attachment system of claim 1, wherein the implement further comprises:
    a first cross frame bracket operably engaged to an exterior surface of the body and defining a first slot and a first opening; and
    an opposing second cross bracket operably engaged to the exterior surface of the body and defining a second slot and a second opening.

4. The attachment system of claim 3, wherein the flip-up assembly further comprises:
    a force generating device operably engaged to the body of the implement;
    a connector operably engaged to the force generating device, wherein the connector is operably engaged to the first cross frame bracket and the second cross frame bracket; and
    at least one mounting plate operably engaging the force generating device with the attachment frame assembly.

5. The attachment system of claim 4, wherein the force generating device further comprises:
    a cylinder having first end, an opposing second end, and a longitudinal axis extending therebetween;
    a first protruding arm extending away from the cylinder orthogonal to the longitudinal axis;
    an opposing second protruding arm extending away from the cylinder orthogonal to the longitudinal axis; and
    a rod extending from the cylinder and moveable inside of the cylinder along the longitudinal axis.

6. The attachment system of claim 5, wherein the connector further comprises:
    a support member defining a central passageway;
    a first lateral wall operably engaged with the support member, and
    a second opposing lateral wall operably engaged with the support member.

7. The attachment system of claim 6, wherein the flip-up assembly further comprises:
    a locking mechanism operably engaging the connector with the first cross frame bracket and the second cross frame bracket.

8. The attachment system of claim 6, wherein the flip-up assembly further comprises:
    a removable pin operably engageable with the implement and the attachment frame assembly for maintaining the implement between an initial, non-pivoted position and a translated, pivoted position.

9. The attachment system of claim 8, wherein the removable pin is operably engaged with the first lateral wall and the second lateral wall of the connector in the initial, non-pivoted position; and
    wherein the removable pin is remote from the first opening and the second opening of the first cross frame bracket and the second cross frame bracket in the initial, non-pivoted position.

10. The attachment system of claim 8, wherein the removable pin is operably engaged with the first cross frame bracket and the second cross frame bracket inside of the first opening and the second opening in the translated, pivoted position; and
    wherein the removable pin is remote from the first lateral wall and the second lateral wall of the connector in the translated, pivoted position.

11. The attachment system of claim 5, wherein the at least one mounting plate further comprises:
    an opposing second mounting plate operably engaging the force generating device with the attachment frame assembly, wherein the at least one mounting plate and the second mounting plate are operably engaged to one another.

12. The attachment system of claim 11, wherein the first protruding arm of the force generating device is operably engaged to the at least one mounting plate; and
    wherein the second protruding arm of the force generating device is operably engaged to the second mounting plate.

13. The attachment system of claim 3, wherein the flip-up assembly is operably engaged to the implement between the first cross frame bracket and the second cross frame bracket.

14. The attachment system of claim 1, wherein the implement further comprises:
    a first lateral arm having a first end operably engaged to a cross member of the attachment frame assembly and a second opposing end operably engaged to the implement, wherein the second end of the first lateral arm is adapted to allow independent rotation of the implement relative to the attachment frame assembly; and
    an opposing second lateral arm having a first end operably engaged to the cross member of the attachment frame assembly and an opposing second end of the second lateral arm operably engaged to the implement, wherein the second end of the second lateral arm is adapted to allow independent rotation of the implement relative to the attachment frame assembly.

15. The attachment system of claim 1, further comprising:
a bracket operably engaged to the attachment frame assembly, wherein the bracket is adapted to hold at least one hydraulic tubing away from the implement and the attachment frame assembly.

16. A method of adjusting an implement with an attachment system, comprising the steps of:
operably engaging the attachment system carrying an implement, an attachment frame assembly, and a flip-up assembly thereon with a tractor;
pivotably engaging the implement and the flip-up assembly to the attachment frame assembly, via at least one pivot assembly, such that the implement and the flip-up assembly are able to collectively rotate in a second direction about a longitudinal direction of the tractor;
raising the implement, the attachment frame assembly, and the flip-up assembly via a hydraulic motor of the tractor;
actuating the flip-up assembly of the attachment system via a first input on a mechanical power source of the tractor;
applying a first force, via the mechanical power source of the tractor, to a force generating device of the flip-up assembly;
pivoting the implement, via the force generating device, away from a ground surface independent of the frame attachment assembly; and
maintaining the implement at a desired angle relative to the frame attachment assembly.

17. The method of claim 16, further comprising:
operably engaging a removable pin between the implement and the attachment frame assembly when the implement is maintained at an angle relative to the attachment frame assembly.

18. The method of claim 16, further comprising:
actuating the flip-up assembly of the attachment system via a second input on the mechanical power source of the tractor;
applying a second force, via the mechanical power source of the tractor, to the force generating device of the flip-up assembly;
pivoting the implement, via the force generating device, towards the ground surface independent of the frame attachment assembly; and
maintaining the implement substantially parallel to the frame attachment assembly.

19. The method of claim 18, further comprising:
operably engaging a removable pin between the implement and the attachment frame assembly to maintain the implement substantially parallel to the attachment frame assembly.

20. The method of claim 16, wherein the implement is a flail mower.

21. An attachment system for a tractor, comprising:
an implement having a body, a first cross frame bracket operably engaged to an exterior surface of the body and defining a first slot and a first opening, and an opposing second cross bracket operably engaged to the exterior surface of the body and defining a second slot and a second opening;
an attachment frame assembly having pivot assemblies operably engaged to the implement; and
a flip-up assembly operably engaged to the body of the implement and the attachment frame assembly, wherein the flip-up assembly is adapted to independently rotate the implement about a longitudinal axis relative to the attachment frame assembly; the flip-up assembly comprising:
a force generating device operably engaged to the body of the implement, the force generating device having:
a cylinder having first end, an opposing second end, and a longitudinal axis extending therebetween;
a first protruding arm extending away from the cylinder orthogonal to the longitudinal axis;
an opposing second protruding arm extending away from the cylinder orthogonal to the longitudinal axis; and
a rod extending from the cylinder and moveable inside of the cylinder along the longitudinal axis;
a connector operably engaged to the force generating device, wherein the connector is operably engaged to the first cross frame bracket and the second cross frame bracket; and
at least one mounting plate operably engaging the force generating device with the attachment frame assembly.

* * * * *